(12) United States Patent
Cameron et al.

(10) Patent No.: US 10,698,951 B2
(45) Date of Patent: Jun. 30, 2020

(54) SYSTEMS AND METHODS FOR AUTOMATIC-CREATION OF SOUNDTRACKS FOR SPEECH AUDIO

(71) Applicant: Booktrack Holdings Limited, Takapuna (NZ)

(72) Inventors: Paul Charles Cameron, Milford (NZ); Craig Andrew Wilson, Rothesay Bay (NZ); Petrus Matheus Godefridus De Vocht, Porirua (NZ); Brock David Moore, Warkworth (NZ)

(73) Assignee: Booktrack Holdings Limited, Takapuna (NZ)

( * ) Notice: Subject to any disclaimer, the term of this patent is extended or adjusted under 35 U.S.C. 154(b) by 54 days.

(21) Appl. No.: 15/663,214

(22) Filed: Jul. 28, 2017

(65) Prior Publication Data

US 2018/0032610 A1 Feb. 1, 2018

(30) Foreign Application Priority Data

Jul. 29, 2016 (NZ) ........................ 722715

(51) Int. Cl.
*G06F 16/683* (2019.01)
*G09B 5/06* (2006.01)
(Continued)

(52) U.S. Cl.
CPC .......... *G06F 16/685* (2019.01); *G06F 40/211* (2020.01); *G06F 40/242* (2020.01);
(Continued)

(58) Field of Classification Search
CPC .. G06F 17/271; G06F 17/277; G06F 17/2785; G06F 16/685; G06F 3/165;
(Continued)

(56) References Cited

U.S. PATENT DOCUMENTS 6,618,715 B1   9/2003   Johnson et al.
6,721,734 B1   4/2004   Subasic et al.
(Continued)

FOREIGN PATENT DOCUMENTS

EP   1102238 B1   8/2006
EP   2073193 A1   6/2009
(Continued)

OTHER PUBLICATIONS

"U.S. Appl. No. 15/663,196, Non Final Office Action dated Apr. 11, 2019", 7 pgs.
(Continued)

*Primary Examiner* — Abdelali Serrou
(74) *Attorney, Agent, or Firm* — Schwegman Lundberg & Woessner, P.A.

(57) ABSTRACT

A method of automatically generating a digital soundtrack intended for synchronised playback with associated speech audio, the method executed by a processing device or devices having associated memory. The method comprises syntactically and/or semantically analysing text representing or corresponding to the speech audio at a text segment level to generate an emotional profile for each text segment in the context of a continuous emotion model. The method further comprises generating a soundtrack for the speech audio comprising one or more audio regions that are configured or selected for playback during corresponding speech regions of the speech audio, and wherein the audio configured for playback in the audio regions is based on or a function of the emotional profile of one or more of the text segments within the respective speech regions.

34 Claims, 19 Drawing Sheets

(51) Int. Cl.
*G09B 5/02* (2006.01)
*G11B 27/031* (2006.01)
*G06F 40/30* (2020.01)
*G06F 40/211* (2020.01)
*G06F 40/242* (2020.01)
*G06F 40/284* (2020.01)
*G06K 9/72* (2006.01)
*G10L 15/18* (2013.01)
*G10L 25/63* (2013.01)

(52) U.S. Cl.
CPC ............ *G06F 40/284* (2020.01); *G06F 40/30* (2020.01); *G06K 9/723* (2013.01); *G09B 5/02* (2013.01); *G09B 5/06* (2013.01); *G09B 5/062* (2013.01); *G10L 15/18* (2013.01); *G10L 25/63* (2013.01); *G11B 27/031* (2013.01)

(58) Field of Classification Search
CPC .... G06F 16/60; G06F 17/241; G06F 17/2735; G06F 40/284; G06F 40/242; G06F 40/211; G06F 40/30; G06F 3/0483; G06F 3/167; G06F 17/30746; G06F 40/169; G11B 27/031; G11B 27/10; G11B 27/005; G11B 27/11; G11B 20/10527; G06K 9/723; G09B 5/062; G09B 5/06; G09B 5/02; G09B 5/065; G10L 25/63; G10L 15/18; G10L 15/26; G10L 21/10; G10L 13/033; G10L 21/055; G10H 2240/085; G10H 1/00; G10H 1/0025; G10H 2210/021; G10H 2240/081; G10H 2240/141; G10H 2250/035; G10H 1/0008; G10H 1/368; G10H 2240/131; G10H 2240/325

See application file for complete search history.

(56) References Cited

U.S. PATENT DOCUMENTS

| | | | |
|---|---|---|---|
| 7,003,515 B1 | 2/2006 | Glaser et al. | |
| 8,527,859 B2 * | 9/2013 | Henshall | G06F 40/166 715/204 |
| 8,644,971 B2 | 2/2014 | Weinstein | |
| 8,825,490 B1 | 9/2014 | Weinstein | |
| 9,141,257 B1 | 9/2015 | Goldstein et al. | |
| 2002/0165880 A1 * | 11/2002 | Hornsby | G06F 15/0283 715/209 |
| 2006/0122842 A1 * | 6/2006 | Herberger | G10H 1/368 704/278 |
| 2007/0245375 A1 | 10/2007 | Tian et al. | |
| 2008/0005656 A1 * | 1/2008 | Pang | G09B 5/062 715/203 |
| 2008/0019667 A1 * | 1/2008 | Uehara | G10H 1/368 386/239 |
| 2008/0140413 A1 * | 6/2008 | Millman | G09B 7/02 704/270 |
| 2008/0229910 A1 | 9/2008 | Kobayashi et al. | |
| 2009/0191531 A1 * | 7/2009 | Saccocci | G09B 5/062 434/317 |
| 2010/0050064 A1 | 2/2010 | Liu et al. | |
| 2010/0149933 A1 * | 6/2010 | Cervera Navas | B42D 3/123 369/47.1 |
| 2010/0153889 A1 * | 6/2010 | Krause | G06F 3/0219 715/856 |
| 2010/0324895 A1 * | 12/2010 | Kurzweil | G10L 13/00 704/235 |
| 2011/0153047 A1 * | 6/2011 | Cameron | G11B 27/034 700/94 |
| 2011/0195388 A1 * | 8/2011 | Henshall | G09B 5/062 434/317 |
| 2011/0288861 A1 * | 11/2011 | Kurzweil | G09B 5/06 704/235 |
| 2013/0131849 A1 * | 5/2013 | Mere | G11B 27/005 700/94 |
| 2013/0297599 A1 | 11/2013 | Henshall | |
| 2013/0346838 A1 | 12/2013 | Henshall et al. | |
| 2014/0095150 A1 | 4/2014 | Berjikly et al. | |
| 2014/0142954 A1 * | 5/2014 | Cameron | G11B 20/10527 704/276 |
| 2014/0143642 A1 * | 5/2014 | Cameron | G11B 20/10527 715/201 |
| 2015/0025663 A1 * | 1/2015 | Cameron | G06F 3/165 700/94 |
| 2015/0082136 A1 * | 3/2015 | Cameron | G11B 27/005 715/203 |
| 2015/0154166 A1 | 6/2015 | Allen et al. | |
| 2015/0213002 A1 * | 7/2015 | Gou | G06F 16/358 704/9 |
| 2015/0269133 A1 | 9/2015 | Do et al. | |
| 2016/0063874 A1 | 3/2016 | Czerwinski et al. | |
| 2016/0078369 A1 | 3/2016 | Frank et al. | |
| 2018/0032305 A1 | 2/2018 | Cameron et al. | |
| 2018/0032611 A1 | 2/2018 | Cameron et al. | |

FOREIGN PATENT DOCUMENTS

| | | |
|---|---|---|
| EP | 2833363 A1 | 2/2015 |
| JP | 2005049773 A | 2/2005 |
| WO | WO-2010002275 A2 | 1/2010 |
| WO | WO-2011060106 A1 | 5/2011 |
| WO | WO-2012006256 A2 | 1/2012 |

OTHER PUBLICATIONS

"U.S. Appl. No. 15/663,196, Response filed Feb. 7, 2019 to Restriction Requirement dated Nov. 27, 2018", 11 pgs.

"U.S. Appl. No. 15/663,196, Restriction Requirement dated Nov. 27, 2018", 7 pgs.

"U.S. Appl. No. 15/663,239, Non Final Office Action dated Mar. 1, 2019", 14 pgs.

"European Application No. 17183918.6. European Search report dated Jan. 9, 2018", (Jan. 9, 2018).

"European Application No. 17183921.0, European Search Report dated Dec. 20, 2017", (Dec. 20, 2017).

"European Application No. 17183927.7, European Search Report dated Dec. 20, 2017", (Dec. 20, 2017).

ALM, Cecilia Ovesdotter, et al., "Emotions from text: machine learning for text-based emotion prediction", Human Language Technology and Empirical Methods in Natural Language Processing, Association for Computational Linguistics, Stroudsburg, PA, (Oct. 6, 2005), 579-586 pgs.

Perikos, Isidoros, et al., "Recognizing emotions in text using ensemble of classifiers", Engineering Applications of Artificial Intelligence, 51 (2016), (Feb. 5, 2016), 191-201.

Schatter, Gunther, et al., "Mood-Based Selection of Music Collections by Speech", 2011 IEEE 15th International Symposium on Consumer Electronics, (Jun. 14, 2011), 249-253.

\* cited by examiner

| GENRE ⌃ | STYLE ⌄ | EMOTION ⌄ |
|---|---|---|
| Science Fiction | Romance | Young Adult / Teen |
| Horror | Fantasy | Classics |
| Adventure | Scary Stories | Crime |
| Young Readers | Biography/Memoir | Humor & Comedy |
| Non-Fiction | Drama | Fan Fiction / Pop Fiction |
| Historical / Period | Holiday | Other |
| Mystery / Thriller | Sports | Religious / Spiritual |

*FIGURE 17A*

| GENRE ⌄ | STYLE ⌃ | EMOTION ⌄ |
|---|---|---|
| Acoustic | Alternative | Ambient |
| Blues | Cinematic | Country |
| Easy Listening | Electronic | Folk |
| Funk | Jazz | Kids / Quirky |
| Orchestral / Classical | Pop | RnB / Reggae |
| Rock | World | |

*FIGURE 17B*

| GENRE ⌄ | STYLE ⌄ | EMOTION ⌃ |
|---|---|---|
| Amazed-Surprised | Angry-Fearful | Determined-Focused |
| Happy-Pleased | Other | Quiet-Curious |
| Relaxing-Calm | Sad-Lonely | Shocked-Confused |

*FIGURE 17C*

SYSTEMS AND METHODS FOR AUTOMATIC-CREATION OF SOUNDTRACKS FOR SPEECH AUDIO

CLAIM OF PRIORITY

This application claims the benefit of priority of New Zealand Patent Application Serial No. 722715, filed on Jul. 29, 2016, the benefit of priority of which is claimed hereby, and which is incorporated by reference herein in its entirety.

FIELD OF THE INVENTION

The invention relates to systems and methods for the automatic creation of soundtracks for playback with or alongside pre-recorded or live audio comprising speech or voice. In particular, although not exclusively, the soundtracks are for synchronised playback with pre-recorded speech such as audiobooks or other pre-recorded speech audio, but may also be generated for playback with live speech audio.

BACKGROUND TO THE INVENTION

Audiobooks are an audio recording of a narrator reading a book, typically a novel. Audiobooks were traditionally provided on CD or cassette, but these days are now provided in digital audio format as an audio file or package of audio files for playback or streaming on consumer electronic devices such as computers, home audio systems and players, and more commonly portable electronic devices such as portable audio players such as mp3 players and iPods, or other portable electronic devices with audio playback capabilities such as most smart phones, PDAs, tablets, laptops and the like.

Audiobooks are typically provided with audio in the form of a narration of the book. However, some audiobooks have been provided with an accompanying soundtrack that plays concurrently with the narration to enhance the audiobook experience. Such soundtrack-enhanced audiobooks require significant production time in selecting the appropriate individual music files to overlay the narration and compiling those music files with the narration audio to generate the end soundtrack-enhanced audiobook audio file. For this reason, sound-enhanced audiobooks are often provided as special features or just short sections of an audiobook like the introduction have background music. Soundtrack-enhanced audiobooks are not commonplace, due to the additional cost and complexity of their production.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

SUMMARY OF THE INVENTION

It is an object of at least some embodiments to provide a system and method for at least partial automatic-creation of soundtracks for playback alongside audio comprising speech or voice, or at least provide the public with a useful choice.

It is an object of at least some embodiments to provide a method of delivering a synchronised soundtrack for playback with associated speech audio, or to at least provide the public with a useful choice.

In a first aspect, the invention broadly consists in a method of automatically generating a digital soundtrack intended for synchronised playback with associated speech audio, the soundtrack comprising one or more audio regions configured for synchronised playback with corresponding speech regions of the speech audio, the method executed by a processing device or devices having associated memory, the method comprising:

(a) receiving or retrieving raw text data representing or corresponding to the speech audio into memory;

(b) applying natural language processing (NLP) to the raw text data to generate processed text data comprising token data that identifies individual tokens in the raw text, the tokens at least identifying distinct words or word concepts;

(c) applying semantic analysis to a series of text segments of the processed text data based on a continuous emotion model defined by a predefined number of emotional category identifiers each representing an emotional category in the model, the semantic analysis being configured to parse the processed text data to generate, for each text segment, a segment emotional data profile based on the continuous emotion model;

(d) identifying a series of text regions (which correspond to speech regions) comprising a text segment or a plurality of adjacent text segments having an emotional association by processing the segment emotional data profiles of the text segments with respect to predefined rules, and generating audio region data defining the intended audio regions corresponding to the identified text regions, each audio region being defined by a start position indicative of the position in the text at which the audio region is to commence playback, a stop position indicative of the position in the text at which the audio region is to cease playback, and a generated region emotional profile based on the segment emotional profiles of the text segments within its associated text region;

(e) processing an accessible audio database or databases comprising audio data files and associated audio profile information to select an audio data file for playback in each audio region, the selection at least partly based on the audio profile information of the audio data file corresponding to the region emotional profile of the audio region, and defining audio data for each audio region representing the selected audio data file for playback; and (f) generating soundtrack data representing the created soundtrack for synchronised playback with the speech audio, the soundtrack data comprising data representing the generated audio regions and audio data associated with those audio regions.

In an embodiment, the speech audio is pre-recorded or pre-generated. In another embodiment, the speech audio is a live or streaming audio.

In one embodiment, step (a) of receiving or retrieving raw text data representing the speech audio into memory comprises: receiving or retrieving a digital audio file or files representing the speech audio; and processing the digital audio file or files with one or more speech-to-text engines to generate raw text data representing the speech audio. In one example, the speech audio may represent an audiobook, and the speech-to-text engine is configured to generate raw text data corresponding to the book being narrated in the audiobook.

In another embodiment, step (a) of receiving or retrieving raw text data representing the speech audio into memory comprises: receiving identification data indicative of the speech audio; receiving or retrieving raw text data representing the speech audio from one or more electronic text or content sources based on the identification data. By way of example, the text or content sources may be any one or more of the following: digital database, website, electronic text or content library, electronic text or content engine or the like. In one example, the speech audio may represent an audiobook, and the raw text data may be retrieved from an e-book library or database comprising the corresponding e-book.

In an embodiment, the start and stop positions are indicative of a word in the text at which the audio region is to commence and cease playback respectively.

In one embodiment, the soundtrack comprises a soundtrack timeline along which the one or more audio regions are configured for synchronised playback with corresponding speech regions in the speech audio playback timeline, each audio region having a position along the soundtrack timeline that is dynamically adjustable to maintain synchronization of the audio regions of the soundtrack with their respective speech regions in the speech audio based on a playback speed variable indicative of the playback speed of the speech audio.

In one embodiment, the start and stop positions defining each audio region correspond to start and stop text positions comprising data indicative of a position or location in the raw text data corresponding to the speech audio such as, but not limited to, an index value, word count value, character count value, page number, chapter number, paragraph number, positional reference scheme identifier (e.g. CFI), or the like.

In another embodiment, the start and stop positions defining each audio region correspond to start and stop playback time values that correspond to the playback time of the desired start and stop word when narrated or spoken in the speech audio. In one example, the playback time values may be derived relative to a default or nominal audio speech playback speed.

In one embodiment, the speech audio is an audiobook and the speech regions correspond to narration regions in the audiobook.

In an embodiment, the soundtrack comprises a soundtrack timeline along which the one or more audio regions are configured for synchronised playback with corresponding narration regions in the audiobook playback timeline, each audio region having a position along the soundtrack timeline that is dynamically adjustable to maintain synchronization of the audio regions of the soundtrack with their respective narration regions in the audiobook based on a narration speed variable indicative of the playback narration speed of the audiobook.

In one configuration, the start and stop positions defining each audio region correspond to start and stop playback time values that correspond to the playback time of the desired start and stop word of the corresponding narration region when narrated or spoken in the audiobook. In one example, the playback time values may be derived relative to a default or nominal audio speech playback speed.

In one form, the start position and stop position of each audio region is defined based on a nominal narration speed or nominal audiobook playback duration. In an embodiment, the start and stop positions of the audio regions are dynamically adjustable based on the narration speed variable and data indicative of the nominal narration speed or nominal audiobook playback duration upon which the position of audio regions were originally defined. This ensures that the correct soundtrack audio regions will start and stop (including any associated playback effects such as volume envelopes, fade in/out, phase shift, panning etc) at the correct time or duration point in the audiobook regardless of narration speed changes.

In another configuration, the start and stop positions defining each audio region correspond to start and stop text positions comprising data indicative of a position or location in the raw text data corresponding to the narration region such as, but not limited to, an index value, word count value, character count value, page number, chapter number, paragraph number, positional reference scheme identifier (e.g. CFI), or the like.

In an embodiment, applying natural language processing to the raw text data comprises processing the raw text data into a series of distinct or individual tokens. In one embodiment, the token data comprises tokens representing each word or word concepts from the raw text data, with the tokens arranged or ordered into their respective sentences. In another embodiment, the token data comprises tokens representing each word or word concept or punctuation from the raw text data, with the tokens arranged or ordered into their respective sentences. In another embodiment, the parameters defining the tokenization, i.e. what constitutes a distinct token, may be configured based on tokenization control parameters.

In an embodiment, applying natural language processing to the raw text data further comprises applying syntactic or part of speech (POS) tagging to the raw text data to identify syntactic components in each sentence and the processed text data further comprises syntactic data indicative of the identified syntactic components. In one configuration, each token of the token data is tagged with its identified or associated syntactic component. By way of example, the tokens may be tagged with syntactic data identifying whether they are a verb, noun, adjective, preposition or other syntactic component, or may be tagged with a default 'unknown' tag if the token does not have an identified syntactical component.

In an embodiment, the method further comprises identifying or segmenting the processed text data into the series of text segments prior to or during the semantic analysis.

In an embodiment, segmenting the processed text data into a series of text segments comprises segmenting the text data into text segments representing the individual sentences within the text. In another embodiment, segmenting the processed text data into a series of text segments comprises segmenting the text data into text segments representing a predetermined number of adjacent words or adjacent sentences. In another embodiment, segmenting the processed text data into a series of text segments comprises segmenting the text data into text segments based on text reference points, such as paragraph or page or chapter boundaries or other text reference boundaries in examples where the speech audio corresponds to a text or book (such as an audiobook). In one example, the text segments may represent individual paragraphs or chapters of the text corresponding to the audiobook. It will be appreciated that the length of each text segment (e.g. defined by the number of tokens in the segment) may vary from segment to segment, such that the text segments may be non-uniform in length.

In another embodiment, segmenting the processed text data into a series of text segments comprises signal or audio processing the speech audio and determining or identifying text reference points in the speech audio based on analysis of the delay or time interval between spoken words in the speech audio, and segmenting based on those text reference points. In one example, the audio analysis may be configured to detect or identify delays or time intervals corresponding to text reference points that represent any one of more of the following: end of a sentence, end of a paragraph, or end of a chapter. In this embodiment, the text reference points may be in the form of playback time values in the speech audio, and the method further comprises converting or transforming those times into their corresponding text positions in the processed text data to identify the text segments.

In an embodiment, the continuous emotion model is further defined by lexicon data representing a set of lexicons for the emotional category identifiers. In an embodiment, each lexicon comprises data indicative of a list of words and/or word concepts that are categorised or determined as being associated with the emotional category identifier associated with the lexicon. In one form, the lexicon data may be fixed or static such that the lists of words and/or word concepts in each lexicon are fixed. In an alternative configuration, the lexicon data is dynamic such that it may be modified or updated to thereby selectively modify or adjust their list of words and/or word concepts in each lexicon. In one form, the words and/or word concepts in each lexicon are mutually exclusive such that they do not appear in any other lexicon. In an alternative form, the words and/or word concepts of each lexicon are not mutually exclusive in that they appear in more than one lexicon.

In an embodiment, each word or word concept in each lexicon has one or more associated lexicon attribute values or identifiers. In one configuration, each word or word concept has a weighting value representing how strongly the word or word concept represents the emotional category identifier of the lexicon, and a syntactic value or identifier representing the part of speech or type of word or word concept, such as noun, verb, adjective, adverb, idiom or the like.

In an embodiment, applying semantic analysis to the processed text data comprises generating segment emotional data profiles that represent for each emotional category identifier the absolute count or frequency of tokens in the text segment corresponding to the associated lexicon. In one form, the segment emotional data profile is generated in the form of a multi-dimensional data set or data array comprising a plurality of count or frequency values, one for each emotional category identifier, and wherein the count or frequency values are based on the number of tokens in the text segment corresponding to or matching to their lexicon associated with an emotional category identifier.

In one example embodiment, the continuous emotional model is defined by eight emotional category identifiers, and in this embodiment the sentence emotional data profile is an eight value data set or data array comprising eight count or frequency values, each count or frequency value corresponding to a respective emotional category identifier.

In an embodiment, the multi-dimensional data arrays of the segment emotional data profiles are multi-dimensional representations of the emotional profile of the text segments, each emotional category identifier representing a distinct dimension within the continuous emotion model.

In an embodiment, the generated segment emotional data profiles comprise a multi-dimensional data set comprising absolute count values or frequency values for each emotional category identifier. In one form, the frequency values are segment frequency values representing the absolute count value divided by the total number of tokens in the text segment, and which is expressed as either a percentage or fractional value.

In an embodiment, the absolute count values or frequency values of the multi-dimensional data set represent or are indicative of the absolute intensity of the text segment for each emotional category identifier.

In an embodiment, the method further comprises generating baseline statistical values for each emotional category identifier across the entire text representing the speech audio, and normalising or scaling the segment emotional data profiles based on or as a function of the generated baseline statistical values to generate relative segment emotional data profiles.

In an embodiment, the relative segment emotional data profiles comprise a multi-dimensional data set of relative count values or frequency values that are generated by normalising of scaling the absolute count values or frequency values based on the baseline statistical values. In this embodiment, the relative count values or frequency values of the multi-dimensional data set represent or are indicative of the relative intensity of the text segment for each emotional category identifier based on the baseline statistical values for the entire text representing the speech audio.

In one example, the method comprises calculating baseline statistical values for the entire text representing the speech audio that represent the mean absolute count value per text segment per emotional category identifier and an associated count value standard deviation value per emotional category identifier, and generating relative segment emotional data profiles based on the calculated mean absolute counter values and/or associated standard deviation values per emotional category identifier. In one form, the relative segment emotional data profile comprises a multi-dimensional data set comprising relative count values that represent the absolute count value as a function of the number of standard deviations it is from the mean.

In another example, the method comprises calculating baseline statistical values for the entire text representing the speech audio that represent the global frequency values per emotional category identifier and associated segment frequency value standard deviation per emotional category identifier calculated based on the global frequency values, or calculating mean segment frequency values per emotional category identifier and associated segment frequency standard deviation values per emotional category identifier calculated based on the mean segment frequency values; and generating relative segment emotional data profiles based on the calculated global frequency values and/or associated standard deviation values per emotional category identifier, or based on the mean segment frequency values and/or associated segment frequency standard deviation values per emotional category identifier. In one form, the relative segment emotional data profile comprises a multi-dimensional data set comprising relative frequency values that represent the absolute frequency value as a function of the number of standard deviations it is from the global frequency value or mean segment frequency value.

In an embodiment, the continuous emotion model comprises a 2-dimensional circular reference frame defined by a circular perimeter or boundary extending about a central origin, with each emotional category identifier represented by a segment or spoke of the circular reference frame to create a continuum of emotions. In one configuration, the segments are equal in size or the reference spokes are equi-spaced about the circular reference frame.

In an embodiment, the 2-dimensional circular reference frame comprises a set of orthogonal reference axes extending from the origin, one axis representing 'arousal' from activated or high arousal at one extreme at one point on the circular perimeter of the model to deactivated or low arousal at the other extreme on a diametrically opposed point on the circular perimeter of the model, and the other axis representing 'pleasantness' from pleasant at one extreme at one point on the circular perimeter of the model to unpleasant at the other extreme on a diametrically opposed point on the circular perimeter of the model.

In one configuration, the arousal axis is configured to divide the circular model into two 'arousal' halves, one representing emotions of activation and the other representing emotions of deactivation, and the pleasantness axis is configured to divide the circular model into two 'pleasantness' halves, one representing pleasant emotions and the other representing unpleasant emotions, the pleasantness halves being at an orthogonal orientation with respect to the arousal halves.

In an embodiment, the segments or spokes of emotional category identifiers are arranged about the circular reference frame according to their position or association with the arousal and pleasantness axes.

In one embodiment, the continuous emotion model comprises eight emotional category identifiers, each representing a spoke or an octant of the 2-dimensional circular reference frame.

In one embodiment, the method comprises mapping or casting the absolute or relative sentence emotional data profiles into the 2-dimensional circular reference frame.

In an embodiment, the method further comprises calculating or determining a sentiment value for each of the text segments. In one configuration, the sentiment value is a value representing or indicative of whether the text segment represents a positive or negative sentiment. In one configuration, the sentiment value represents whether the text segment is positive or negative, and/or the intensity of that sentiment relative to a scale. In one example, the sentiment value is a numerical value on a scale from a first threshold (e.g. −1.0) representing a very negative sentiment to a second threshold (e.g. +1.0) representing very positive sentiment. The sentiment value may be generated by any suitable sentiment analysis tool or engine. Examples of such sentiment analysis tools or engines include, but are not limited to, VADER (Valence Aware Dictionary and sEntiment Reasoner), Apache UIMA (part of OpenNLP), Weka, and Python NLTK (NLP toolkit).

In one configuration, the segment emotional data profiles are multi-dimensional data sets comprising absolute or relative intensity values for each emotional category identifier, and the method comprises mapping each data set as multiple two-dimensional vectors into the circular reference frame, a vector representing the intensity value of each emotional category identifier of a text segment. In one example, the method comprises mapping each intensity value of a segment emotional data profile as a distinct vector extending from the origin of the circular reference frame, the angular position of the vector aligning to the segment or spoke of its corresponding emotional category identifier and the length of the vector or distance from the origin relative to the circular perimeter of the model being a function of its intensity value.

In another configuration, the segment emotional data profiles are multi-dimensional data sets comprising absolute or relative intensity values for each emotional category identifier, and the method comprises mapping each data set as a single representative or resultant two-dimensional vector into the circular reference frame, the vector representing the overall emotional profile and intensity of the text segment. In one example, the method comprises calculating a resultant vector from the summation of the multiple two-dimensional vectors representing a segment emotional data profile or calculating a resultant vector for the segment emotional data profile based on the absolute or relative intensity values for each emotional category identifier and data indicative of the associated angular position of each segment or spoke in the circular reference frame representing the emotional category identifiers. In an embodiment, calculating a resultant vector for a text segment from its multi-dimensional data set is further based on a sentiment value generated or determined for the text segment.

In one embodiment, identifying text regions comprises identifying reference text segments that represent emotional transitions in the text based on predefined emotional-change threshold or thresholds, and defining the text regions relative to those reference text segments.

In another embodiment, identifying text regions comprises defining all text segments as an initial set of text regions, and iteratively grouping adjacent text segments into a set of larger final text regions based on analysis of the segment emotional data profiles and/or other predefined rules.

In an embodiment, the predefined rules include configurable minimum and/or maximum threshold values defining the minimum and/or maximum length of the final text regions. In an embodiment, the minimum and/or maximum threshold values may be in the form of token or word counts. In another embodiment, the minimum and/or maximum threshold values may be token or word count values derived from or which are a function of the minimum and/or maximum playback time periods defined for the audio regions and a playback speed variable indicative of the average or nominal playback speed of the speech audio. In such embodiments, the minimum and/or maximum threshold values are configurable to control the general frequency of audio regions and the associated frequency of the change in audio or music over the duration of the soundtrack.

In another embodiment, identifying text regions comprises:
(i) defining a first set of text regions of one or multiple adjacent text segments by grouping text segments with neutral segment emotional data profiles with adjacent non-neutral segment emotional data profiles;
(ii) reducing the first set of text regions into a smaller second set of text regions based on grouping at least some adjacent text regions from the first set into larger text regions until all the text regions in the second set reach a predetermined size threshold;
(iii) generating or determining an interim text region emotional data profile for each of the larger text regions in the second set based on the individual segment emotional data profiles of the segments within the region;
(iv) analysing the interim text region emotional data profiles of the second set of text regions and further grouping adjacent text regions having an emotional association based on an emotional-transition threshold or thresholds to generate a final set of text regions;
(v) generating or determining a text region emotional data profile for each of the text regions in the final set based on the individual segment emotional data profiles of the text segments within the region and/or the interim text region emotional data profiles.

In an embodiment, a neutral segment emotional data profile is determined based on a neutral segment threshold that is indicative of minimal or neutral emotion being present in the text segment. In one example, a text segment may be considered to have a neutral text segment emotional data profile if its absolute or relative intensity values across all emotional category identifiers are below respective absolute or relative intensity thresholds, such as zero.

In an embodiment, the size threshold may be a token count threshold or value representing a minimum number of tokens required to be a text region candidate. In another embodiment, the size threshold may be a word count threshold or value representing a minimum number of words required to be a text region candidate.

In an embodiment, the interim text region emotional data profiles are in the same format as the segment emotional data profiles. For example, the interim text region emotional data profiles may be in the form of multi-dimensional data sets comprising absolute or relative intensity values for each emotional category identifier.

In one configuration, generating or determining an interim text region emotional data profile for each of the text regions in the second set comprises electing the segment emotion data profile of the single text segment as the interim text region emotional data profile if the text region only contains a single text segment.

In another configuration, generating or determining an interim text region emotional data profile for each of the text regions in the second set comprises generating an interim text region emotional data profile that is based on averaging the segment emotional data profiles of all text segments in the text region.

In another configuration, generating or determining an interim text region emotional data profile for each of the text regions in the second set comprises selecting the prevailing or dominant segment emotional data profile of the text segments within the text region to represent the interim text region emotional data profile.

In another configuration, generating or determining an interim text region emotional data profile for each of the text regions in the second set comprises generating a representative interim text region emotional data profile based on statistical processing of the segment emotional data profiles of the text segments within the text region.

In another configuration, generating or determining an interim text region emotional data profile for each of the text regions in the second set comprises combining or summing all the segment emotional data profiles of all the text segments in a text region to generate a single interim text region emotional data profile. In one example, the interim text region emotional data profile may be in the form of a multi-dimensional data set comprising absolute or relative intensity values for each emotional category identifier that are calculated from summing the respective intensity values of each emotional category identifier from all of the multi-dimensional segment emotional data profiles in the text region.

In an embodiment, the interim text region emotional data profile is further processed by applying a masking or weighting function to generate a masked interim text region emotional data profile for the text region. By way of example, the masking or weighting function may be configured to determine the highest aggregated sub-set of adjacent intensity values in the multi-dimensional data set to represent the masked interim text region emotional data profile. The sub-set may be determined from a pre-configured number of emotional category identifiers. In one example, for an 8-dimensional data set, the highest aggregated 2 or 3 adjacent intensity values are selected to represent the masked data profile, with the remaining intensity values in the interim data profile being zeroed. In another example, the highest intensity value may be selected to represent the masked date profile, with the remaining intensity values in the interim data profile being zeroed.

In an embodiment, analysing the interim text region emotional data profiles of the second set of text regions and further grouping adjacent text regions having an emotional association based on an emotional-transition threshold to generate a final set of text regions comprises:
  (i) mapping each interim text region emotional data profile or masked interim text region emotional data profile as a two-dimensional vector into the 2-dimensional circular reference frame of the continuous emotion model;
  (ii) identifying emotional transitions between adjacent interim text regions based on analysing or comparing the distance from the origin and/or angular movement between two-dimensional vectors of adjacent interim text regions relative to emotional-transition thresholds; and
  (iii) grouping of adjacent interim text regions based on the identified emotional transitions to generate a final set of text regions.

In an embodiment, the emotional transition thresholds are based on vector movement or distance thresholds. In one configuration, the emotional-transition threshold is based on the change in emotional intensity between adjacent two-dimensional vectors represented by the distance of the vectors from the origin. In another configuration, the emotional-transition threshold is based on the change in emotion between adjacent two-dimensional vectors represented by the change in angle or direction of the vectors within the circular reference frame. In another configuration, the emotional-transition threshold is based on a function of the change in emotional intensity and/or change in emotion in accordance with the change in distance and/or angle or direction of the vectors from adjacent interim text regions. In one form, the function may dictate a higher weighting on distance change relative to direction change, or vice versa.

In an embodiment, the analysis of interim text region emotional data profiles commences progressively from the start of the text onwards and iteratively accumulates interim text regions having an emotional association until an emotional transition is identified, and the preceding interim text regions before the emotional transition are grouped as a final text region for the set of final text regions, and then analysis then repeats through the remaining interim text regions to determine all final text regions.

In one embodiment, generating or determining a text region emotional data profile for each of the text regions in the final set comprises any one or more of the following:
  aggregating or summing the individual segment emotional data profiles of the text segments of the text region or combining or summing the individual interim text region emotional data profiles of the text region,
  selecting a prevailing or dominant segment emotional data profile or interim text region emotional data profile to represent the final text region, or
  generating a representative text region emotional data profile based on statistical processing of the segment emotional data profiles or interim text region emotional data profiles.

In an embodiment, identifying text regions further comprises adjusting the start and/or end of one or more of the text regions in the final set to align with predetermined reference points within the text and according to predetermined alignment rules. In one example, in the case of speech audio representing an audiobook, the predetermined reference points may comprise data indicative of paragraph or chapter boundaries, and the start and/or end of one or more of the text regions may be adjusted to align with the closest paragraph or chapter boundary based on predetermined alignment rules. In one configuration, the re-alignment of the start and/or end of the text regions may comprise re-allocating one or more sentences of the text region to an adjacent text region or obtaining one or more sentences into the text region from an adjacent text region.

In one embodiment, the step of processing an accessible audio database or databases comprising audio data files and associated audio profile information to select an audio data file for playback in each audio region comprises translating the region emotional profiles of the text regions into a format or data set that is comparable to the audio profile information of the audio data files in the audio database or databases. In another embodiment, the method comprises translating the audio profile information of the audio data files is into a format or data set that is comparable to the region emotional profiles.

In another embodiment, the method comprises translating both the region emotional profiles and audio profile information into a common format or data set so they can be compared for a match. In another embodiment, the method comprises processing an accessible audio database comprising audio data files having associated audio profile information that is in the same format or is at least partly directly comparable to the format of the region emotional profiles. In one such embodiment, the audio data files of the audio database comprise audio profile information that comprises an emotional data profile determined and/or defined according to or based on the continuous emotional model.

In an embodiment, the method further comprises signal processing the speech audio to generate pitch and/or pace information relating to the spoken words. In this embodiment, the emotional profiles of the text segments and/or text regions may be supplemented or augmented with the pitch and/or pace information to enhance the emotional profiles of the associated audio regions and audio file selection process for the audio regions.

In an embodiment, the method further comprises selecting an audio data file from the database for an audio region based on one or more configurable music-selection filters. By way of example, the music-selection filters may comprise any one or more of the following:
  genre music-selection filters
  style music-selection filters
  text-based music-selection filters
  user-based music-selection filters
  musical-characteristic music-selection filters
  playlist music-selection filters
  rating or machine-learning music-selection filters In an embodiment, the audio database comprises audio data files having associated emotional data profiles that are generated based on a profiling tool that is configured to receive one or more profile dots selected in a graphical user interface displaying a graphical representation of the continuous emotion model by a listener of the audio file.

In an embodiment, the method further comprises applying semantic analysis to the processed text and/or identified text regions based on one or more thematic category identifiers to generate segment thematic profiles for the text segments and/or region thematic profiles for the identified text regions. In this embodiment, the semantic processing may be based on thematic lexicons representing each of the thematic category identifiers.

In an embodiment, the method comprises generating, for each text segment, a segment emotional and thematic data profile based on the continuous emotion model and the one or more thematic category identifiers.

In an embodiment, the method comprises identifying a series of text regions each comprising a text segment or plurality of text segments having an emotional association and/or thematic association based on processing the segment emotional and thematic data profiles with respect to predefined rules.

In an embodiment, the method comprises generating, for each identified text region, a region emotional and thematic data profile based on the emotional and thematic profiles of the text segments within the text region.

In an embodiment, the method further comprises processing the identified text regions to generate a thematic data profile for each region based on one or more thematic category identifiers, and generating a region emotional and thematic data profile for each text region and its associated audio region.

In an embodiment, the method comprises processing the accessible audio database or databases to select an audio data file for playback in each audio region based at least partly on the audio profile information of an audio data file corresponding or matching closely to the region emotional and thematic profile of the audio region.

In an embodiment, the method comprises generating further audio data for each audio region defining any one or more of the following additional audio playback effects or settings:
  transitional playback effects between audio regions based on configurable predefined rules such as, but not limited to cross-fade, fade-in, and/or fade-out effects for the playback of the audio data file in each audio region, and/or
  looping settings to define how the audio data file should loop should its duration be shorter than the playback duration of its associated audio region during playback,
  offset start and/or stop settings that are configured to start and/or stop playback of an audio file (e.g. music file) for an audio region at offset playback time positions within the audio file relative to the start and/or end times that define the conventional playback duration of a music file. For example, the settings may be configured to initiate playback of the music file from 30 seconds into the audio track playback, and/or cease 30 seconds before the natural end point in the playback of the audio track. In some embodiments, the offset start and/or stop time settings may be configured to be selectively ignored or enforced, depending on the playback device, the particular music track, the particular source of the audio or music (e.g. streaming music service), profile or subscription status of end user, and/or or territory in which the soundtrack is played.

In an embodiment, the method comprises generating a soundtrack data file or files comprising the data indicative of the generated audio regions comprising the start position and stop position, and audio data representing the audio file or files selected for playback in each audio region and any associated configured audio playback effect data for the audio region. In an embodiment, the soundtrack data file further comprises data representing the region emotional profile generated for each audio region.

In an embodiment, the audio data may comprise the audio files or links or file path information to the audio files.

In one embodiment, the method comprises generating a soundtrack data file separate to the speech audio file or files. In another embodiment, the method comprises integrating or packaging the generated soundtrack data file or files with the speech audio file or files. In another embodiment, the method comprises generating a single audio or data file comprising the speech audio and associated generated soundtrack for playback. In one form, the audio may be multi-layered with one sound layer comprising the speech audio, and another sound layer comprising the generated soundtrack as defined by the soundtrack data file or files.

In an embodiment, the audio regions of the soundtrack are music regions intended to play background music. In one embodiment, the soundtrack comprises a single layer or type of music audio regions configured for continuous playback such that each audio region plays sequentially, and optionally comprises transitional playback effects between adjacent audio regions such as cross-fades and/or fade-in/out effects. In another embodiment, the soundtrack comprises a plurality of layers of different types of audio regions, at least one of which is a music layer of music audio regions and the method is applied to generate the music audio regions.

In one embodiment, the method may be applied to the entire speech audio to generate a soundtrack of a series of music regions for the entire speech audio. In another embodiment, the method may be applied to a portion or portions of speech audio, to create soundtrack or music regions specifically for one or more desired portions of the speech audio.

In one embodiment, the soundtrack may be continuous or substantially continuous with no or minimal playback gap between adjacent audio music regions. In alternative embodiments, the soundtrack may be configured with muted portions or gaps between adjacent audio music regions, for example based on predetermined rules.

In an embodiment, the soundtrack comprises a single layer of music audio regions configured for continuous playback such that each audio region transitions to the next audio region taking into account musical key or tonality changes that are harmonically compatible among each other.

In an embodiment, the method may be configured to generate pre-rendered soundtracks ready for playback. In another embodiment, the method may be configured to operate on demand to generate soundtracks for text in real-time.

In an embodiment, the method may be operable to generate a soundtrack for pre-recorded or pre-generated speech audio of any nature, whether speech audio representing an audiobook, theatrical speech, performance arts, podcast, broadcast audio, audio tutorial, or other formal or informal voice recordings, and whether standalone speech audio or whether the speech audio is extracted from other multimedia content or video content for example.

In an embodiment, the speech audio is an audiobook and the speech regions correspond to narration regions in the audiobook.

In one configuration, step (f) of generating the soundtrack data representing the created soundtrack for synchronised playback with the speech audio comprises:
receiving the data defining the generated audio regions and the audio data associated with those audio regions that are configured for synchronised playback with corresponding narration regions in the audiobook playback timeline; and configuring each audio region to have a position along the soundtrack timeline that is dynamically adjustable to maintain synchronization of the audio regions of the soundtrack with their respective narration regions in the audiobook based on a narration speed variable indicative of the playback narration speed of the audiobook.

In a second aspect, the invention broadly consists in a method of automatically generating a digital soundtrack intended for synchronised playback with associated speech audio, the method executed by a processing device or devices having associated memory, the method comprising:
syntactically and/or semantically analysing text representing or corresponding to the speech audio at a text segment level to generate an emotional profile for each text segment in the context of a continuous emotion model; and
generating a soundtrack for the speech audio comprising one or more audio regions that are configured or selected for playback during corresponding speech regions of the speech audio, and wherein the audio configured for playback in the audio regions is based on or a function of the emotional profile of one or more of the text segments within the respective speech regions.

In a third aspect, the invention broadly consists in a method of automatically generating a digital soundtrack intended for synchronised playback with associated speech audio, the method executed by a processing device or devices having associated memory, the method comprising:
syntactically and/or semantically analysing text representing or corresponding to the speech audio at a text segment level to generate an emotional profile for each text segment at least partly based on scanning the word or word concepts in the text segment relative to a predefined number of emotional category lexicons;
analysing the emotional profiles of the text segments to group those having an emotional association into larger text regions of multiple adjacent text segments; and
generating a soundtrack for the speech audio comprising audio regions that are configured for playback during the corresponding speech regions of the speech audio, and wherein the audio configured or selected for playback in the audio regions is based on or is a function of the emotional profiles of the group of text segments within the respective associated speech regions.

In a fourth aspect, the invention broadly consists in a method of automatically generating a digital soundtrack intended for synchronised playback with associated speech audio, the method executed by a processing device or devices having associated memory, the method comprising:
identifying emotional-transition points in text representing or corresponding to the speech audio based on syntactically and/or semantically analysing the text in the context of a continuous emotion model;
defining a series of audio regions for the soundtrack based on the identified emotional-transition points, each audio region corresponding to an associated speech region in the speech audio;
selecting an audio file or files for playback in each audio region based on an emotional profile determined for its associated speech region; and
generating a soundtrack for the speech audio based on the configured audio regions and selected audio files.

In a fifth aspect, the present invention broadly consists in a method of automatically generating a text emotional profile map for text representing or corresponding to speech audio, the method executed by a processing device or devices having associated memory, the method comprising:

(a) receiving or retrieving raw text data representing the text into memory;
(b) applying natural language processing (NLP) to the raw text data to generate processed text data comprising token data that identifies individual tokens in the raw text, the tokens at least identifying distinct words or word concepts;
(c) applying semantic analysis to the processed text data based on a continuous emotion model defined by a predefined number of emotional category identifiers each representing an emotional category in the model, the semantic analysis being configured to parse the processed text data to generate, for each text segment, a segment emotional data profile based on the continuous emotion model; and
(d) generating a text emotional profile map of the text based on and/or comprising the segment emotional data profiles of the text segments.

In an embodiment, the method further comprises identifying or segmenting the processed text data into the series of text segments prior to or during the semantic analysis.

In one embodiment, the method further comprises processing the emotional data profiles of the text segments to identify emotion-transition points in the text and generating representative data for the text emotional profile map.

In one embodiment, the method further comprises identifying a series of text regions comprising a text segment or multiple adjacent text segments having an emotional association by processing the segment emotional data profiles of the text segments with respect to predefined rules, and generating representative data for the text emotional profile map.

In a sixth aspect, the invention broadly consists in a method of generating a digital soundtrack intended for synchronised playback with associated speech audio, the soundtrack comprising one or more audio regions configured for playback during corresponding speech regions of the speech audio, the method executed by a processing device or devices having associated memory, the method comprising:
  receiving or retrieving a text emotional profile map of text representing or corresponding to the speech audio;
  processing the text emotional profile map to identify a series of text regions (which correspond to speech regions) comprising a text segment or a plurality of adjacent text segments;
  generating audio region data defining the intended audio regions corresponding to the identified text regions, each audio region being defined by a start position indicative of the position in the text at which the audio region is to commence playback, a stop position indicative of the position in the text at which the audio region is to cease playback, and a generated region emotional profile based on the segment emotional profiles of the text segments within its associated text region;
  processing an accessible audio database or databases comprising audio data files and associated audio profile information to select an audio data file for playback in each audio region, the selection at least partly based on the audio profile information of the audio data file corresponding to the region emotional profile of the audio region, and defining audio data for each audio region representing the selected audio data file for playback; and
  generating soundtrack data representing the created soundtrack for synchronised playback with the speech audio, the soundtrack data comprising data representing the generated audio regions and audio data associated with those audio regions.

In one configuration, the text emotional profile map is generated according to the fifth aspect of the invention.

Any of second-sixth aspects of the invention may further comprise any one or more of the following:

In an embodiment, the method comprises receiving or retrieving raw text data representing or corresponding to the speech audio into memory.

In one configuration, the method is applied to pre-recorded or generated speech audio in the form of an audio file or files.

In another configuration, the method is applied to an incoming stream of speech audio, such as a live broadcast, live or real-time audio signal recording, or other incoming audio stream. In this configuration, the method may comprise buffering the incoming stream of speech audio into memory for processing, and continuously generating a soundtrack stream corresponding to the processed buffered audio speech, and delivering or co-ordinating the synchronised delivery or playback of the buffered speech audio and generated soundtrack stream together.

The second-sixth aspects of the invention may also comprise any one or more of the features mentioned in respect of the first aspect of the invention.

In a seventh aspect, the invention broadly consists in a method of delivering a synchronised soundtrack for playback with associated speech audio, the method comprising:
  receiving input data indicative of or identifying speech audio a user is listening to;
  retrieving or generating a soundtrack for the speech audio the user is listening to based on the input data; and
  delivering or playing the soundtrack to the user for playback.

In an embodiment, the method is implemented by a processing device or devices having associated memory.

In an embodiment, the speech audio is an audiobook or podcast or voice recording.

In one form the speech audio is an analogue audiobook.
In another form, the speech audio is a digital audiobook.

In one configuration, the input data indicative of or identifying the speech audio the user is listening to is received via a user operable graphical user interface. In another configuration, the input data indicative of or identifying the speech audio the user is listening to is received via voice commands processed by a device such as an AI assistant or device. In another configuration, the input data indicative of or identifying the speech audio is in the form of a scanned machine-readable code (e.g. barcode or QR code) associated with the speech audio. In another configuration, the input data indicative of or identifying the speech audio is a digital image (e.g. photo) captured of an image associated with the speech audio (e.g. a cover picture of the book associated with the audiobook), and wherein the digital image is image processed to identify the speech audio.

In an embodiment, the method comprises retrieving a pre-rendered soundtrack for the speech audio from a database. In one configuration, the pre-rendered soundtrack is automatically generated or created by any of the previous aspects of the invention above.

In an embodiment, the method comprises automatically generating a soundtrack for the speech audio in real-time using any of the previous aspects of the invention above. In some configurations, the method comprises retrieving previously prepared text emotional profile map data and/or audio definition data generated for the text representing or corresponding to the speech audio.

In an embodiment, the method comprises retrieving electronic text from one or more text sources that corresponds to the speech audio the user is listening to based on the input data, and automatically generating a soundtrack for the speech audio in real-time using any of the previous aspects of the invention above.

In an embodiment, the method further comprises receiving arbitrary or periodic speech audio playback position and/or speed input data relating to the playback position and/or speed of speech audio the user is listening to. In one configuration, the playback data is provided via an operable graphical user interface (e.g. user inputting data indicative of their playback position in the audiobook, e.g. chapter identifier or time position). In another configuration, the playback position and/or speed data is received via voice commands processed by a device such as an AI assistant or device.

In an embodiment, the method comprises controlling the playback position of the soundtrack based on the speech audio playback position and/or speed data.

In an embodiment, the method comprises controlling the playback of the soundtrack based on audio playback control input received via user operation of the operable graphical user interface or voice commands.

In an embodiment, the playback of the soundtrack is synchronised to the user's listening position in the speech audio based on the speech audio playback data.

In one configuration, the method is implemented by a system comprising: a first electronic user device or a first application program configured to receiving input data indicative of or identifying the speech audio the user is listening to;
  a remote server that is configured to retrieve or generate a soundtrack for the speech audio the user is listening to based on the input data and deliver it for playback; and
  the first electronic user device or first application program or a second electronic user device or a second application program being configured to receive the delivered soundtrack from the remote server for playback to the user.

In an embodiment, the first and second electronic user devices or first and second application programs are in data communication with the remote server and optionally also with each other. In some embodiments, the data communication between the user devices or applications programs and the remote server is over the internet or other data network.

The seventh aspect may have any one or more features mentioned in respect of the first-sixth aspects of the invention.

In another aspect, the invention broadly consists in a soundtrack or soundtrack data generated by the method of any one or more of the previous aspects of the invention.

In an eighth aspect, the present invention broadly consists in a method of automatically generating a digital soundtrack intended for playback with an associated stream of speech audio, the method executed by a processing device or devices having associated memory, the method comprising:
  receiving or retrieving an incoming speech audio stream representing the speech audio and moving it through a buffer or buffers in memory for processing in portions;
  generating or retrieving or receiving text data representing or corresponding to the speech audio of each portion or portions of the incoming audio stream in the buffer or buffers;
  syntactically and/or semantically analysing the current and subsequent portions of text data in the buffer or buffers in the context of a continuous emotion model to generate respective emotional profiles for each of the current and subsequent portions of text data moving through the buffer or buffers; and
  continuously generating a streaming soundtrack for playback with the speech audio by selecting and co-ordinating an audio file or files for playback based on processing the generated emotional profiles the portions of text data as the move through the buffer or buffers.

In one embodiment, the method comprises controlling the playback of both the stream of speech audio and streaming soundtrack. In this embodiment, the method further comprises delivering or co-ordinating synchronised playback of the stream of speech audio with the streaming soundtrack once generated. In this embodiment, the playback of the speech audio stream is delayed or buffered in memory until the corresponding streaming soundtrack has been generated for or based on processing of that buffered portion of the speech audio stream. In this embodiment, the method comprise controlling the delivery or playback of both the speech audio stream and soundtrack stream to the end listener or listeners. In this example, the audio file or files selected for playback in the streaming soundtrack for a portion of text data are played back in a synchronised manner with the corresponding portion of speech audio.

In another embodiment, the stream of speech audio is live speech audio. By way of example, the live speech audio is a live conversation or phone call or live speech, and the stream of speech audio is a recording of the live speech audio. In this embodiment, the method comprises controlling the delivery or playback the streaming soundtrack only, as the live speech audio is being heard live by the end listener or listeners. In this embodiment, the streaming soundtrack generated for playback alongside the live speech audio reflects processing of the past captured live speech audio stream.

In an embodiment, the method comprise processing portions of text data of a predetermined or based on predetermined rules. In one configuration, the portions of text data correspond to text regions of a predetermined length. The length of the text regions may be determined based on predefined number of text segments (e.g. sentences, paragraphs, or chapters), predefined number of words, or based on text reference points such as paragraph or chapter boundaries.

In one embodiment, the portions of text data correspond to text regions, and the text regions comprises one or more adjacent text segments of the text data. In one example, each text segment corresponds to a sentence. In this embodiment, the method comprises generating a segment emotional profile in the context of the continuous emotion model for each text segment, and the method is further configured to generate an emotional profile for the text region as a function of the individual segment emotional profiles associated with the text segments within its text region.

In an embodiment, the audio file selected for current playback in the streaming soundtrack may be based at least partly on the emotional profile of the current portion of text data being processed. In an embodiment, the audio file selected for current playback in the streaming soundtrack may be based on the respective emotional profiles associated with the current portion of text data being processed and at least one or more of the past portions of text data.

In an embodiment, the method comprises identifying emotional transitions in the text data based on processing of respective emotional profiles of the portions of text data, and further comprises transitioning the playback of the streaming soundtrack to a new audio file upon identifying an emotional transition, the selection of the new audio file for playback being based on the emotional profile of the latest portion of text data processed.

In one embodiment, the method comprises selecting an audio file or files for playback for each portion of text data processed. In one example, the method comprises selecting a respective audio file or files for streaming in the soundtrack for each text region processed.

In one embodiment, the method comprises selecting an audio file or files for playback for a text region that emotionally match or complement the emotional profile of the text region. In another embodiment, the method comprises selecting an audio file or files for playback for a text region that counteract the emotional profile of text region.

In another embodiment, the method comprises selecting an audio file for playback in the current streaming soundtrack based on a moving average of the emotional profiles associated with at least a portion or all of the past text regions processed.

In a ninth aspect, the present invention broadly consists in a method of automatically generating a digital soundtrack on demand for playback with an associated stream of speech audio, the method executed by a processing device or devices having associated memory, the method comprising:
  receiving or retrieving an incoming speech audio stream representing the speech audio;
  generating or retrieving or receiving a stream of text data representing or corresponding to the incoming speech audio stream;
  processing the stream of text data in portions by syntactically and/or semantically analysing each portion of text data in the context of a continuous emotion model to generate respective emotional profiles for each portion of text data; and
  continuously generating a streaming soundtrack for playback with the speech audio by selecting and co-ordinating an audio file or files for playback based on processing the generated emotional profiles the portions of text data.

The ninth aspect of the invention may have any one or more of the features mentioned in respect of the eighth aspect of the invention.

The eighth and ninth aspects of the invention may have any one or more of the features mentioned in respect of the first-seventh aspects of the invention.

In an tenth aspect, the invention broadly consists in a system comprising a processor or processors configured to implement any one or more of the methods of the aspects of the invention above.

In an eleventh aspect, the invention broadly consists in a non-transitory computer-readable medium having stored thereon computer readable instructions that, when executed on a processing device or devices, cause the processing device to perform any one or more of the methods of the aspects of the invention above.

The tenth and eleventh aspects of the invention may have any one or more of the features mentioned in respect of the first-ninth aspects of the invention.

DEFINITIONS

The phrase "speech audio" as used in this specification and claims is intended to mean, unless the context suggests otherwise, audio comprising speech or voice, whether human or computer-generated speech or voice, and including, but not limited to, pre-recorded, pre-generated, or live speech audio, and including speech audio provided in the form of digital audio files or a digital audio data stream or analogue audio recording, and speech audio relating to or extracted from any one or more of the following non-limiting examples: audiobooks, theatrical speech, performance art works, podcast audio, speech audio layer of a movie, broadcast audio such as television or radio, audio or video tutorial, live or recorded conversation or other formal or informal voice or speech recordings.

The phrase "speech region" as used in this specification and claims is intended to mean, unless the context suggests otherwise, a portion of the speech audio, and which corresponds to a text region in text representing or corresponding to the speech audio.

The phrase "audiobook" as used in this specification and claims is intended to mean, unless the context suggests otherwise, any digital audio file or files representing or comprising a voice narration or reading of text, whether the text is electronic text, such as an e-book, or printed text.

The term "token" as used in this specification and claims is intended to mean, unless the context suggests otherwise, a configurable or definable single text element concept or set of text element concepts such as, but not limited to, a word, a word concept represented typically by two or three adjacent words (e.g. 'car park' is a two word concept representing a token), and/or punctuation.

The phrases "hardware system" or "electronic user device" as used in this specification and claims is intended to mean, unless the context suggests otherwise, any form of computing, processing or programmable electronic device, platform or system typically including a processor and memory and including, but not limited to, portable or non-portable consumer electronic devices such as smart phones, cell phones, tablets, smart watches, e-Reader or e-book devices, laptops, and notebooks, gaming machines or consoles, server, smart televisions, Artificial Intelligence (AI) assistant devices or AI computers, general purpose computers such as desktop computers, specific purpose computers, wearable computers or computing devices such as head-mounted displays or eyewear or contact lens or the like, and is intended to include one or more linked or communicating hardware or processing devices or systems which work together.

The phrase "text position" as used in this specification and claims, unless the context suggests otherwise, is intended to refer to a position or location within the electronic text corresponding or representing the speech audio such as typically a line or word or character of the electronic text or any other arbitrary selected position with the electronic text, and the position may be referenced or identified in any suitable manner appropriate to the text (whether printed or electronic), whether indirectly or directly, including but not limited to: an index value, numeric or otherwise, corresponding to the index position of a word or character in the text for text that has been indexed, including a word number, or character number for example; or any other positional reference scheme for identifying locations within electronic text such as text position coordinates, Canonical Fragment Identifier (CFI) values in the context of ePub or other electronic documents or content, or any other text positional reference scheme.

The term "network" as used in this specification and claims is intended to mean, unless the context suggests otherwise, any data network or data communication channel or combination of networks or channels over which a user device may send and/or receive data to another device, whether a remote server or servers or other user devices, including, but not limited to, the internet, an intranet or extranet, a Local Area Network (LAN), and/or a Wireless Local Area Network (WLAN), whether accessed over a wired or wireless medium or a combination of these.

The term "comprising" as used in this specification and claims means "consisting at least in part of". When interpreting each statement in this specification and claims that includes the term "comprising", features other than that or those prefaced by the term may also be present. Related terms such as "comprise" and "comprises" are to be interpreted in the same manner.

As used herein the term "and/or" means "and" or "or", or both.

As used herein "(s)" following a noun means the plural and/or singular forms of the noun.

The invention consists in the foregoing and also envisages constructions of which the following gives examples only.

In the following description, specific details are given to provide a thorough understanding of the embodiments. However, it will be understood by one of ordinary skill in the art that the embodiments may be practiced without these specific details. For example, software modules, functions, circuits, etc., may be shown in block diagrams in order not to obscure the embodiments in unnecessary detail. In other instances, well-known modules, structures and techniques may not be shown in detail in order not to obscure the embodiments.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be rearranged. A process is terminated when its operations are completed. A process may correspond to a method, a function, a procedure, a subroutine, a subprogram, etc., in a computer program. When a process corresponds to a function, its termination corresponds to a return of the function to the calling function or a main function.

BRIEF DESCRIPTION OF THE DRAWINGS

Embodiments of the invention will be described by way of example only and with reference to the drawings, in which:

FIGS. 17A-17C depict the profile or meta-data characteristics of genre, style and emotion respectively into which music files of an audio database are profiled into in accordance with an embodiment.

DETAILED DESCRIPTION OF PREFERRED EMBODIMENTS

Figure 1:
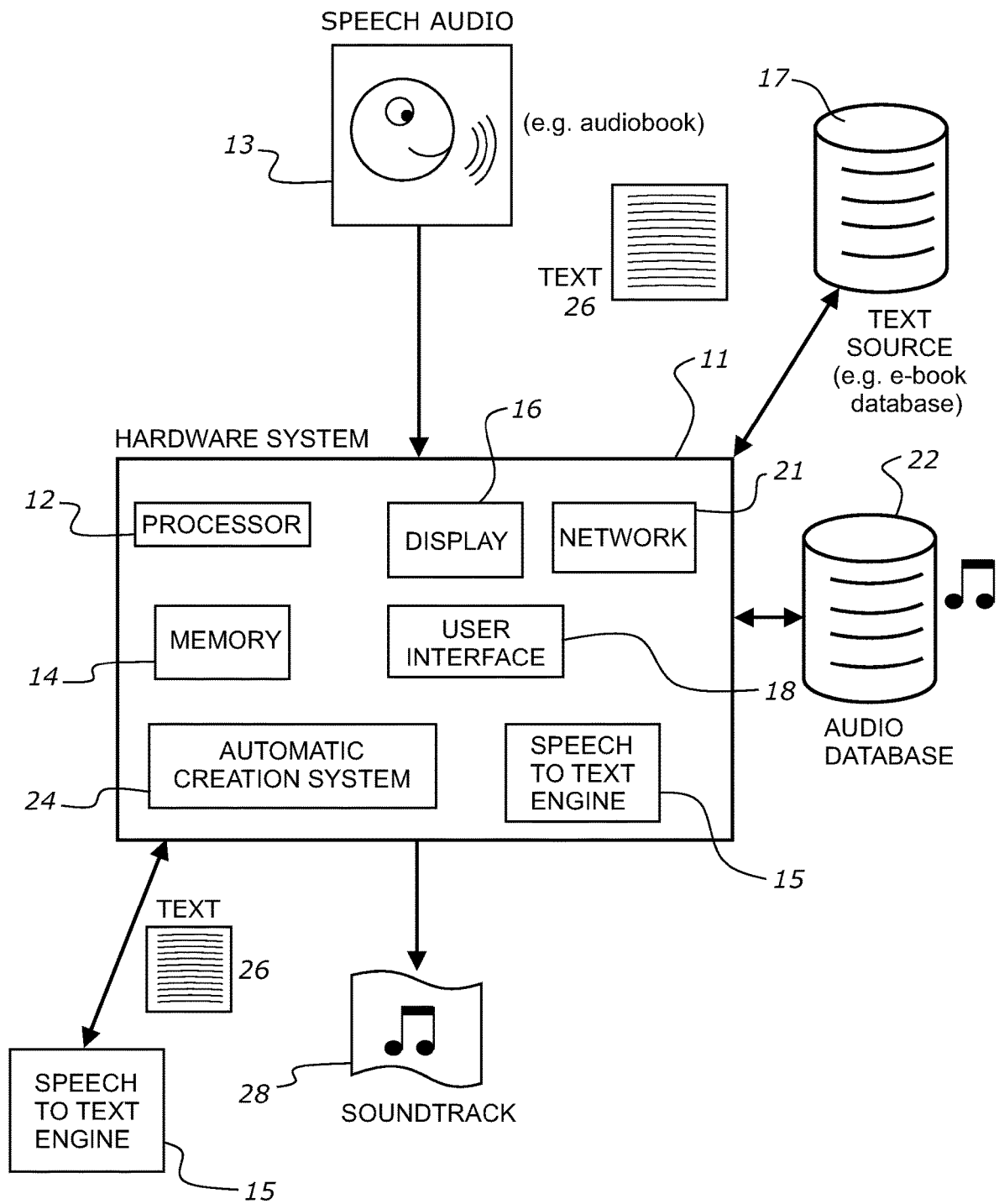
FIG. 1 is a schematic diagram of a hardware system for implementing the automatic soundtrack creation system in accordance with an embodiment.

1. Overview of Synchronised Soundtracks for Speech Audio

The automatic creation systems and methods of this invention may be utilised to create or at least partially create a soundtrack for playing in a synchronized manner with associated speech audio. The systems and methods are configured to analyse text representing or corresponding to the speech audio to emotionally profile the text corresponding to the speech audio, and generate a soundtrack typically comprising selected audio tracks or background music that emotionally match the emotional profile of the speech audio.

By way of example only, a primary embodiment will be described in the context of automatically creating a soundtrack for playback with pre-recorded speech audio in the form of an audiobook to create a soundtrack-enhanced audiobook. However, it will be appreciated that the automatic creation method and system may also be applied to any other pre-recorded or pre-generated speech audio content including a theatrical speech, performance art works, podcast audio, speech audio layer of a movie, broadcast audio such as television or radio, audio or video tutorial, or other formal or informal voice or speech recordings. In further alternative embodiments, examples of which will be described, the automatic creation method and system may also be applied to live or streaming speech audio in real-time.

2. Example Embodiment—Automatic Creation of Synchronised Soundtracks for Audiobooks In this embodiment, systems and methods are described for the automatic creation of soundtrack-enhanced audiobooks or a soundtrack for synchronised playback with an audiobook to enhance the listening experience. It will be appreciated however that this system may be applied to other pre-recorder or pre-generated speech audio content as described above.

The soundtrack created by the system and method is configured for synchronised playback to the events or words or scene being narrated in the audiobook. The soundtrack generated comprises a series of audio regions that are configured for playback at preset or specific start and/or stop times in the audiobook playback timeline. Typically, these preset start and/or stop times in the audiobook correspond to or relate to particular words being narrated, i.e. the audio regions of the soundtrack are triggered or configured to start and/or stop on particular narrated words to thereby create a soundtrack playback that is synchronised or precisely timed with the events being narrated in the audiobook. In this context, the audio regions of the soundtrack may be configured for synchronised playback with a corresponding speech region in the speech audio. The speech regions correspond to narration regions in the context of this audiobook embodiment. Each narration region being defined as the playback time or portion of the audiobook between a narrated start word and a narrated end word. The audiobook may be a narrative reading of an electronic text, such as an e-book, or a printed text, or any other text source.

The audio regions in the automatically created soundtrack are typically music regions of music audio tracks or background music. However, the soundtracks may be further augmented with one or more of different 'types' of audio regions including, but not limited to, ambience or sound effects, either automatically or manually if desired in alternative embodiments. In embodiments in which there are multiple types of audio regions, the playback of the different types of audio regions may fully or partially overlap and play concurrently with each other. In some embodiments, the audio regions are typically linked to a layer in the soundtrack depending on their type. The soundtrack may comprise a single layer, or a plurality or multiple layers, such as a music layer comprising music audio regions, an ambience layer comprising ambience audio regions, and a sound effects layer comprising sound effect audio regions. The automatic creation system can therefore be used to automatically create a soundtrack comprising music audio regions or a single music layer, or can be configured to augment the music layer with different types of audio regions to generate a full multi-layered movie-style soundtrack experience for the listener of the audiobook.

In some embodiments, the audiobook has a variable narration speed setting which enables the listener to alter the pace or speed of the narration in the audiobook. For example, the listener may speed up the audiobook narration speed to listen to the narration at a faster pace or slow down the audiobook narration speed to slow the pace of the narration. Various interface options are available on digital audiobooks to alter the narration speed. Some digital audiobooks are provided with a narration speed setting provided a fixed number of predetermined narration speeds, often being multiplier speed factors relative to a nominal, ordinary or default narration speed (e.g. half speed, three-quarter speed, double speed etc). Other digital audiobooks are provided with a narration speed setting that is configurable along a continuous sliding speed narration scale such that the user can finely tune the narration speed setting. For such embodiments, the soundtracks generated for the audiobooks are provided with a variable duration that is dynamically adaptable to the narration speed setting or narration playback speed of the audiobook without altering the pitch or pacing (e.g. bpm) of the soundtrack playback.

2.1 Overview of Automatic Creation System and Method

As noted above, the automatic creation system and methods will be described by way of example only in the context of automatically generating a soundtrack at least comprising music audio regions or a music layer. The ultimate soundtrack delivered or provided for synchronised playback with the audiobook may either simply comprise the single layer of music audio regions or may be combined with one or more additional different layers of audio regions such as, but not limited to, ambience layers or sound effect layers for example.

Referring to FIG. 1, the automatic creation system may be implemented on any suitable hardware system or electronic user device 10. The system 10 typically comprises at least a processor 12 and associated memory 14 for executing or implementing the automatic creation algorithms and data processing. Optionally, the user device 10 may further comprise a display 16, user interface 18, and network or communications interfaces 20 as is typical with many computing or electronic processing platforms. The system 10 may also comprise an integrated audio database 22 of audio files, such as music files, and/or may be able to access or communicate with one or more remote audio databases or audio servers or cloud-based audio application streaming service over a data communication link or network such as the internet.

The automatic creation system 24 may be executed or implemented on the system 10, and may be in the form of software or other computer-readable instructions executable by the processor. As will be described, the system 10 is operable to receive or retrieve or generate electronic text 26 representing or corresponding to the speech audio 13 (e.g. audiobook) for which a soundtrack is to be produced or generated, and then execute the automatic creation algorithms of the automatic creation system 24 to generate the soundtrack 28. As will be explained, various configurations enable the automatic creation system 24 to retrieve or receive or generate electronic text 26 representing or corresponding to the speech audio. In some modes, one or more speech-to-text engines 15 may be employed, and in other modes the electronic text may be received from external or remote text sources 17 over a data communication link or data network.

Figure 2:
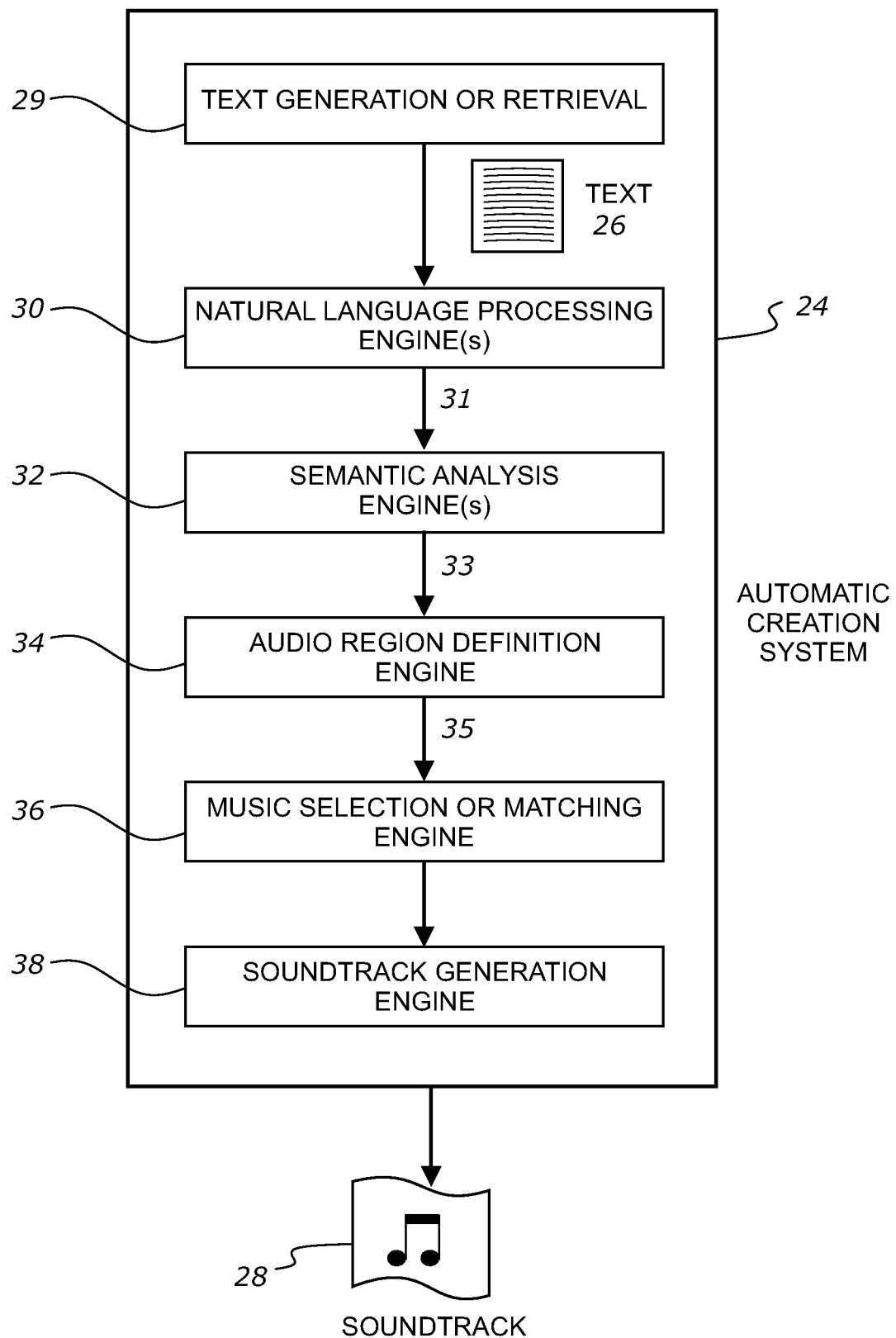
FIG. 2 is a schematic diagram showing the main modules of the automatic soundtrack creation system in accordance with an embodiment.

Referring to FIG. 2, the main or primary modules of functions of the automatic creation system 24 will be described.

In this embodiment, the automatic creation system 24 comprises a text generation or retrieval engine or module 29 that is configured to receive or retrieve or generate raw text data 26 in electronic form representing or corresponding to the speech audio (e.g audiobook) 13 for which the soundtrack is being created. As will be explained, depending on the mode of operation, the text module 29 may operate a local or remote speech-to-text engine to process the speech audio to generate the associated electronic text being spoken or otherwise source the electronic text from a local or external text source 17.

In this embodiment, the system 24 comprises one or more natural language processing (NLP) engines or modules 30 that are configured to process the raw text data or electronic text 26 from the text module 29 to generate processed text data 31 ready for semantic analysis. The processed text data 31 may for example identify the individual sentences and tokens within those sentences in the raw text data. As will be explained, the tokenization parameters may be customised or controlled to determine what constitutes a distinct token, but typically the tokens at least represent the distinct individual words and/or word concepts in the text, and optionally also punctuation.

The processed text data 31 is received and processed by one or more semantic analysis modules or engines 32 that are configured to generate segment emotional data profiles 33 for individual text segments of the text. In this embodiment to be described by way of example only, the text is segmented into text segments representing the individual sentences of the text or a series of text segments is otherwise identified. As such, the segment emotional data profiles correspond to sentence emotional data profiles in this embodiment. However, it will be appreciated that the automatic creation system and method may also be applied based on alternative segmenting schemes such that the granularity or resolution of the segmenting can be altered. For example, alternative embodiments include, but are not limited to, segmenting into text segments according to a predetermined number of words or sentences, or segmenting based on paragraphs or chapter boundaries or other text reference boundaries (in the context of speech audio representing a narrated book, e.g. audiobook) such that text segments represent respective paragraphs or chapters of text. In another embodiment, identifying text segments or segmenting the processed text data into a series of text segments is achieved by signal or audio processing the speech audio and determining text reference points in the speech audio based on analysis of the delay or time interval between spoken words in the speech audio, and segmenting based on those text reference points. In one example, the audio analysis may be configured to detect or identify delays or time intervals corresponding to text reference points that represent any one or more of the following: end of a sentence, end of a paragraph, or end of a chapter. By way of example, the delays signifying or identifying the end of sentences, or paragraphs, or chapters are longer relative to the delay between spoken words within the sentence. In this embodiment, the text reference points may be in the form of playback time values in the speech audio, and the method further comprises converting or transforming those times into their corresponding text positions in the processed text data to identify the text segments.

In the embodiment described below, the segmenting and processing is at a sentence level and as such the segment emotional data profiles are referred to as sentence emotional data profiles, but the same principles apply should a different segmenting scheme be used in alternative embodiments. For example, if segmenting into text segments representing chapters, then the segment emotional data profile would represent or correspond the chapter emotional data profile. For clarity of explanation, the embodiment below is described in the context of sentence segmenting and processing, but it will be appreciated that the phrase 'sentence emotional data profile' is an example of a segment emotional data profile in the context of an embodiment in which the text segments are represented by individual sentences.

The sentence emotional data profiles 33 (example of segment emotional data profiles) are received and analysed by the audio region definition engine 34 to identify text region candidates (speech regions) for associated audio regions of the soundtrack. In this embodiment, the audio region definition engine 34 is configured to identify text regions of multiple adjacent sentences (example of text segments) having an emotional association by processing the sentence emotional data profiles 33 with respect to predefined rules. The audio region definition engine 34 is then configured to generate audio region data 35 defining the audio regions corresponding to the identified text regions. The audio region data 35 comprises data indicative of a start text position indicative of the word in the text at which the audio region is to commence playback, a stop text position indicative of the word in the text at which the audio region is to cease playback, and a generated region emotional profile based on the sentence emotional data profiles of the sentences within its associated text region.

A music selection or matching engine or engines 36 are then provided that receive the audio region data 35 from the audio region definition engine. The music selection or matching engine processes the audio region data and audio profile information of audio files from one or more audio databases to either select or identify audio file candidates that correspond or are suitable for playback in the audio regions. The matching or selection is based on identifying a correspondence or match between the emotional profile of the audio region and the emotional profile of the audio files, such that the audio enhances or amplifies the emotion felt by the listener when listening to the speech audio (e.g. audiobook) during synchronised playback of the soundtrack with the playback of the speech audio.

A soundtrack generation engine 38 is provided that receives the audio region data and selected or candidate audio data for each audio region, and generates a soundtrack data file or files representing the automatically created soundtrack 28 for playback. In one configuration, the soundtrack data file or files are provided as separate files for playback by a soundtrack playback engine or device. In another configuration, the soundtrack data file or files are packaged or integrated with the speech audio (e.g. digital audio book file or files) such that the soundtrack is added as a sound layer to the audiobook for playback on a suitable electronic user device or playback system. The audio files may be integrated with the soundtrack data file or files, or alternatively the soundtrack data file or files may contain links or file path information or source information to at least some or all of the audio files for later retrieval (download or streaming) from an audio file source, library or service for playback.

An embodiment of each of the main modules of the automatic creation system 24 will now be explained in further detail by way of example only in the context of this sentence-level segmenting embodiment and in the context of speech audio in the form of an audiobook, but it will be appreciated that these modules also apply and could be adapted to alternative segmenting schemes or speech audio of different types, forms or formats as noted above.

2.2 Text Generation or Retrieval

The text generation or retrieval module 29 of the system may operate in various configurations or modes. The output of the text module 29 is electronic text that represents or corresponds to the words spoken in the speech audio. Referring to FIGS. 3A and 3B example embodiments of some of the modes and configurations will be explained.

Figure 3:
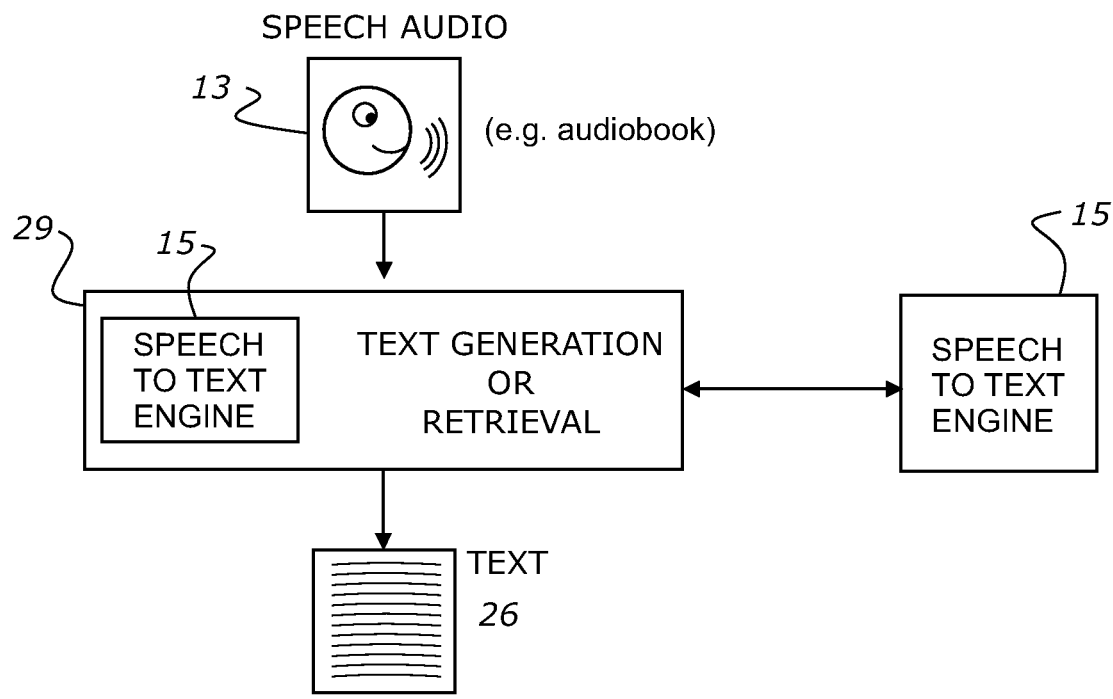
FIG. 3 is a schematic diagram showing a first configuration or mode of the text generation or retrieval module in accordance with an embodiment.

Referring to FIG. 3, in one configuration or mode, the text module 29 is configured to receive the speech audio file or files 13 for which the soundtrack is to be created. In this example, the speech audio is provided in the form of a digital audiobook file. It will be appreciated that the text module may receive the speech audio in any conventional digital audio file format including, but not limited to, MP2, MP3, WAV, AAC, WMA or similar, whether lossy or lossless compression is used. The text module then inputs or sends the digital audio file or files representing the speech audio into a local or external speech-to-text engine 15. The speech-to-text engine 15 is configured to signal process the digital audio files to extract or generate or transcribe text data representing the spoken words in the speech audio, e.g. the narrated words in the context of the audiobook example. In this configuration, the text module 29 extracts or generates the text 26 directly from processing the digital speech audio file. This text data 26 is then output to the next module (e.g. the NLP engine) in the system for text analysis, as will be explained.

Figure 4:
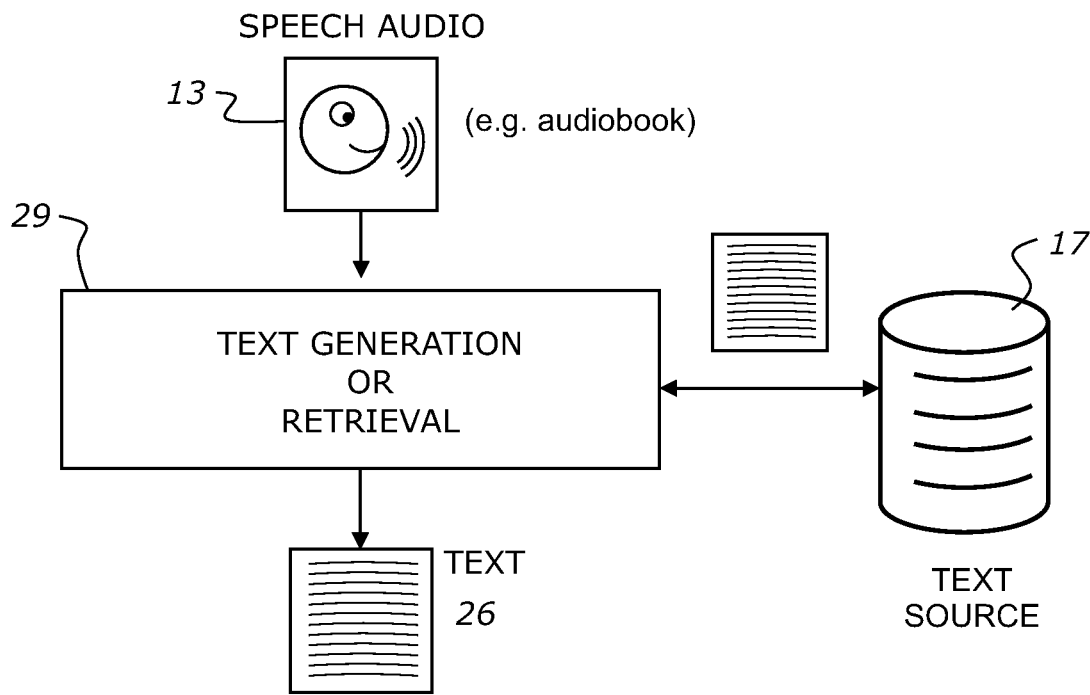
FIG. 4 is a schematic diagram showing a second configuration or mode of the text generation or retrieval module in accordance with an embodiment.

Referring to FIG. 4, in another configuration or mode, the text module 29 is configured to receive the speech audio file or files or input data indicative of or identifying the speech audio file (e.g. in the context of the audiobook example, the input data may be the audiobook title or ID number) for which the soundtrack is to be created. The text module 29 either extracts relevant identification data from the audiobook digital file or alternatively uses the audiobook identification data to locate electronic text representing the speech audio from one or more text sources 17. For example, the text source 17 may be a digital database, website, electronic text or content library, electronic text or content engine or the like. In this embodiment where the speech audio represents an audiobook, and the raw text data may be retrieved from an e-book library or database comprising the e-book that corresponds to the audiobook. In this configuration, the text module 29 is configured to retrieve or receive text data corresponding or representing the narrated words in the audiobook from an external text source relating to the audiobook. As with the configuration of FIG. 3A, this retrieved text data 26 is then output to the next module (e.g. the NLP engine) in the system for text analysis, as will be explained.

2.3 Text Analysis—NLP Engine

Figure 5:
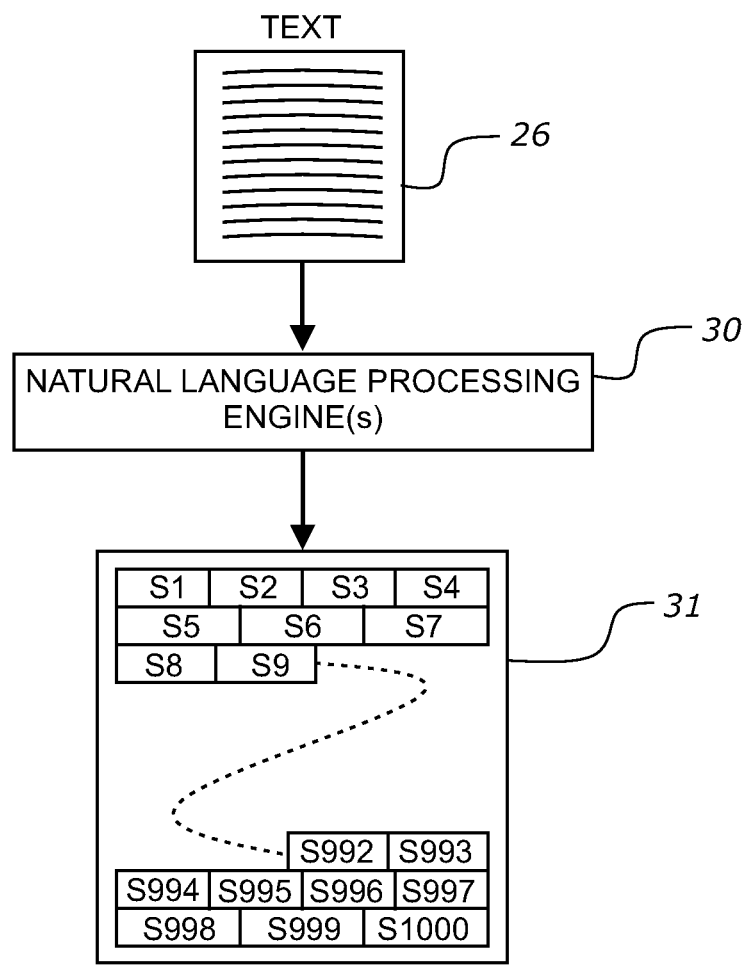
FIG. 5 is a schematic diagram showing the input and output of the natural language processing engine of the automatic soundtrack creation system in accordance with an embodiment.

Referring to FIG. 5, in this embodiment the natural language processing (NLP) engine 30 is configured to process the raw text data 26 representing the text to generate output processed text data 31 that identifies the individual sentences and tokens within those sentences in the raw text data. The NLP engine can be configured to determine how tokenization will be applied based on tokenization control parameters. In this embodiment, the NLP engine is configured such that each word, word concept, and punctuation (e.g. full stops, apostrophes) represent individual distinct tokens. However, in alternative embodiments, it will be appreciated that a lower or higher resolution of tokenization may be applied. In one example, brackets or other characters may be deemed to also be tokens in alternative higher-resolution tokenization embodiments. In another example, syllables may represent individual tokens. In other examples, in which lower-resolution tokenization is applied, only single words may be deemed to represent tokens or only words and a predefined number or list of word concepts (e.g. two or three adjacent words representing a single word concepts) may be extracted as individual distinct tokens.

In one configuration, the NLP engine is configured to apply a series of natural language processing libraries to the raw text such as, but not limited to, those provided by the Apache Software Foundation (ASF). In this embodiment, the NLP engine is configured to use two sets of functionality from such libraries. Firstly, the NLP libraries are used to determine where individual sentences begin and end using Sentence Boundary disambiguation. The NLP engine is then configured to tokenize the text into individual tokens within each sentence based on tokenization control parameters as noted above. Secondly, the NLP libraries are used to apply Part of Speech (POS) tagging to the text. This POS tagging is configured to identify and tag syntactic components for the tokens in a sentence such as, but not limited to, verbs, nouns, adjectives, and prepositions.

The output of the NLP engine is processed text data representing the text that identifies the individual sentences in the text, including their start and end words, and identifies the tokens representing individual words within each sentence. The tokens may also be tagged with their associated POS tag data identifying their syntactic characteristic. In this embodiment, if a token has multiple or no syntactic characteristic, a default POS tag representing 'unknown', although this is not essential.

By way of example only, FIG. 5 shows an example of raw text 26 comprising a thousand sentences being processed by the NLP engine 30. The output processed text data 31 represents the individual sentences S1 to S1000, and the tokens within each sentence. By way of example, the sentence data for the first sentence S1 may comprise a start and end text position value representing or indicative of the position of the start and end tokens (such as words) of the sentence in the context of the overall text. The start and end text position may be a token count value or index value for example, such as S1, start token=1, end token=15, and the sentence data for S1 also comprises data representing the individual 15 tokens within the sentence, and any associated POS tag data.

2.4 Text Analysis—Semantic Analysis Engine

The semantic engine or engines 32 of the automatic creation system 24 receive and process the processed text data 31 from the NLP engine 30 to generate sentence emotional data profiles for each individual sentence in the text. The sentences are analysed and profiled based on a continuous emotion model that is defined by a predetermined number of emotional category identifiers, as will be explained further below.

Continuous Emotion Model

Figure 6:
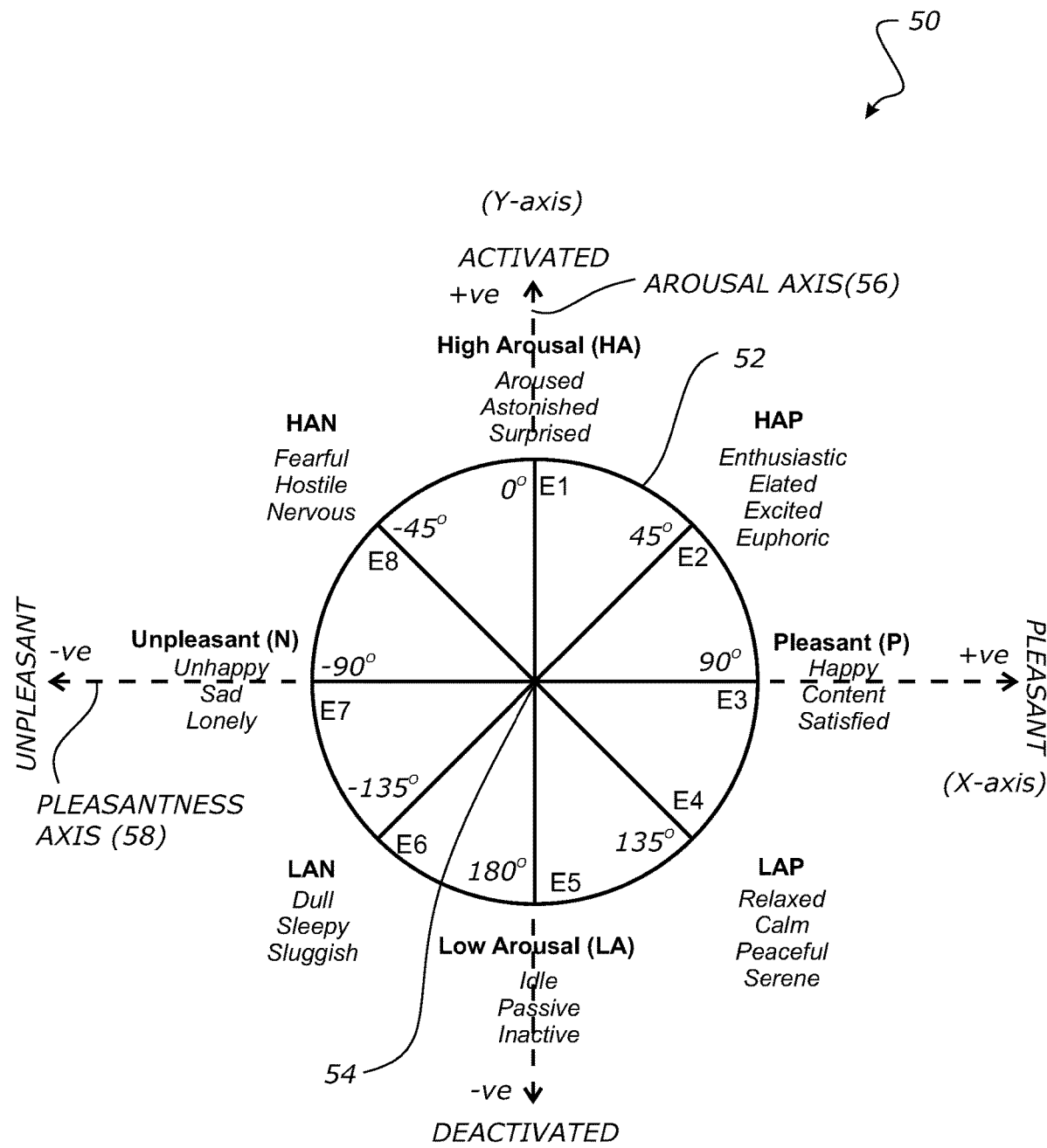
FIG. 6 is a schematic diagram of a continuous emotional model used within the semantic analysis engine of the automatic soundtrack creation system in accordance with an embodiment.

Referring to FIG. 6, the continuous emotion or sentiment model 50 used by the semantic analysis engine is depicted. The continuous emotion model 50 is based on a circumplex and creates a continuum of emotion based on a predetermined number of emotional category identifiers. In this embodiment, the continuous emotion model is based on eight basic sets of emotions or emotional category identifiers, namely: arousal, enthusiasm, fear, idleness, dullness, pleasantness (happy), relaxation, unpleasantness (unhappy). In this explanation, the eight emotional category identifiers of the model 50 are referred to as E1-E8 as shown in FIG. 6.

In this embodiment, the continuous emotion model 50 comprises a 2-dimensional circular reference frame defined by a circular perimeter or boundary 52 extending about a central origin 54, with each emotional category identifier E1-E8 represented by a segment or spoke of the circular reference frame to create a continuum of emotions. In this embodiment, the segments are equal in size or the reference spokes are equi-spaced about the circular reference frame.

In this embodiment, the 2-dimensional circular reference frame of the model 50 comprises a set of two main orthogonal reference axes 56,58 extending from the origin 54 that represent arousal (y-axis 56) and pleasantness (x-axis 58) dimensions. The y-axis 56 represents the 'arousal' dimension and traverses from activated or high arousal/energy at or toward one extreme or end of the y-axis (e.g. at one point on the circular perimeter 52 of the model) to deactivated or low arousal/energy at or toward the other extreme or end of the y-axis (e.g. a diametrically opposed point on the circular perimeter of the model). The x-axis 58 represents the 'pleasantness' dimension and traverses from pleasant or happy at or toward one extreme or end of the x-axis (e.g. at one point on the circular perimeter 52 of the model) to unpleasant or unhappy at the other extreme or end of the x-axis (e.g. a diametrically opposed point on the circular perimeter of the model 50). The arousal axis 56 is configured to divide the circular model 50 into two 'arousal' halves, one representing emotions of activation (positive/+y) and the other representing emotions of deactivation (negative/−y), and the pleasantness axis 58 is configured to divide the circular model into two 'pleasantness' halves, one representing pleasant emotions (positive/+x) and the other representing unpleasant emotions (negative/−x), the pleasantness halves being at an orthogonal orientation with respect to the arousal halves. The segments or spokes associated with the emotional category identifiers E1-E8 are arranged about the circular reference frame according to their position or association with the arousal and pleasantness axes 56,58. In this embodiment, each of the eight emotional category identifiers E1-E8 are represented by a spoke or octant of the 2-dimensional circular reference frame.

In this embodiment, emotional category identifiers E1, E3, E5, E7 are aligned with the main arousal and pleasantness axes, and emotional category identifiers E2, E4, E6, E8 are situated respectively at 45° between the main x and y-axes, and represent a combination of the emotions from the main axes as demonstrated in the following table:

| X-axis (pleasantness) | Y-axis (arousal) | In between main X- and Y-axes |
|---|---|---|
| +x (happy) - E3 | +y (high energy) - E1 | Enthusiasm, euphoria - E2 |
| +x (happy) - E3 | −y (low energy) - E5 | Peaceful, serenity - E4 |
| −x (unhappy) - E7 | +y (high energy) - E1 | Nervosity, hostility - E8 |
| −x ((unhappy) - E7 | −y (low energy) - E5 | Sluggish, sleepy - E6 |

In this embodiment the continuous emotion model 50 is defined by eight emotional category identifiers, but it will be appreciated that the number of emotional category identifiers may be altered if desired. By way of example only, a reduced number such as four emotional category identifiers may be used (e.g. those corresponding to the main arousal and pleasantness axes), or a higher number such as 16 emotional category identifiers may be used should the model be segmented to a higher resolution, or some other suitable number.

The continuous emotion model 50 creates a continuum between the emotions. Any angular position about the circle represents an emotional state that is a function or combination the emotions represented by the one or more emotional category identifiers (spokes) associated with that angular position. The distance from the origin to the outside radius of the circle is taken to indicate an intensity of the emotion. Points mapped into the model that are closer to the origin of this circle represent a low value or intensity of the indicated emotion. Points closer to the radius or perimeter of the circle represent higher or a more intense value of the emotion. In summary, if emotional points or vectors are mapped into the model or reference frame, their angular position relative to the axes represents their emotional state in the continuum defined by the emotional category identifiers, and their distance from the origin or the magnitude of the vector represents the intensity of that emotion.

In this embodiment, the continuous emotion model used by the semantic analysis engine 32 is further defined by or has associated lexicon data representing a set of lexicons or indexes for the emotional category identifiers. For example, a lexicon or index is defined for each emotional category identifier E1-E8. Each lexicon comprises data indicative of a list of words and/or word concepts that are categorised or determined as being associated with the emotional category identifier associated with the lexicon. These lexicons are lists of words and/or word concepts that have been determined as belonging to one or more emotional category E1-E8. By way of example, these lists are typically between 100 to 500 words and word concepts each. The lists of words and word concepts include verb conjugations, plurals/singulars, adjectives and adverbs where appropriate.

In one configuration, the lexicon data may be fixed or static such that the lists in each lexicon are fixed. In an alternative configuration, the lexicon data is dynamic such that it may be modified or updated to thereby selectively modify or adjust the list in each lexicon. In one form, the words and/or word concepts in each lexicon are mutually exclusive such that they only appear in one lexicon. In an alternative form, the words and/or word concepts of each lexicon are not mutually exclusive in that they may appear in more than one lexicon. In this embodiment, at least some words and/or word concepts may be shared between two or more lexicons.

Figure 7A:
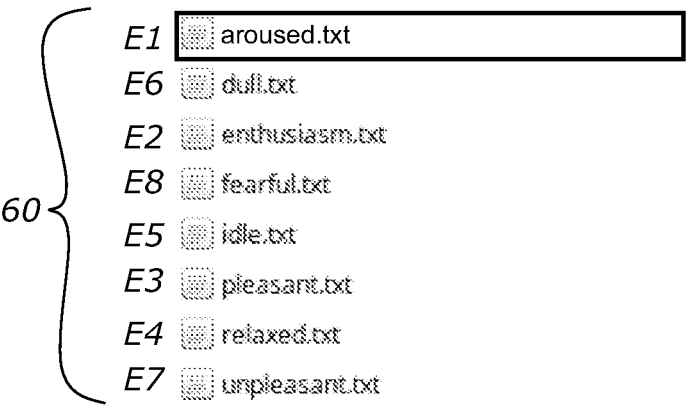
FIG. 7A is a screenshot depicting a set of lexicon text data files associated with the continuous emotional model of the semantic analysis engine.
Figure 7B:
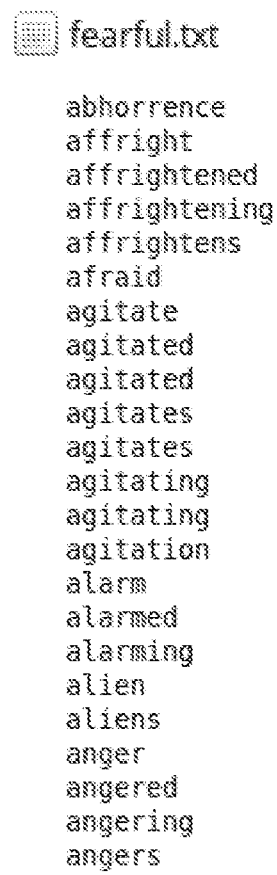
FIG. 7B is a screenshot depicting a portion of the list of words of one of the lexicon text data files of FIG. 7A in accordance with an embodiment.

Referring to FIG. 7A, the lexicon data may be in the form of one or more text or data files (lexicons) comprising the lists of words and/or word concepts. In this embodiment, each of the eight lexicons 60 are defined in respective text data files comprising their respective lists of words and/or word concepts. Referring to FIG. 7B, an example of a portion of the lexicon text file list for the 'fearful' emotional category identifier. As shown, the words in the fearful lexicon all have an association with the emotion of fear.

In one embodiment, each lexicon may comprise a list of words or word concepts associated with the emotional category identifier to which the lexicon defines. In another configuration, each lexicon may comprise a list of words or word concepts, and each word or word concept in the lexicon may configured with one or more lexicon attribute values or identifiers. In an embodiment, each word or word concept may have a lexicon attribute value representing a weighting value or factor that represents how strongly the word or word concept reflects the emotion that the lexicon represents. By way of example, the weighting factor may be set between a value of 0 and 1, but it will be appreciated that any scale may be used. In such embodiments, the weighting value associated with the word or word concept may then optionally be used during the semantic analysis to determine the emotional profile of the text, as will be discussed further below. Additionally, each word or word concept may have a lexicon attribute value representing a syntactic characteristic or identifier associated with the word or word concept. For example, the syntactic identifier may represent the part of speech associated with the word, such as whether it is a noun, verb, adjective, adverb, or other parts of speech, or in the case of a word concept whether it is an idiom or short phrase for example. The syntactic characteristic identifier allows the lexicons to distinguish between the use of words or word concepts being used in different syntactically ways in the speech. In some cases only some syntactic uses of a word may be included in the lexicon, and others included, or if two or more syntactic uses of the same word are included in the lexicon, each is distinct any may have its own distinct weighting factor or value applied. For example, noun-usage of a word might be given a higher weighting than its verb-usage, or vice versa, or they may be given the same weighting, depending on how the lexicon is configured.

Semantic Analysis—Overview

Figure 8:
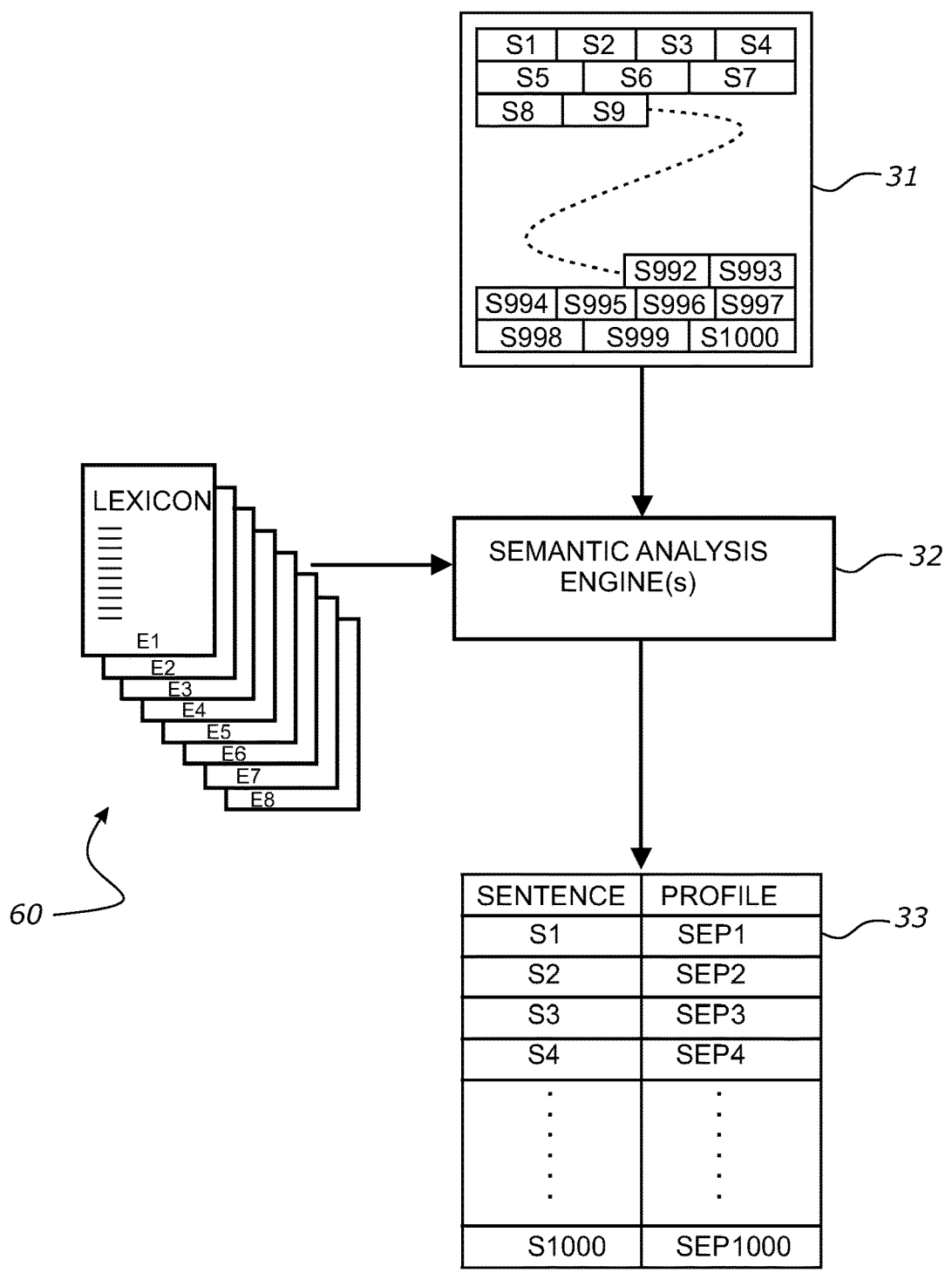
FIG. 8 is a schematic diagram showing the input and output of the semantic analysis engine of the automatic soundtrack creation system in accordance with an embodiment.

Referring to FIG. 8, the semantic analysis engine 32 is configured to receive the processed text data 31 from the NLP engine 30 as previously discussed. The semantic analysis engine 32 is configured to perform one or more parses of the text based in the input lexicon data sets 60 to generate sentence emotional data profiles for each individual sentence in the text. As shown, the output of the semantic engine is a data set 33 comprising a sentence emotional data profile for each sentence. For example, analysis of sentence S1 generates an associated sentence emotional data profile SEP1, and S2 generates associated profile SEP2, and so on for each sentence. The sentence emotional data profiles 33 output may be absolute profiles or relative profiles adjusted based on a baseline statistical values of the entire text, or both, as will be further explained below.

Absolute Sentence Emotional Data Profiles

In this embodiment, the semantic analysis engine 32 is configured to parse each sentence in the text and generate a respective absolute sentence emotional data profile that represents for each emotional category identifier the absolute count or frequency of words in the sentence corresponding to the associated lexicon. For example, when processing a sentence, the semantic engine is configured to provide a counter for each emotional category identifier. The semantic engine 32 then scans through each token or just tokens representing words or word concepts in the sentence. If a scanned token belongs to one or more emotional categories E1-E8 (i.e. the token represents a word or word concept that matches or corresponds to one or more of the associated lexicons), then the associated counters for those emotional categories are incremented in the sentence emotional data profile. There may be a default counter value increment (e.g. 1) if a token matches a lexicon word or word concept, or if the lexicons are provided with a weighting value for each word or word concept, then the weighting value may determine the counter increment value (e.g. if the word has a weighting value of 0.5 on a scale of 0 to 1, then the counter will be incremented by 0.5 for example or the default counter value may be modified by some multiplier or function based on the weighting value.

Once a sentence has been processed, the sentence emotional data profile for the sentence is generated in the form of a multi-dimensional data set or data array comprising a plurality of count values, one for each emotional category identifier. Each count value corresponding to the number of words or word concepts in the sentence matching to the lexicon associated with an emotional category identifier. In this embodiment, the semantic engine 32 is configured to count the total number of tokens scanned in the sentence and can generate a sentence emotional data profile comprising a data array of a plurality of frequency values, one for each emotional category identifier. In this embodiment the frequency values are sentence frequency values calculated based on dividing the absolute count values for the sentence by the total number of tokens in the sentence. The frequency values may be expressed as percentages or fractional values. This process is repeated for each sentence to generate a sentence emotional profile for each sentence. As will be appreciated, the count values or frequency values represent a score value for each emotional category identifier in the emotional profile.

In this embodiment, the continuous emotional model 50 is defined by eight emotional category identifiers E1-E8. As such, each sentence emotional data profile is an eight value data set or data array comprising eight count or frequency values, and each count or frequency value corresponds to a respective emotional category identifier. These multi-dimensional data arrays of the sentence emotional data profiles are multi-dimensional representations of the emotional profile of the sentences, with each emotional category identifier E1-E8 representing a distinct dimension within the continuous emotion model 50. The absolute count values or frequency values of the multi-dimensional data set represent or are indicative of the absolute intensity of the sentence for each emotional category identifier.

Baseline Statistical Values for Generating Relative Sentence Emotional Data Profiles In this embodiment, the semantic engine 32 is configured to analyse the entire text to generate baseline statistical values relating to each emotional category identifier E1-E8. The nature of the baseline statistical values calculated may be selected based on the type of absolute sentence emotional data profiles that are generated, for example whether they are generated with count values or frequency values. The baseline statistical values generated are intended to provide a measure of the global or average intensity of each of the emotional categories E1-E8 of the continuous emotion model 50 across the entire text. The purpose of calculating or determining baseline or global data relating to the text is to enable the absolute sentence emotional data profiles to be normalised or scaled based on or as a function of the baseline statistical values to generate relative sentence emotional data profiles. In some embodiments and/or applications, the relative sentence emotional data profiles may be more reflective of the intensities of the emotions expressed in a sentence in the context of the global emotional intensities of the entire text. In some embodiments and/or applications, relative emotional data profiles lend themselves more readily to being able to identify and map true emotional transitions in the text as each sentence is compared to a 'global' or 'overarching' set represented by the text as a whole being the statistical background. In some applications, relative emotional data profiles enable analysis to be conducted in respect of emotional changes relative to a mean, which can take into account the style of the author in the context of text representing an audiobook for example. Various example configurations are explained below for generating relative sentence emotional data profiles.

In this embodiment, the baseline statistical values are calculated for the entire text, and those global values are then used to convert the absolute sentence emotional data profiles into relative ones based on the global values. It will be appreciated that in alternative configurations the baseline statistical values may be calculated at a higher resolution, such as per paragraph or per chapter (in the context of text representing speech audio in the form of an audiobook for example), and the relative sentence emotional data profiles can be calculated based on their associated paragraph or chapter baseline statistical values for example.

First Example Configuration—Relative Sentence Emotional Data Profiles

In a first example configuration, the semantic engine 32 is configured to calculate baseline statistical values for the entire text that represent the mean absolute count value per sentence per emotional category identifier and an associated count value standard deviation value per emotional category identifier. The mean absolute count value for an emotional category is calculated based on summing all the absolute count values for the category from the sentence emotional data profiles, and dividing the total by the number of sentences.

Once the baseline values are calculated, the semantic engine 32 is then configured to convert the absolute sentence emotional data profiles comprising the absolute count values into relative sentence emotional data profiles based on a function of the mean absolute counter values and/or associated standard deviation values per emotional category identifier from the baseline statistical values. In one form, the semantic engine 32 is configured to generate relative sentence emotional data profiles in the form of multi-dimensional data sets comprising relative count values for each emotional category identifier that represent the absolute count value as a function of the number of standard deviations it is from the mean. By way of example, the relative count value for emotional category E1 in a sentence is calculated based on the absolute value of the difference between the absolute count value and the mean absolute count value for E1, divided by the standard deviation for E1. These calculations are applied similarly to all count values across all emotional categories in the sentence emotional data profile, and this process is applied to each sentence emotional data profile.

Second Example Configuration—Relative Sentence Emotional Data Profiles

In a second example configuration, the semantic engine 32 is configured to calculate baseline statistical values for the entire text that represent either:
(a) the global frequency values per emotional category identifier and associated sentence frequency value standard deviation per emotional category identifier calculated based on the global frequency values, or
(b) the mean sentence frequency values per emotional category identifier and associated sentence frequency standard deviation values per emotional category identifier calculated based on the mean sentence frequency values.

The semantic engine 32 is configured to calculate the baseline statistical values for (a) by scanning the entire text and for each emotional category identifier E1-E8 and incrementing a respective global counter value for an emotional category identifier if a token corresponds with its associated lexicon data set. The result of this scanning process is eight global count values, one for each emotional category identifier, that represent the total number of tokens in the text corresponding to the lexicon of each emotional category identifier. The global count values are then converted to global frequency values by dividing each by the total number of tokens scanned in the text. The semantic engine 32 is also configured to generate an associated sentence frequency standard deviation value per emotional category identifier based on the global frequency values.

The semantic engine 32 is configured to calculate the baseline statistical values for (b) based on the frequency values from the sentence emotional data profiles. The mean sentence frequency value for an emotional category is calculated based on summing all the absolute frequency values for the category from the sentence emotional data profiles, and dividing the total by the number of sentences in the text. The semantic engine 32 is also configured to generate an associated sentence frequency standard deviation value per emotional category identifier based on the individual absolute frequency values from the sentence emotional data profiles and the calculated mean sentence frequency value.

Once either of the baseline value sets (a) or (b) are calculated, the semantic engine 32 is then configured to convert the absolute sentence emotional data profiles comprising the absolute frequency values into relative sentence emotional data profiles based on or as a function of the calculated global frequency values and/or associated standard deviation values per emotional category identifier, or based on the mean sentence frequency values and/or associated sentence frequency standard deviation values per emotional category identifier. In one form, the semantic engine 32 is configured to generate relative sentence emotional data profiles in the form of multi-dimensional data sets comprising relative frequency values for each emotional category identifier that represent the absolute frequency value as a function of the number of standard deviations it is from the global frequency value or mean sentence frequency value. By way of example, in one embodiment the relative frequency value for emotional category E1 in a sentence is calculated based on the absolute value of the difference between the absolute frequency value and the global frequency value or mean sentence frequency value for E1, divided by the respective associated standard deviation for E1. These calculations are applied similarly to all frequency values across all emotional categories in the sentence emotional data profile, and this process is applied to each sentence emotional data profile.

Output of Semantic Engine

The output of the semantic engine 32 is a set of sentence emotional data profiles that can be further analysed by the audio region definition engine 34 to configure the audio regions of the soundtrack. As discussed, the sentence emotional data profiles are multi-dimensional data sets, each set having a counter value or frequency value per emotional category identifier. As discussed, the counter values or frequency values may be absolute or converted to relative values based on the calculated baseline or global statistics relating to the entire text. In either case, the values in the multi-dimensional data sets of the sentence emotional data profiles represent absolute or relative intensity values for each emotional category identifier. In some embodiments, the semantic engine 32 may be configured to only calculate and output the absolute sentence emotional data profiles for further processing in the automatic creation process, such as by the audio region definition and music selection engines. In other embodiments, the semantic engine 32 may be configured to calculate baseline statistics as previously discussed for converting the absolute emotional data profiles into relative emotional data profiles, and in such embodiments the further processing may be based on the relative emotional data profiles and/or the absolute data profiles.

As will be further explained, the multi-dimensional data sets of the sentence emotional data profiles (whether absolute or relative) may be cast or mapped or transformed into the 2-dimensional circular reference frame of the continuous emotion model 50 (see FIG. 6). In this embodiment, the continuous emotion model 50 comprises eight emotional category identifiers E1-E8, and this generates an eight-dimensional data set comprising eight emotional intensity values for each sentence. Each of the eight intensity values can be considered as a vector extending from the origin of the 2-dimensional circular reference frame of the model 50. Each of the eight vectors for a sentence can be defined by polar co-ordinates, with the radial length or distance from the origin calculated based on a function of its intensity value (higher intensity being further away from the origin), and the angle dictated by the position of the spoke of the associated emotional category identifier in the reference frame, such as E1=0°, E2=45', E3=90°, E4=135°, E5=180°, E6=−135', E7=−90°, E8=−45°.

Figure 9A:
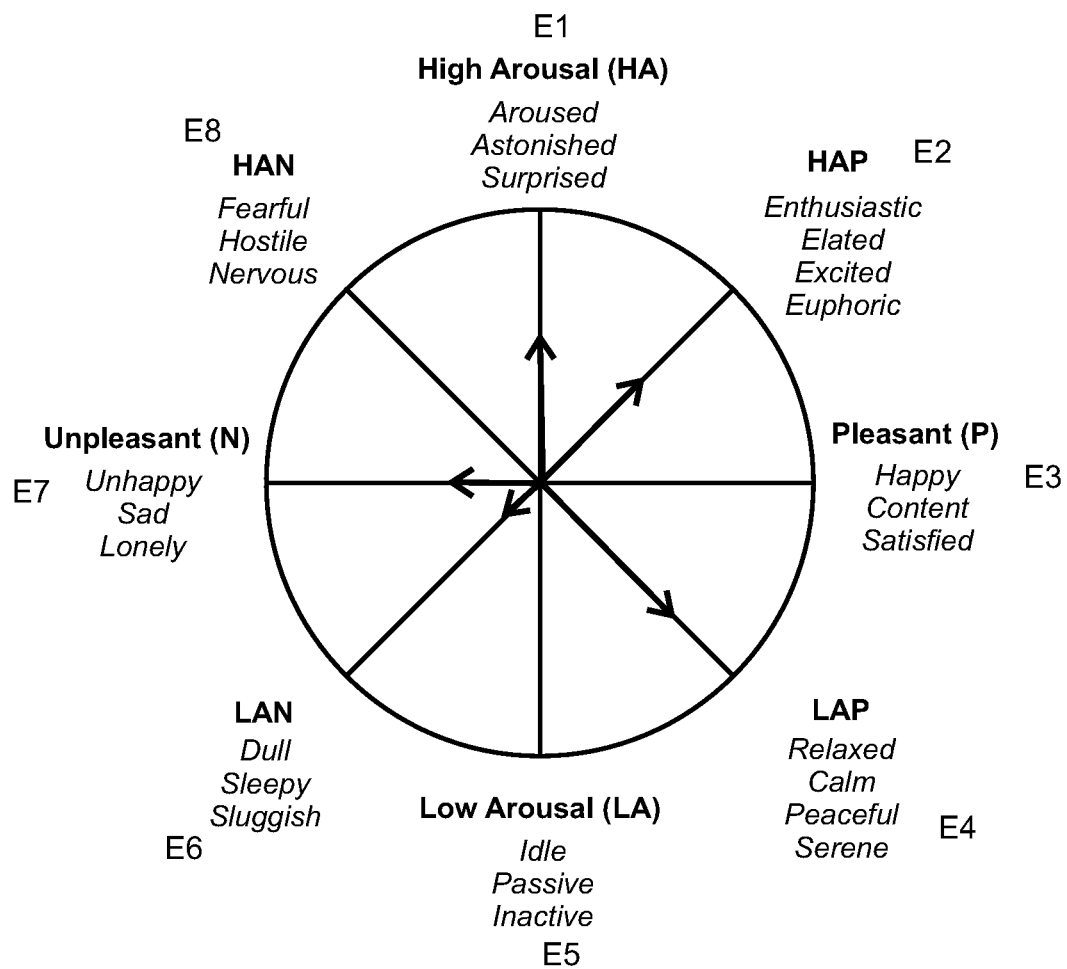
FIG. 9A is a schematic diagram depicting the individual intensity vectors for an example multi-dimensional data set representing the emotional profile for a sentence cast into the 2-dimensional emotion model of FIG. 6 in accordance with an embodiment.
Figure 9B:
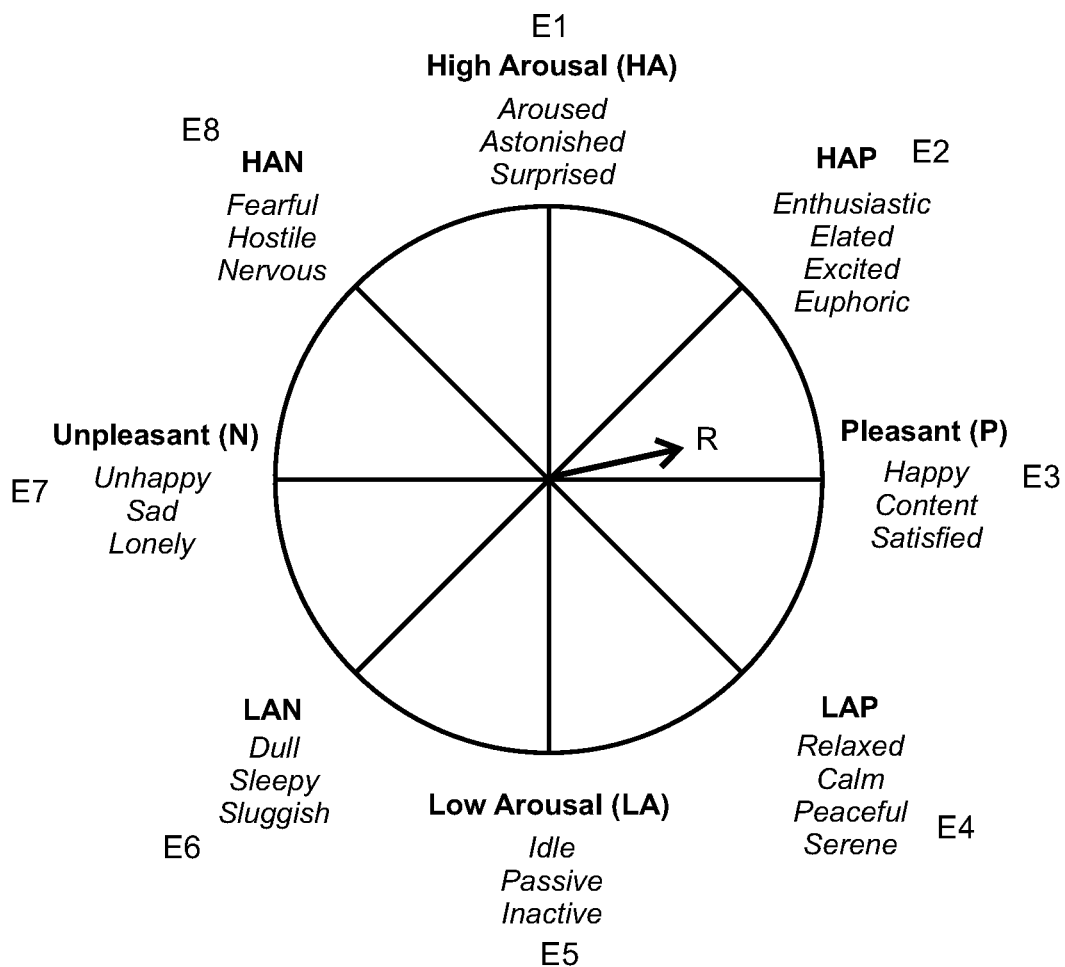
FIG. 9B is a schematic diagram depicting a resultant vector representing the overall emotional profile of the sentence of FIG. 9B cast into the 2-dimensional emotion model of FIG. 6 in accordance with an embodiment.

By way of example, FIG. 9A depicts the individual eight vectors for the sentence emotional data profile of a sentence having the following intensity values {E1=2, E2=2, E3=0, E4=3, E5=0, E6=0.5, E7=1, E8=0}. If an emotional category lacks intensity, its vector is located at the origin with no length. The 8-dimensional data set can also be cast or transformed into a single resultant (R) vector as shown in FIG. 9B, which represents the resultant vector from the summation of the individual vectors of FIG. 9A or can be cast as a single resultant point in the circle defined by 2-dimensional co-ordinates, such as Cartesian coordinates or polar coordinates. By way of example, the 8-dimensional vector can be cast or transformed into a single resultant vector (R) having co-ordinates in a unit circle representation of the circular reference frame of the continuous emotion model 50.

In one configuration, the 8-dimensional vector representing the sentence emotional data profile of a sentence can be cast as a 2-dimensional vector or a point in Cartesian coordinates (x, y) in the unit circle representing the model 50 using a sine/cosine cast. Given the degrees above of the unit circle for the emotional categories, a loop is applies to each of the eight intensity values as follows to generate the resultant (x, y) coordinates of the resultant vector as follows:
  normalize the 8-dimensional vector
  set unit_circle_x=0.0
  set unit_circle_y=0.0
for each of the eight emotional categories do:
  degree_for_emotion is one of the eight degree values above, one for each emotion
  unit_circle_x=unit_circle_x+cosine(degree_for_emotion)*(emotion_vectorlength*0.3+abs(sentiment_value)*0.7)
  unit_circle_y=unit_circle_y+sine(degree_for_emotion)*(emotion_vector.length*0.3+abs(sentiment_value)*0.7)

Therefore, each sentence has the ability to project a resultant vector or be represented by a point in the circular model 50, based on how many tokens it contains corresponding to the lexicons of the eight emotional categories, and optionally relative to the mean and standard deviation values of the baseline statistical values if relative emotional data profiles are used.

In the above example, the 'emotion_vectorlength' represents the raw intensity values for the respective emotional category identifier extracted from the 8-dimensional vector after normalization. In this embodiment, the overall intensity value attributed to the emotional category identifier for the purpose of determining the resultant vector or position is a combination or function of the 'emotion_vectorlength' and a sentiment value ('sentiment_value) calculated or determined for the text segment (in this case a sentence) associated with the 8-dimensional vector being processed. In this embodiment, the sentiment value is a value representing or indicative of whether the text segment represents a positive or negative sentiment. In one configuration, the sentiment value represents whether the text segment is positive or negative, and also an intensity of that sentiment relative to a scale. In one example, the sentiment value is a numerical value on a scale from a first threshold (e.g. −1.0) representing a very negative sentiment to a second threshold (e.g. +1.0) representing very positive sentiment. The sentiment value may be generated by any suitable sentiment analysis tool or engine such as, but not limited to, any of the following sentiment analysis tools or engines: VADER (Valence Aware Dictionary and sEntiment Reasoner), Apache UIMA (part of OpenNLP), Weka, and Python NLTK (NLP toolkit). The sentiment value generated by the sentiment tool represents the emotional value of the sentence (the sentiment judgement). Typically the sentiment value is calculated using an emotional analysis library in the semantic engine 32 that generates or determines a sentiment value for each sentence between −1 and 1 (very negative to very positive). The absolute value of the sentiment value is used in the resultant vector calculation. It will be appreciated that any other suitable form of sentiment value generated by other suitable sentiment analysis tools or engines could be used, some examples of which are provided above.

As shown above, the weighting or scaling of contribution of the raw intensity value and sentiment value to the overall intensity value for the resultant or mapping calculation may be adjusted or configured as desired. In this example, 30% weighting or contribution is applied to the 'emotion_vector.length' value and 70% weighting or contribution is applied to the 'sentiment_value', but these weightings could be reversed or modified as desired. For example, each could have equal weighting, such as 50:50. In further alternative embodiments, the sentiment value may be omitted, such that the resultant vector or co-ordinates are calculated based solely on the 'emotion_vector.length' values (raw intensity values) from the 8-dimensional vector.

Figure 10:
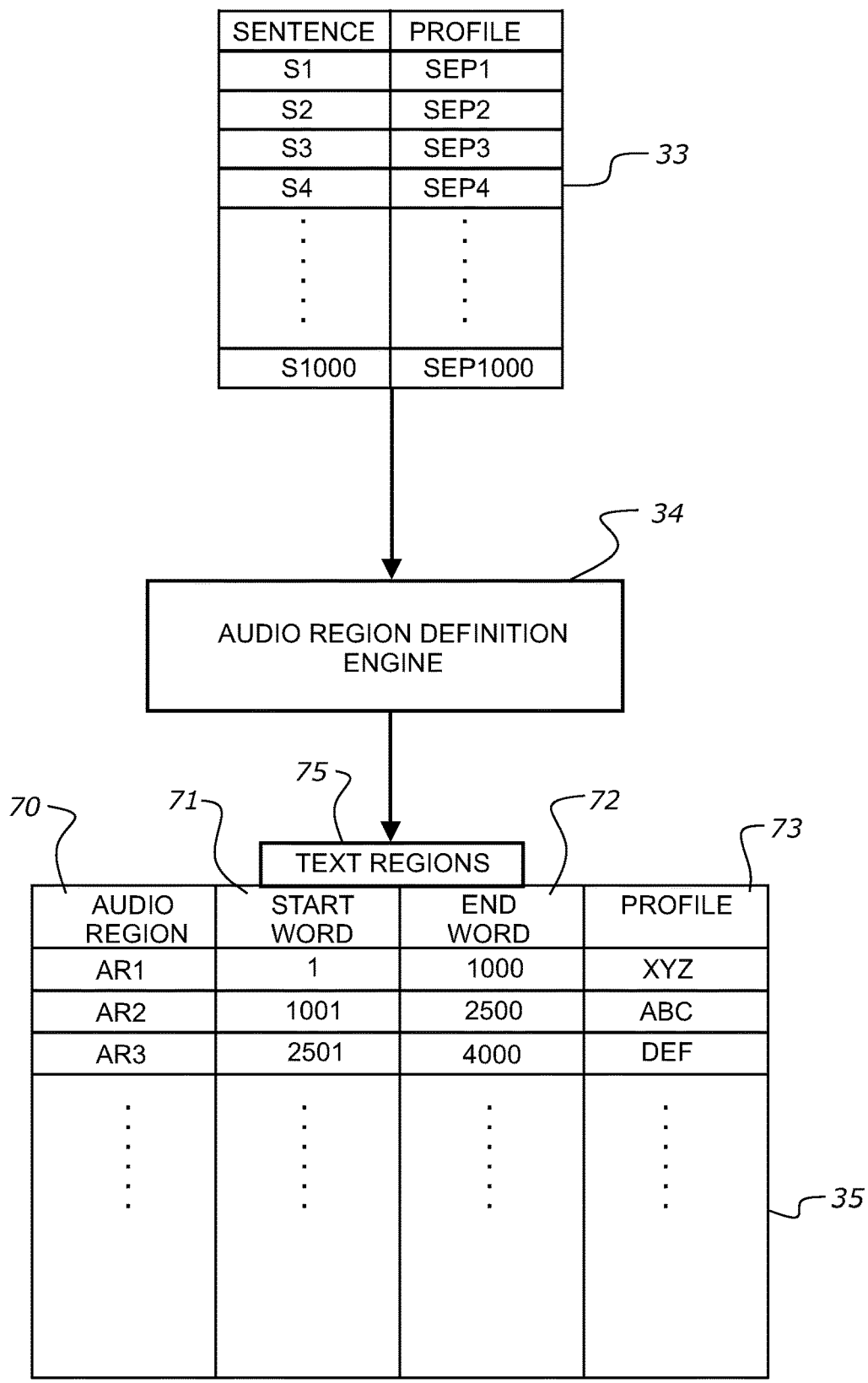
FIG. 10 is a schematic diagram showing the input and output of the audio region definition engine of the soundtrack creation system in accordance with an embodiment.

2.5 Audio Region Definition Based on Text Analysis—Audio Region Definition Engine Referring to FIG. 10, the audio region definition engine 34 is configured to receive the text analysis data 33 generated by the semantic analysis engine 32. The text analysis data may be considered to represent a text emotional profile map of the text representing or corresponding to the speech audio. In this embodiment, the text analysis data 33 comprises the absolute sentence emotional data profiles of the sentences in the text, although it will be appreciated that in alternative embodiments that relative sentence emotional data profiles may be used if baseline statistical values have been calculated as previously described. In this embodiment, the absolute sentence emotional data profiles 33 for each sentence comprise absolute frequency or count values for each emotional category.

The audio region definition engine 34 is configured to analyse the received text analysis data 33 by processing the sentence emotional data profiles to identify text regions of multiple adjacent sentences having an emotional association with respect to predefined rules. The identified text regions define the audio regions of the soundtrack, and the text regions correspond to speech regions in the speech audio. For example, each identified text or speech region generates a corresponding audio region of the soundtrack. The audio regions are configured to playback when their respective corresponding speech region is being played in the speech audio. Based on the identified text regions, the audio region definition engine 34 generates audio region data 35 identifying the audio regions 70 for the soundtrack corresponding to the identified text regions 75. Each audio region data for an audio region has a start text position 71 indicative of the word (or token) in the text at which the audio region is to commence playback, a stop text position 72 indicative of the word (or token) in the text at which the audio region is to cease playback, and a generated region emotional profile 73 based on the sentence emotional profiles of the sentences within its associated text region. The generated region emotional profile 73 for each audio region is intended to define the emotional profile conveyed in that associated speech region or passage of speech audio to enable appropriate matching music or audio to be selected.

An example of an audio region definition algorithm for segmenting or dividing that text into text regions representing groups of multiple adjacent sentences will be explained next. It will be appreciated however that one or more of the steps may be varied or substituted or omitted, in alternative embodiments of the algorithm. The algorithms can divide the text into text regions of adjacent sentences based on identifying reference sentences or regions representing emotional transitions based on thresholds, or grouping adjacent sentences having an emotional association based on predetermined rules or thresholds, or a combination of these techniques.

Example Audio Region Definition Algorithm

Figure 11:
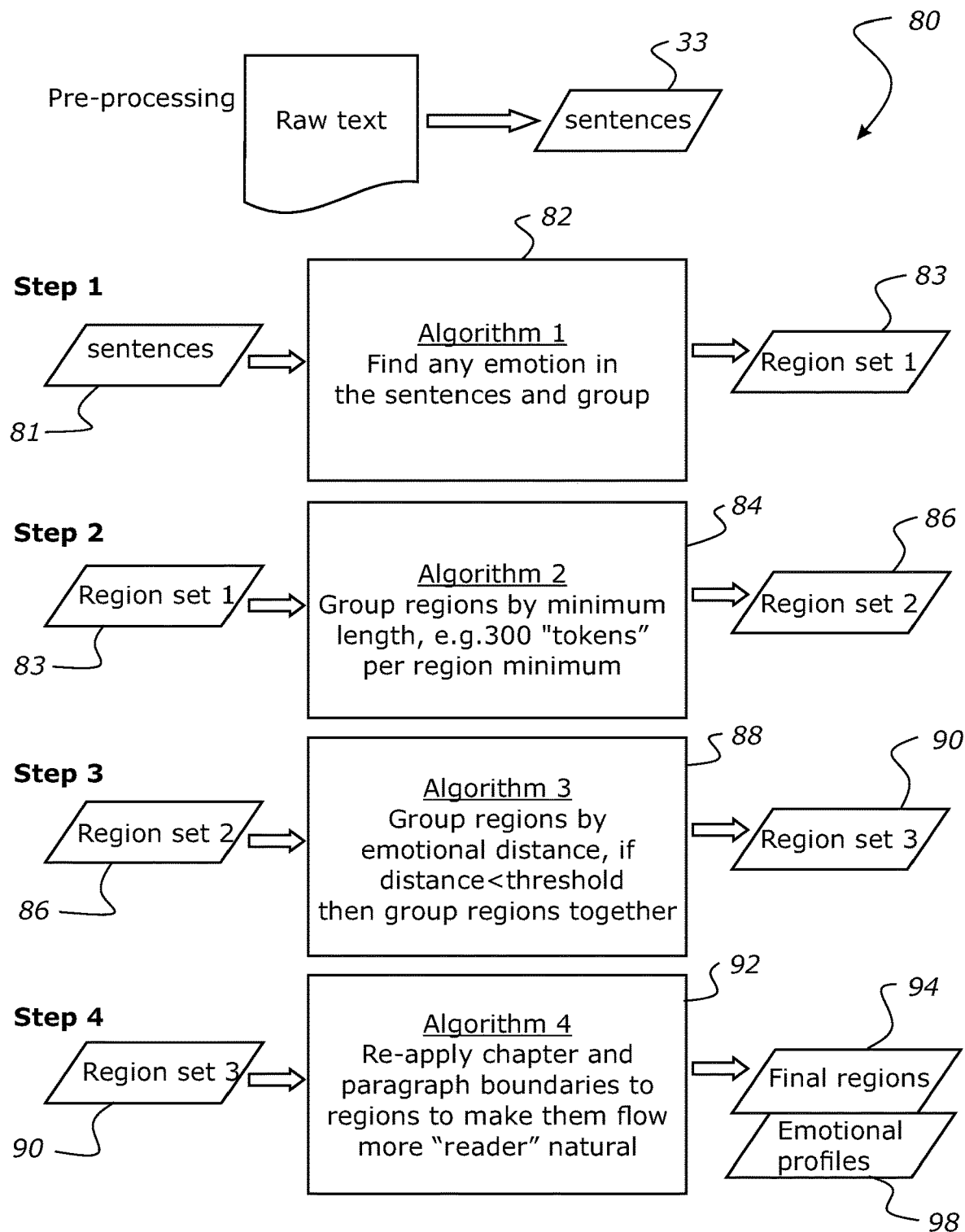
FIG. 11 is a flow diagram of the audio region definition algorithm implemented by the audio region definition engine in accordance with an embodiment.
Figure 12:
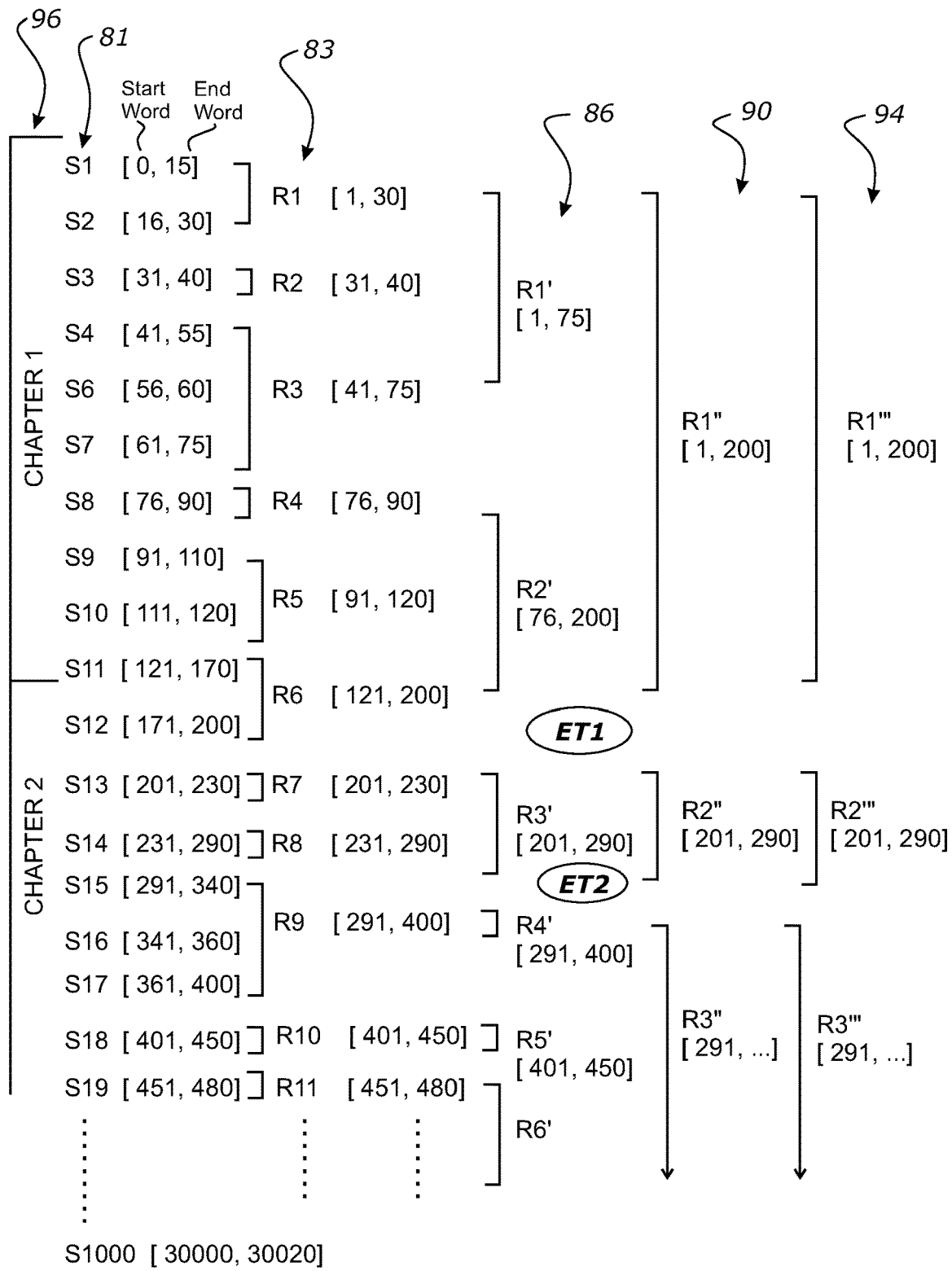
FIG. 12 is a schematic diagram demonstrating an example of the iterative grouping of sentences into larger text regions as implemented by the audio region definition algorithm in accordance with an embodiment.

Referring to FIGS. 11 and 12, an example audio region definition algorithm will be explained. In this embodiment, the algorithm 80 is configured to identify text regions by defining all sentences as an initial set of text regions, and then iteratively grouping adjacent sentences into a set of larger text regions based on analysis of the sentence emotional data profiles and/or other predefined rules.

The algorithm flow and sub-algorithms are shown in FIG. 11, and an example set of sentences (with start and stop words indicated) is shown in FIG. 12 to demonstrate how the algorithm operates to group the sentences into regions, although the numbers used in the example are not representative of true data and are provided for explanation purposes only.

Step 1: Analysing for Neutral Sentences

The algorithm 80 commences with all sentences representing an initial set 81 of text region candidates S1-S1000. A first sub-algorithm 82 is then applied to those sentences to find any region of interest. In this embodiment, this is defined as any sentence of the text that has resultant coordinates in the continuous emotion model (as defined by its respective sentence emotional data profile) that is away from the origin by some predefined threshold, such as 0.001, or one permille of the unit vector length away from the origin). In particular, the first sub-algorithm 82 is configured to group sentences with neutral sentence emotional profiles with adjacent non-neutral sentence emotional profiles. In another configuration, a neutral sentence emotional data profile is determined based on a neutral sentence threshold that is indicative of minimal or neutral emotion being present in the sentence. In one example, a sentence may be considered to have a neutral sentence emotional data profile if its absolute or relative intensity values across all emotional category identifiers are below respective absolute or relative intensity thresholds, such as zero. The result of sub-algorithm 82 is that one or more of the sentences may be grouped together, or more particularly neutral sentences may be grouped with an adjacent non-neutral sentence. This defines a first set 83 R1-R11 of text regions. This sub-algorithm 82 tends to significantly reduce the number of regions relative to the initial set of all sentences being regions, particularly in the context of a text representing an audiobook in which the number of regions can half for example.

Step 2: Applying Size Thresholds

The first set of regions 83 is then applied to a second sub-algorithm 84 that is configured to reduce the first set of text regions into a smaller second set of text regions based on grouping at least some adjacent text regions from the first set into larger text regions until all the text regions in the second set reach a predetermined size threshold. In this embodiment, the size threshold may be a token count or word count threshold value representing a minimum number of words required to be a text region candidate. The size threshold may be configurable based on the type or nature of the soundtrack required, such as the frequency of music changes desired. For example, the automatic creation system may be operable to configure a minimum text region size to add a control to how many audio regions are created and therefore how many music tracks are played back in the soundtrack. By way of example, the minimum length of a text region may be set at say 300 words. This dictates that the listener of the soundtrack will on average hear no more than one new music track for every 300 words spoken in the speech audio. This minimum threshold can also translate into or be configured as a minimum playback time threshold based on the narration speed or nominal playback duration of the audiobook. For example, if the nominal or average narration speed of the audiobook is about 150 words per minute (wpm), then the threshold will dictate that the listener at that narration speed will on average hear no more than one new music track for every 2 minutes of audiobook listening, and a listener listening to audiobook playback at a faster narration speed of say about 300 wpm will on average hear no more than one new music track for every 1 minute of audiobook listening. Therefore minimum time thresholds may be set, and converted back into minimum word or token thresholds based on nominal or average narration speed variables or playback durations or customised narration speed variables or playback durations particular to an end listener of the audiobook and soundtrack.

In FIG. 12, by way of example only, adjacent regions from the first set 83 are grouped together into a second set of larger text regions 86 until they meet the minimum size threshold of spanning 50 words in the text (example threshold only). For example, regions R1 (30 words), R2 (10 words), and R3 (35 words) from the first set are grouped into a new larger text region R1' having a total of 75 words, over the minimum of 50 words. Region R9 of the first set however remains as its own new region R4' in the second set as it comprises 110 words already.

In one form the sub-algorithm 84 is configured to scan through the regions in the first set 83 from the start and increment a token or word counter. As the counter goes over the predefined size threshold, a new text region for the second set 86 is defined as the previous one or more regions in the window prior to that scan point, including the current region that forced the counter over the threshold. Although in an alternative configuration, the current region at that scan point may be excluded from the first new region and be considered as the start of the next scan. Once the first new region of the second set is determined, the algorithm commences a new scan at the next adjacent region of the first set and resets the counter and repeats the process to generate the second new region of the second set, and so on.

Once the sub-algorithm 84 generates or defines all the text regions 86 of the second set, an interim text region emotional data profile is determined for each of the text regions 86. As shown in FIG. 12, each text region in the second set 86 typically comprises a group of two or more adjacent sentences of the text. For example, region R1' comprises seven adjacent sentences S1-S7. The sub-algorithm 84 may be configured via various operating parameters to generate an interim text region emotion data profile for text region R1' based on the seven individual sentence emotional data profiles of the sentences S1-S7 in the group. In this embodiment, the interim text region emotional data profiles are in the same format as the sentence emotional data profiles. For example, the interim text region emotional data profiles are in the form of multi-dimensional data sets comprising intensity values for each emotional category identifier. There are various options for determining the interim text region emotional data profiles based on the group of individual sentence emotional data profiles within the text region including, but not limited to:

- If there is only one sentence in the text region, the interim text region emotional data profile is that of the sentence.
- The interim text region emotional data profile may be generated based on averaging the intensity values in each emotional category across all the sentence emotional data profiles in the group.
- The interim text region emotional data profile may be generated based on summing the intensity values in each respective emotional category across all the sentence emotional data profiles in the group to generate a multi-dimensional data set of summed frequencies, one summed frequency for each emotional category.
- The most prevailing or dominant sentence emotional data profile from the group may be statistically selected to represent the interim text region emotional data profile.
- The most intense emotion from the group of sentence emotional data profiles from the group may be statistically or absolutely selected to represent the interim text region emotional data profile, such as by selecting the sentence that generates the longest resultant vector in the emotional model 50.
- Using other combinations of statistical events such as medians, comparative statistical means such as excessive deviations from the mean to generate the interim text region emotional data profile form the individual sentence profiles in the group associated with the text region.
- Determining the interim text region emotional data profile based on predictive events, such as taking into account the next region and its starting point. For example, the data profile may be selected based on moving across the affective emotional state circle model 50 if the points were only one or two octants apart to provide an emotional continuum experience.

The output of sub-algorithm 84 is the second set of text regions 86 and their associated respective interim text region emotional data profiles determined or calculated from the individual emotional profiles of the groups of adjacent sentences within the text regions.

Step 3: Analysing for Emotional Transitions

In this embodiment, the region determination algorithm 80 is then configured to apply sub-algorithm 88 to further refine the number of text regions in the second set 86 to generate a final set of text regions 90. This sub-algorithm 88 is configured to analyse the interim text region emotional data profiles of the second set of text regions 86 and further group adjacent text regions having an emotional association based on an emotional-transition threshold or thresholds to generate the final set of text regions 90. As will be explained further below, in this embodiment the sub-algorithm is configured to cast or map or transform the multi-dimensional data set of emotional intensities (or a masked or modified version of the data set) representing the interim text region emotional data profiles into a resultant 2-dimensional vector or coordinate point into the circular reference frame of continuous emotion model 50. The sub-algorithm then compares adjacent resultant vectors or resultant coordinate points of adjacent text regions to determine if an emotional association exists based on an emotional-transition threshold or thresholds. In this embodiment, the sub-algorithm 88 compares adjacent vectors based on change in distance from the origin and/or angular movement between the vectors to determine an emotional association. For example, if the change in distance from the origin and/or angular movement between the vectors is under predetermined thresholds, an emotional association is deemed to exist and the associated text regions combined into a larger text region. If the distance change and/or angular movement between the vectors exceeds the thresholds then an emotional transition is identified, and the adjacent regions are not grouped.

Figure 13:
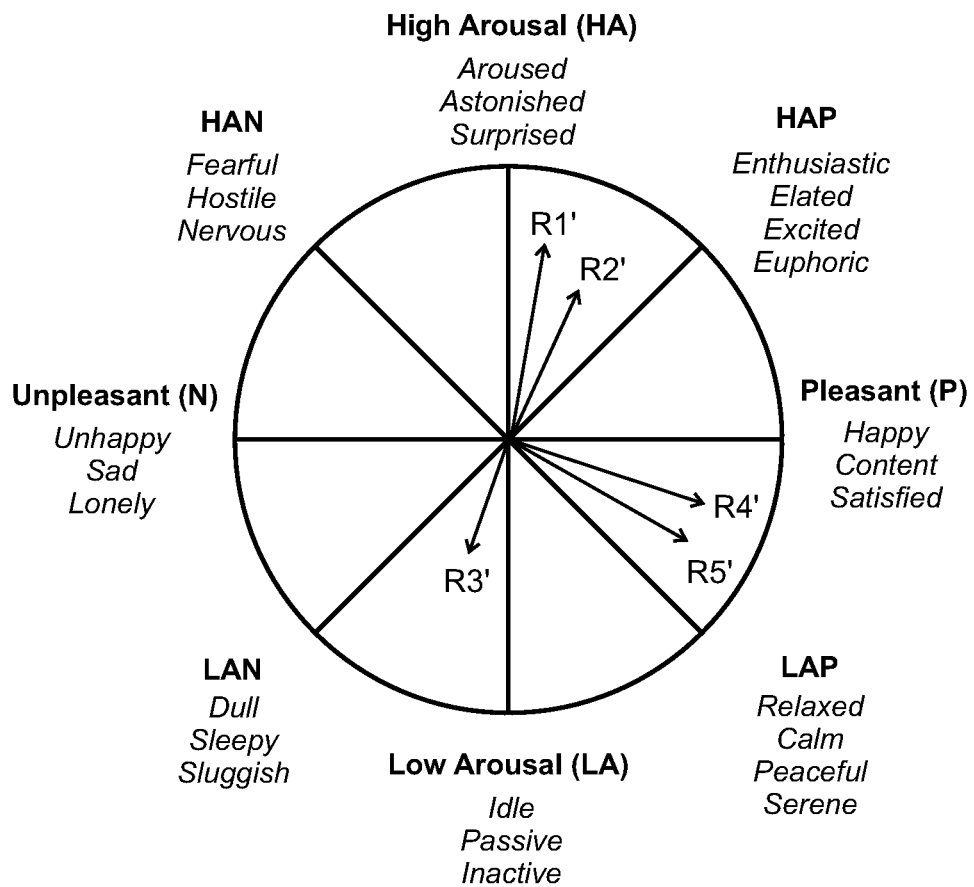
FIG. 13 is a schematic diagram showing the resultant vectors representing the interim emotional profiles of the text regions generated during the audio region definition algorithm being cast into the 2-dimensional emotion model of FIG. 6 in accordance with an embodiment.

In this embodiment, the sub-algorithm 88 commences progressively from the start of the text onwards and iteratively accumulates interim text portions having an emotional association until an emotional transition is identified, and preceding interim text regions before the transition are grouped as a final text region for the final set. The analysis then repeats through the remaining interim text regions to determine all final text regions. Referring to FIGS. 12 and 13, an example of this process is shown. FIG. 13 shows the resultant vectors of the interim text region emotional data profiles of the text regions of the second set 86 mapped or cast in the emotion model 50. In this example, regions R1' and R2' are deemed to have an emotional association within the thresholds but there is deemed to be an emotional transition ET1 at R3'. As such regions R1' and R2' are grouped into a final region R1". Regions R3' and R4' also do not have an emotional association based on the thresholds generating another emotional transition ET2. As such, R3' is deemed to be a final text region R2". Regions R4' and R5' are deemed to have an emotional association and will at least form part of the next final region R3" with any other adjacent subsequent text regions having an emotional association before the next threshold, as the analysis continues.

Optionally, sub-algorithm 88 may also be configured to apply maximum threshold values for the length of the final text regions, to ensure a sufficient frequency of change in audio regions in the soundtrack. The maximum threshold values for the text region lengths may be determined based on word or token counts, or time thresholds, in a similar manner to the minimum length thresholds applied in sub-algorithm 84 above. If sub-algorithm 88 accumulates or groups interim regions together to the extent that the maximum length threshold is breached but no emotional transition is yet identified, the algorithm automatically sets the current group as a final text region, and begins processing the next interim text regions in the same manner to determine the next final text region. Therefore, the maximum threshold provides a control on the size of the final text regions generated, which in turn controls the rate or frequency at which audio region transitions will occur, to prevent the same audio region playing for too long in the soundtrack.

A more detailed example of one particular implementation of the sub-algorithm 88 will be described in the following by way of further explanation.

The sub-algorithm 88 in the third step involves applying a circle movement/distance measurement with a predefined threshold to vectors or points in the emotional model representing the interim emotional profiles of each of the text regions in the second set. If either a change in intensity (the distance from the origin) and/or a change in emotion (the direction of the vector in the unit circle) change beyond a certain threshold between adjacent text regions, those are identified as relevant emotional transitions for defining a new region. Regions that do not meet this threshold are combined together using the combinational steps similar to those applied by sub-algorithm 84 in step 2 of the algorithm 80.

For example, two points in a unit circle, say p1(x,y) and p2(x,y) have a Euclidian distance, defined as distance(p1, p2)=Square root of $((p1.x-p2.x)^2+(p1.y-p2.y)^2)$. If this distance exceeds a threshold, a text region change is applied, i.e. an emotional transition is identified as existing between the regions represented by the points. Likewise a dot product calculation or similar can be used to determine the angular movement or angular change about or relative to the origin between two resultant vectors or points. If the angular change exceeds a threshold, a text region change is also applied.

The sub-algorithm 88 in this implementation is configured to analyse the change (distance or angle) between adjacent vectors or points in the emotion model 50 based on the following. These definitions apply:

(1) The concept of an 8-dimensional emotion or mood vector. As the continuous emotion model 50 splits the moods into octants, and each octant is determined by a predefined list of words (lexicons), the system defines an octant for a single sentence as the frequencies of the words for each of the 8 octants that occur. If a word is shared between two octants (i.e. a word is applicable to more than one emotional category), then the system divides its count by the number of shared octants. For instance, if the word "livid" applies to octants of "anger" and "excitement" then its contribution to each region is ½ (one occurrence divided by two emotional categories). Each sentence in the system has such a vector.

(2) Each sentence in the system also has a sentiment value for positivity and negativity. In this example embodiment, the sentiment value is generated by a sophisticated sentiment analysis tool or system that takes into account mood changes, modals (like "would" or "could") and negatives ("not excited" meaning the opposite of excited). The sentiment judgement derived by the tool is represented as a single number for each sentence between −1 and 1 indicating a very negative to very positive sentence respectively. As previously described, it will be appreciated that the alternative forms of sentiment values could be generated and used in alternative embodiments.

Following from the above definitions the sub-algorithm 88 is configured to carry out the following steps:

(1) All the vectors (sentence emotional data profiles) of all the sentences in the second set of text regions 86 are summed together to get a set of summed frequencies to represent the interim 8-dimensional emotion vector for the region.

(2) A mask function is applied to this vector. Rather than take all eight values into account, the algorithm focuses on a sub-section of one or more values of the data set with the highest "weight" in the vector. This is best illustrated with an example. In one configuration, the algorithm is configured to evaluate three consecutive values repeatedly from the vector (wrapping around the data set for the values near the end of the vector). These three values are summed together and the sub-set having the maximum weight of the sets is determined. By way of example, if the 8-dimensional emotion vector was [1, 2, 0.5, 0, 0, 0, 1, 0], the "heaviest" section is at [1, 2, 0.5], since these values sum to 3.5, and this is the highest possible combination of three adjacent values inside this vector. In a first configuration, all the other parts of the vector are then set to zero, to avoid any influence on the strength of this vector. The example masked vector then becomes [1, 2, 0.5, 0, 0, 0, 0, 0] in this configuration. In a second configuration, the highest of the three values is selected with the remaining masked to zero resulting in the masked vector becoming [0, 2, 0, 0, 0, 0, 0, 0]. In this second configuration, if two values of the three are equally highest, then those two highest values are selected to represent the vector and all other values are masked to zero, and similarly if all three values are equal. Regardless of the configuration, this masked vector is then used to recalculate the vector's position in the unit circle using the casting formula discussed next.

(3) The conversion of the 8-dimensional vector to a two-dimensional set of circle coordinate goes as follows (similar to the sine/cosine casting previously described).

(a) Each octant is associated with a 45 degree slice on the unit circle, so Octant 1 is 0 degrees, Octant 2 is 45 degrees, Octant 3 is 90 degrees, and so on.

(b) The algorithm takes the sum of each Octant's vector value times its degrees, with a cosine for the x, and a sine for the y.

(i) Let x=0.0

(ii) Let y=0.0

(iii) For i=1 to 8

(iv) x=x+cosine(degreesForOctant(i) x vector.value [i];

(v) y=y+sine(degreesForOctant(i) x vector.value [i];

(vi) adjust x and y by some scalar value (vii) return x and y normalized with their lengths if their length was greater than 1.0

(4) The intensity of the region is determined by combining the median of the sentiment values for the sentences of that region with the length of the vector calculated above. This sentiment-median is a value between −1 and 1 (as are all sentiment values) and its absolute value is taken to not affect the direction of the emotion (since the direction of the emotion is independent of the sentiment value). The sentiment value is not what determines the direction, since the sentiment value is only positive and negative sentiment, it cannot change the direction/octant of the emotion since there is no such mapping). In this embodiment, the sentiment value's contribution to the intensity of the region is 50%. Its value is divided by 2 and added to the length of the circle coordinates determined above. It will be appreciated that the weighting of the sentiment value contribution may be altered if desired.

(5) The steps (1)-(4) are repeated for all regions in the second set so as to plot their representative vector or point in the emotion model, for subsequent analysis to determine which regions have an emotional association and/or where the emotional transitions exist based on change in distance and/or angular movement within the model as discussed above.

Step 4: Optional Re-Alignment of Text Region Boundaries

Optionally, the audio region determination algorithm 80 comprises a re-alignment sub-algorithm 92 that is operable to adjust the start and/or end of one or more of the text regions of the final set 90 to align with predetermined reference points within the text according to predetermined alignment rules. For example, in the context of text representing an audiobook, the predetermined reference points may comprise data indicative of paragraph or chapter boundaries, and the start and/or end of one or more of the text regions may be adjusted to align with the closest paragraph or chapter boundary based on predetermined alignment rules. In one configuration, the re-alignment of the start and/or end of the text regions may comprise re-allocating one or more sentences of the text region to an adjacent text region or obtaining one or more sentences into the text region from an adjacent text region.

The purpose of this re-alignment algorithm is to prevent audio regions from crossing at least chapter boundaries in the text, and also paragraph boundaries if possible. Audio regions crossing chapter and paragraph boundaries is undesirable as such boundaries provide a natural end point for a listener of an audiobook. The sub-algorithm 92 is configured to retrieve chapter and paragraph boundary data (i.e. the text positions of such boundaries) and adjusts the start and/or end of the text regions in the final set to start and end on chapter and/or paragraph boundaries. For example, FIG. 12 shows regions R1" and R2" R3" of the final set 90 adjusted or re-aligned with at least the chapter boundaries indicated at 96 to generate the re-aligned final set of text regions 94 shown as R1''', R2''', and R3'''.

Emotional Data Profiles for Final Text Region

The audio region definition algorithm 80 is configured to determine or generate a respective region emotional data profile for each of the text regions in the final set. The algorithm 80 is configured to generate a region emotional data profile for a text region based on or as a function of the sentence emotional data profiles of the individual sentences within the region. As discussed with regard to sub-algorithm 84 in step 2, the representative emotional data profile can be generated according to various predetermined configurations or rules, depending on requirements. The region emotional data profile is also a multi-dimensional data set of intensity values, e.g. in this embodiment an 8-dimensional vector of intensity values, one for each emotional category. The values in the 8-dimensional vector may be determined based on any of the techniques previously described with respect to sub-algorithm 84 such as averaging the values for the sentence profiles, summing the values form the sentence profiles, selecting a dominant or prevailing sentence profile to represent the region emotional profile, selecting the most intense emotion in the sentence profiles to represent the region emotional profile, or any other suitable technique for extracting a representative region emotional profile from the individual sentence emotional profiles.

In some embodiments, the algorithm 80 may be configured to apply a masking function to the 8-dimensional vector of the emotional data profile of any of the types or configurations described in sub-algorithm 88. For example, the highest sub-set of a predetermined number of adjacent intensity values may be selected to represent the emotional data profile, with the remaining values masked to zero. Alternatively, the highest value or values of the subset may be selected to represent the emotional data profile with the remaining values masked to zero. The number of adjacent values may be three for example as in sub-algorithm 88, although it will be appreciated the number may be varied higher or lower. In further alternative configurations, the masking function may be configured to select the highest intensity value to represent the 8-dimensional vector, with the remaining values masked to zero.

It will be appreciated that the 8-dimensional vector representing the region emotional data profile can be cast as a resultant vector or point into the circular reference frame of the emotion model 50 using the techniques previously described. Therefore, the emotion for the region can be represented by a single resultant vector or point in the continuum of emotions defined by the 2-dimensional emotion model 50 (see FIG. 6).

2.6 Matching or Selection of Audio Files for Defined Audio Regions

Figure 14:
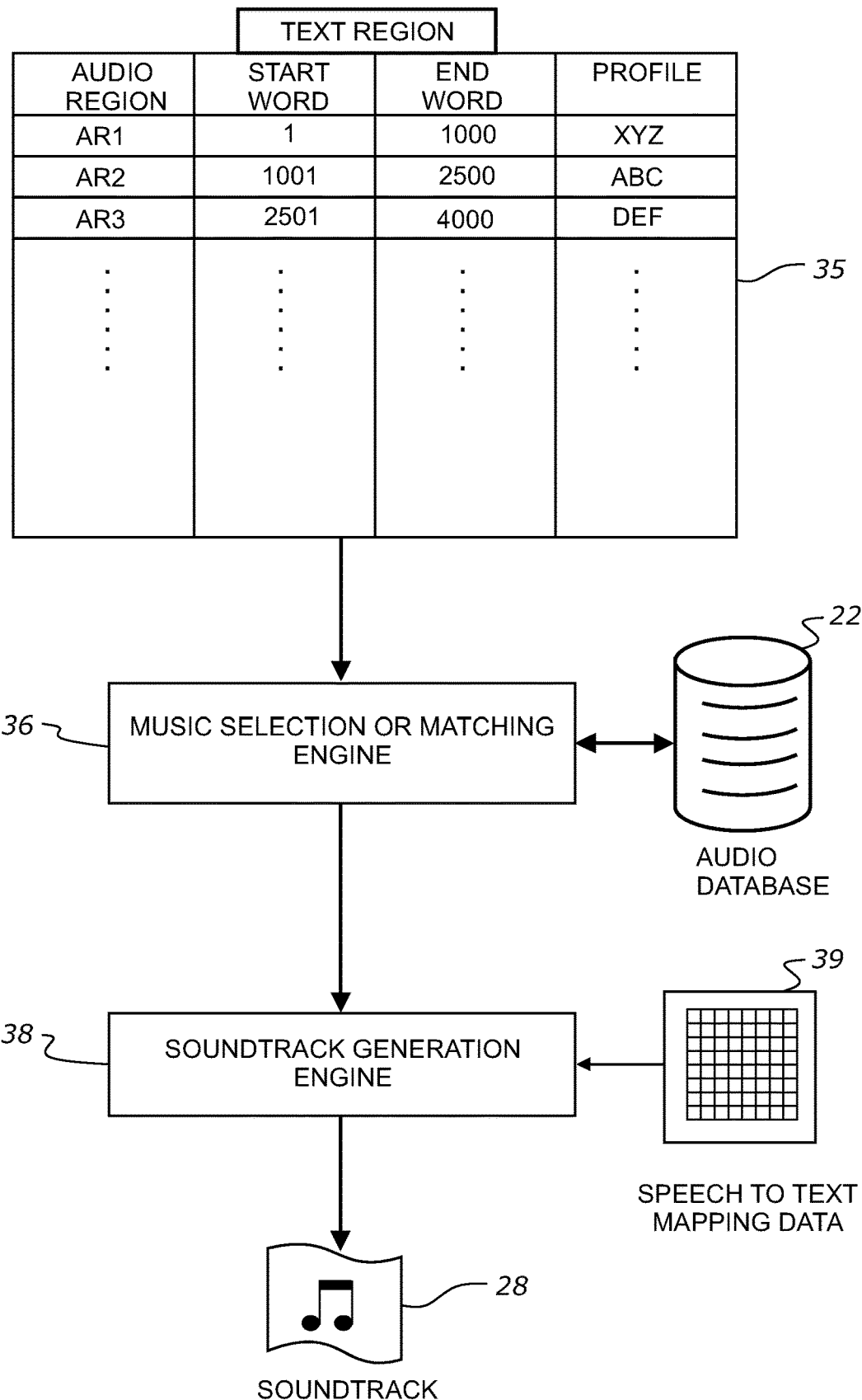
FIG. 14 is a schematic diagram showing the input and output of the music matching engine and soundtrack generation engine in accordance with an embodiment.

Referring to FIG. 14, the music selection or matching engine 36 is configured to receive and process the audio region data generated by the audio region definition engine 34, and select an audio data file for playback in each audio region based on its associated region emotional data profile.

In this embodiment, the automatic creation system has one or more accessible audio libraries or databases 22 that the matching engine 36 can select audio files from. The audio database or databases may be integrated with the creation system and/or the system may access the databases over data network, such as the internet or similar. The audio databases may be private to the creation system and/or 3$^{rd}$ party audio databases or libraries or cloud-based audio streaming services. The audio files are music files in this example. The music files in the database(s) each comprise meta-data or audio file profile information or data representing characteristics of the music, which either directly or indirectly represent the emotion conveyed by the music.

Translation or Transformation of Music Meta-Data into Continuous Emotion Model Representation In one configuration, matching engine 36 is provided with one or more mapping or translation engines that are configured to map or transform the information in the music file metadata into a format comparable or compatible with the continuous emotion model 50. For example, the mapping or translation engines may map or translate the music metadata into an 8-dimensional emotional data profile, or resultant vector or point in the 2-dimensional circular reference frame of the continuous emotion model. In this configuration, each music file in the database can be mapped into the emotion model 50, and a music file or files for an audio region may be selected based on which mapped music file profiles most closely match to the vector or position represented by the region emotional profile of the audio region. For example, a selection may be based on a predefined angular and/or distance thresholds or proximity threshold between the music file position in the emotion model and the audio region position in the emotion model.

Figure 15:
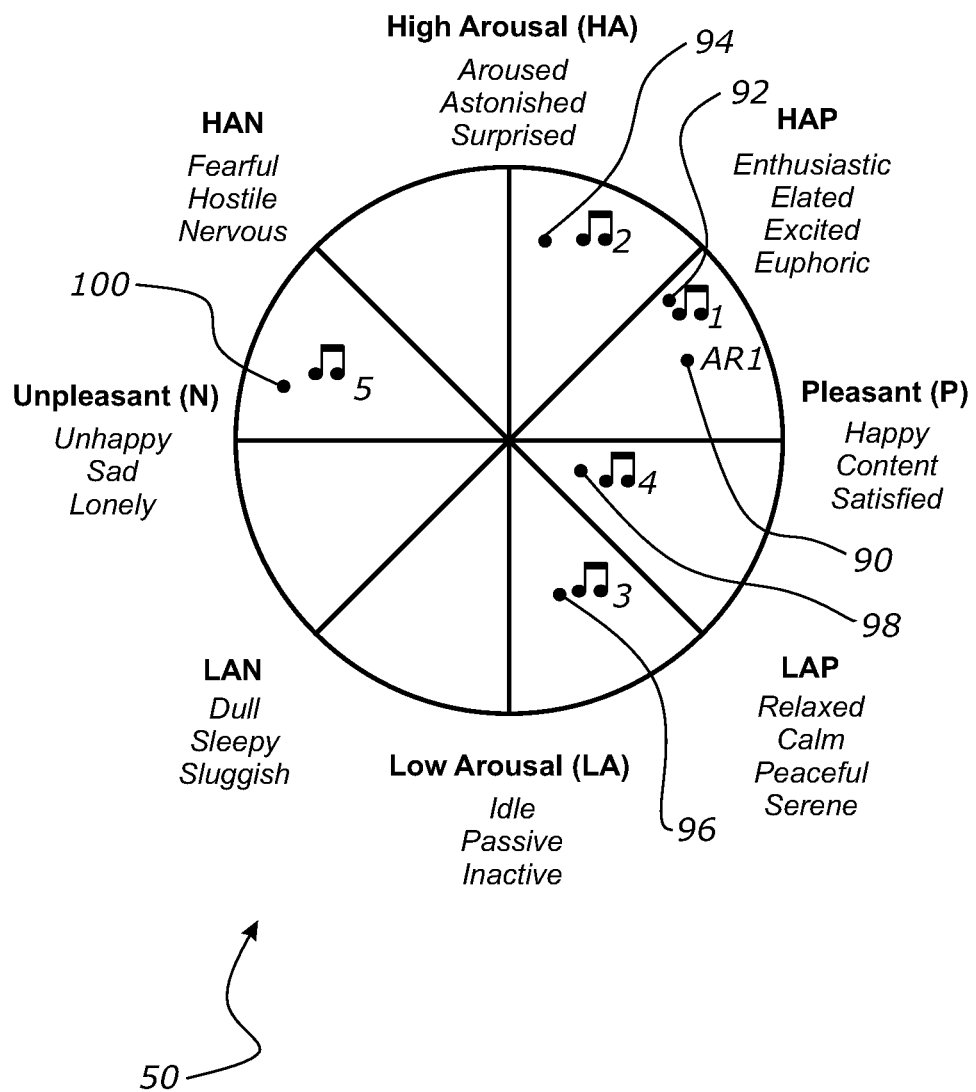
FIG. 15 is a schematic diagram showing the casting of the emotional profile of an audio region along with the casting of multiple candidate music files into the 2-dimensional emotion model of FIG. 6 in accordance with an embodiment.

For example, FIG. 15 shows the cast 2-dimensional position of the region emotion profile for an audio region AR1 at 90. Five music files 92, 94, 96, 98, 100 have also been mapped into the model 50 from an audio database. In this example, the music file 92 most closely matches the emotion and intensity of the emotion of AR1, and the matching engine would select this music file to playback for that audio region.

In an alternative configuration, the music meta-data, once mapped into an 8-dimensional data set profile, may be compared directly to the 8-dimensional data set profile representing the region emotional profile of the region. In this configuration, the raw multi-dimensional data sets representing the emotional profile of the music file and the region emotional profile of the audio region can be compared for the closest match, without needing to generate and compare singular resultant points or vectors generated from the multi-dimensional data sets. For example, the individual intensity values (absolute or relative) of the multi-dimensional data sets of the audio region and music files may be compared to find the closest match. In some configurations the closest match may be determined based on finding the closest matching one or more dominant intensity values in the data set i.e. matching based on one or more of the most dominant emotional categories in the data set. In other configurations, the data sets may be compared based on the closest overall match of intensity values across all emotional category identifiers represented in the data set.

Translation of Region Emotion Profiles into Music File Metadata Format

In another configuration, the matching engine 36 is provided with one or more mapping or translation engines that are configured to map or transform the region emotional data profiles of the audio regions (e.g. the 8-dimensional data sets) into a format or form corresponding to the meta-data categories or emotional profiling categories or characteristics used by the audio library or database for their collection of music files. Each translated region emotional data profile can then be matched to the closest music file or files for selection that have corresponding meta-data.

Figure 16A:
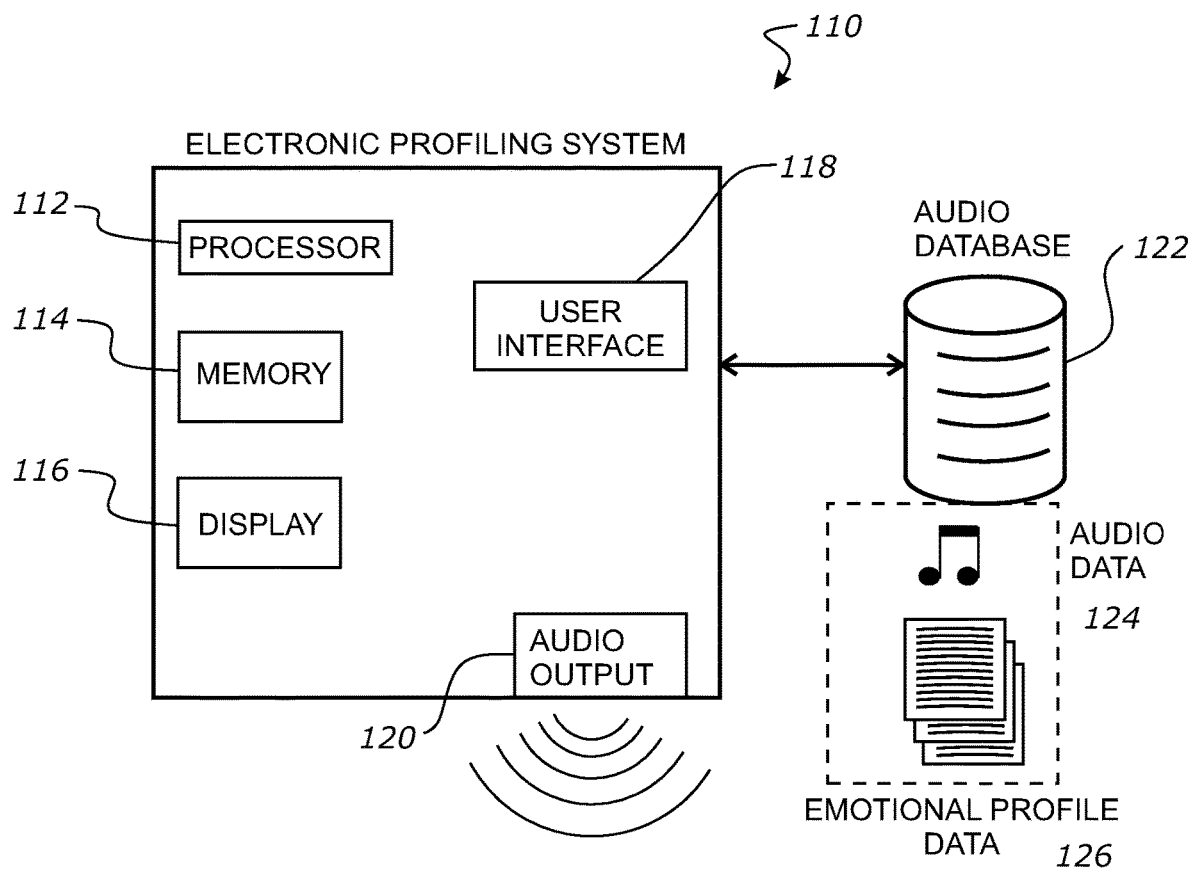
FIG. 16A is a schematic diagram of an electronic profiling system for profiling music or audio files in a database according to the continuous emotion model in accordance with an embodiment.
Figure 16B:
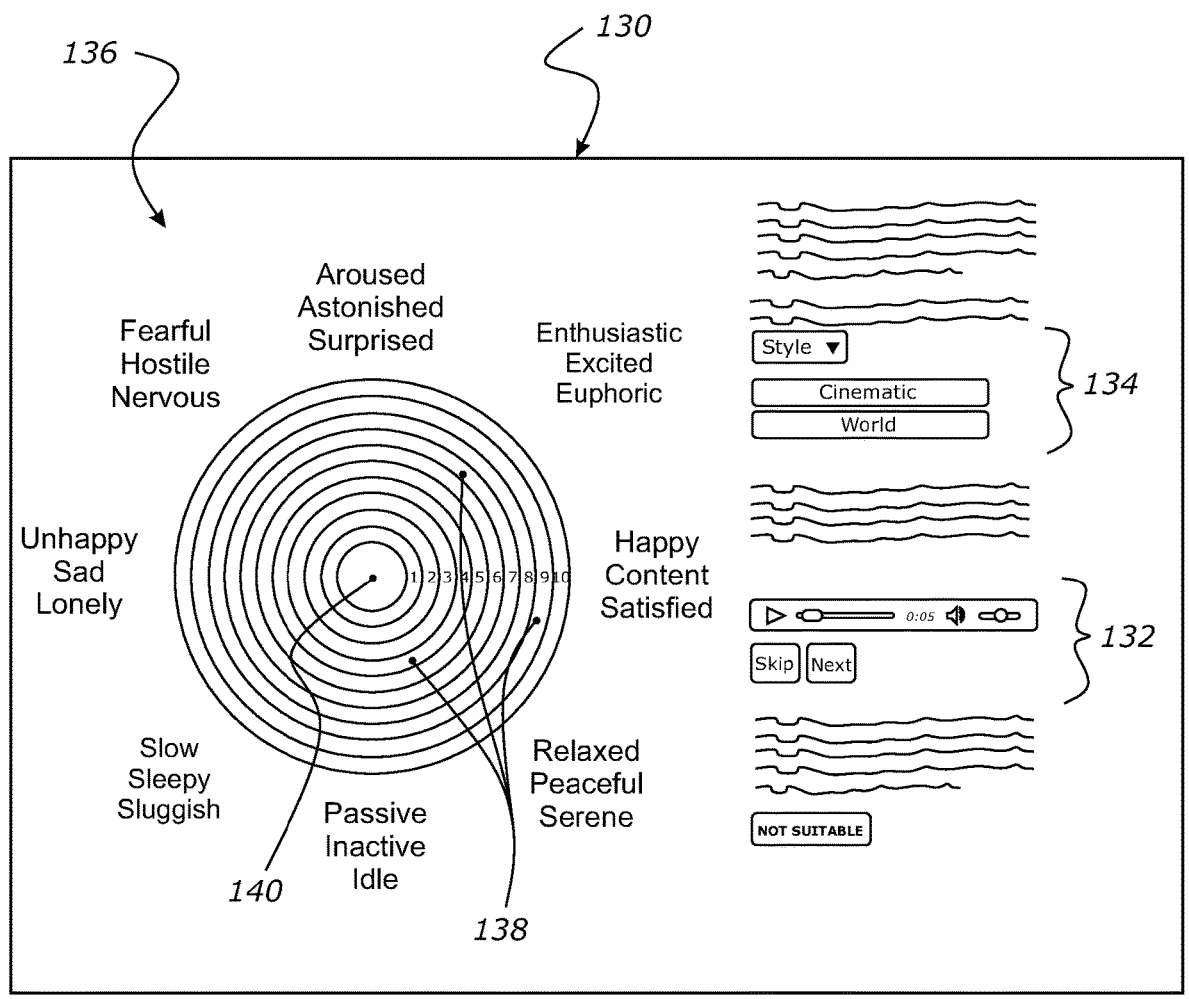
FIG. 16B is a screen shot showing the graphical user interface of a the electronic profiling system of FIG. 16A in accordance with an embodiment.

By way of example only, FIGS. 16A-16C depict the metadata characteristics of an audio database or library. Each music file in the database has a 'genre' characteristic selected from those displayed in FIG. 16A, a 'style' characteristic selected from those displayed in FIG. 16B, and an 'emotion' characteristic selected from those displayed in FIG. 16C. In one configuration, the matching engine 36 is configured to map or translate the region emotional data profile (e.g. 8-dimensional vector) into one of the corresponding 'emotion' categories in FIG. 16C of the audio library. By way of example, if a region emotional data profile has a resultant vector that maps into the 'Pleasant' octant of the emotion model 50 (e.g. represented by identifiers 'happy', 'content', 'satisfied', this may be mapped or transformed via a lookup table or similar to the music 'emotion' category of 'Happy-Pleased' in the audio database. As such, a music file having the 'Happy-pleased' metadata emotion characteristic from the audio database will be selected for the audio region.

Direct Matching of Region Emotion Profiles to Audio Database Profiled Based on the Continuous Emotion Model In another configuration, the matching engine 36 may be operable to select audio files from an audio database without any translation engines. In this configuration, the matching engine 36 is configured to access or communicate with an audio database or databases that comprise audio files having associated metadata or audio profile information that comprises data indicative of an audio emotional data profile in the format that is represented by the continuous emotion model 50. For example, each audio file may be represented by an audio emotional data profile comprising one or more resultant vectors in the continuous emotion model or alternatively a multi-dimensional emotional data profile (i.e. a data set comprising an intensity value for each emotional category identifier) that can be optionally mapped or transformed into the continuous emotion model using techniques previously described. As will be described below, in some configurations the raw multi-dimensional data sets representing the emotional profiles of the audio region and audio files are directly compared for the closest match, and in other configurations the data-sets are cast or transformed into a resultant vector or point in the 2-D emotional model for subsequent comparison for the closest match.

In one configuration, the multi-dimensional emotional data profiles of the audio regions and audio files are compared directly to find the closest match. For example, the individual intensity values (absolute or relative) of the multi-dimensional data sets of the audio region and music files may be compared to find the closest match. In some configurations the closest match may be determined based on finding the closest matching one or more dominant intensity values in the data set i.e. matching based on one or more of the most dominant emotional categories in the data set. In other configurations, the data sets may be compared based on the closest overall match of intensity values across all emotional category identifiers represented in the data set.

In another configuration, the multi-dimensional data sets representing the emotional profile of the audio region and music files are matched based on their singular resultant vector or point as mapped into the 2-D emotional model. In this configuration, each music or audio file in the audio database is represented in the emotion model 50 and a music file or files for an audio region may be selected based on which music file emotion profiles most closely match to the resultant vector or position represented by the region emotional profile of the audio region. For example, a selection may be based on a predefined angular and/or distance thresholds or proximity threshold between the music file position in the emotion model and the audio region position in the emotion model as was described above in regard to FIG. 15.

This configuration relies on an audio database in which all the audio files have been profiled in a format corresponding to the continuous emotion model 50. In one embodiment, such a database is created by an electronic profiling system. An embodiment of an electronic profiling system will be described with reference to FIGS. 16A and 16B.

Referring to FIG. 16A, in this embodiment the electronic profiling system 110 may be implemented or accessible on any suitable electronic hardware system or device typically comprising a processor 112, memory 114, display 116, user interface 118 and audio output interface 120. The electronic profiling system may be in the form of software executable or operable on such a system. The software may be an application program locally stored on the hardware system or remotely accessible, such as cloud-based software accessible over an internet browser or similar. The electronic profiling system is connected to or may access over a data communication link an audio database 122 that stores or provides access to a set of audio data files 124, such as music files. The user interface is operable by a user to access and play the music files from the database over the audio output 120, and to then emotionally profile the audio files via a profiling graphical user interface (GUI) presented on the display. The emotional profile input from the user via the profiling GUI is then stored or tagged as emotional profile data 126 against the audio file and stored in the audio database 122 or in a separate database from which it can later be retrieved.

Referring to FIG. 16B, an example embodiment of the profiling GUI 130 presented to the user on the display 116 is shown. The profiling GUI 130 enables the user to select music files from the database for profiling or alternatively automatically presents the music files to the user for profiling one by one in a random or predetermined order. An audio playback interface 132 is provided with conventional audio playback controls to enable to the user to play, pause, rewind, fast forward, control volume of playback of the audio track as desired. An optional style interface 134 is provided from which the user may select from a drop-down list one or more 'styles' (e.g. acoustic, rock, cinematic, world, pop, country, blues etc) that they believe apply to the audio track they are listening to, and this style data may also be stored against the meta-data of the audio file.

The primary profiling interface in the profiling GUI 130 is the emotional profiling tool or GUI 136. In this embodiment, the emotional profiling GUI 136 presents a graphical representation of the continuous emotion model 50 of the type previously described with reference to FIG. 6 for example, or an variation of that model that matches the model upon which the text has been analysed and emotionally profiled. After listening to the audio file, the user is able to emotionally profile the audio track by registering one or more profile 'dots' 138 on the circular model presented, which correspond to the user's perception of the emotional categories and intensities of such emotions conveyed by the music overall. The profiling dots may be registered or applied by the user via any suitable user interface means, for example clicking a mouse pointer on the displayed model at the appropriate position via a mouse input interface or touch input on the displayed model if a touch screen user interface is provided by the system.

The emotional profiling GUI 136 may be configured to control the number of profile dots the user can apply to each track. In one configuration, the user may only be allowed to apply a single dot, but in other configurations the user may be able to register or apply a plurality or multiple dots as shown in FIG. 16B. As will be appreciated in accordance with the previous description of the model, the angular position of a profile dot represents the emotional category or blend of adjacent categories in the continuum of emotions to which the listener perceives the music conveys. The distance from the origin 140 of the dot represents the intensity of that emotion as perceived by the listener doing the profiling, with a distance closer to the origin representing a lower intensity and closer to the boundary or perimeter of the model representing a higher intensity.

Once the user has emotionally profiled the audio track with one or more profile dots, the emotional profile data 126 represented by the one or more profile dots is stored in the audio database 122 or elsewhere against that audio track as previously described for subsequent use by the matching engine in the creation system.

In one embodiment, the emotional profiling of the audio tracks of an audio database using the profiling system 110 described may be carried out by multiple users (profilers). The result is that the audio tracks in the audio database have multiple emotional profiles generated for them, from a range of different listeners. Rather than relying on a single listener to profile the audio tracks according to their perceptions, the multiple emotional profiles generated by multiple or a 'crowd' of listeners can be generated and retrieved for the audio track. In this scenario, the system can be configured to average or otherwise statistically generate an overall emotional profile for the audio track based on the crowd-sourced data from multiple profiling listeners. This provides the ability to remove outliers or extreme profiles and generate a more representative emotional profile for the audio track.

Other Configurable Matching Engine Control Parameters—Music-Selection Filters

The matching engine 36 is configured to primarily select an audio track (e.g. music file) for an audio region based on the closest matching emotional profiles of the audio track and audio region using one or more of the techniques or configurations such as those described above. In addition to the primary emotion matching, the matching engine may be configured to apply one or more music-selection filters to the music selection based on various factors, depending on the meta-data and profile information available for the music files and/or additional profile or information about the text. Various examples of the additional music-selection filters are described below. Any combination of one or more of these music-filters described below could be implemented by the matching engine with the emotional profile matching to select the audio track for each audio region.

In one configuration, the matching engine is provided with one or more configurable global music-selection filters. The filters may include, but are not limited to, genre music-selection filters and style music-selection filters. For example, the matching engine may be configured manually or automatically to filter the music files for selection based on particular 'genre' and/or 'style' settings or parameters. Referring to the example of FIGS. 17A-17C, the matching engine may, for example, be configured to apply music-selection filters that requires all music files be selected from a 'genre' that corresponds to the nature of the text representing the speech audio (e.g. 'Adventure' if the audiobook is determined to be a fiction adventure novel) and a 'style' such as 'cinematic'. This means the music selection carried out by the matching engine must select a music file for each audio region that is tagged in the 'Adventure' genre and 'cinematic' in style, and which most closely matches the emotional profile of the audio regions. Other operable music-selection filters may include those that dictate to only select from music files that have no lyrics.

It will be appreciated that number of matching or music-selection filters applied may vary depending on requirements and the extent to which the music files or tracks have been classified or profiled. Some of the filters may be manually pre-configured and others may be dynamically configured based on the particular speech audio for which the soundtrack is being created. For example, the system may be configured with a music-selection filter that only selects music files having no lyrics.

The system may be configured to determine or extract additional profile information relating to the text or speech audio (e.g. audiobook in this example) via additional text analysis or analysis of the audiobook files or external sources to determine additional characteristics of the text and/or audiobook. In the context of text representing an audiobook, this may include information such as, but not limited to, genre, setting (place and time), author, writing style and the like. Based on this information, the system may dynamically configure additional audiobook-based music-selection filters to correspond to the additional global profile information relating to the audiobook or underlying text being narrated. For example, the music-selection filters may be configured to only select music files or songs relevant to the setting being conveyed in audiobook so as to avoid a 'rap' song being selected for a romance novel audiobook set in the early 1900s. Such audiobook-based music-selection filters rely on the audio tracks also being profiled with similar information.

In some configurations, the user-based music-selection filters may also be applied based on the end user or type of user that may be listening to the automatically created soundtrack. The user-based music-selection filters may be based on user preferences or settings, such as no 'rock' music, or the user prefers 'classical' music to play when listening to speech audio, or user profile or demographic profile information relating to the user such as, but not limited to, age, gender, nationality and the like. The user profile information may also include previous historical settings relating to the user's ratings of other soundtracks created for similar audiobooks for example.

In some configurations, the matching engine is provided with configurable or self-configuring musical characteristic music-selection filters. The musical characteristic filters may define filters relating to one or more of the spectral or other musical characteristics of the music to be selected for an audio region. By way of example, these filters may define thresholds or filters relating to desired tempo or beats per minute (BPM) characteristics, key change frequencies or other spectral characteristics of the music relating to the audio track's suitability for selection.

In some configurations, the matching engine is provided with configurable playlist music-selection filters. In such configurations, the matching engine accesses a playlist database comprising a collection of one or more playlists of audio tracks that have been pre-selected for the audiobook or underlying text. For example, in the context of the text representing a fiction audiobook, the author and/or one or more listeners of the audiobook or readers of the associated book or e-book may generate playlists of audio tracks (music or songs) which they enjoy listening too while listening to the audiobook or reading the associated book. This playlist data from multiple sources is stored in a playlist database. In some embodiments, the matching engine may be configured with a playlist music-selection filter that dictates that only audio tracks listed in the crowd-sourced playlist data may be selected for an audio region, i.e. the primary emotional matching performed by the matching engine for an audio region is based on a filtered list of audio tracks from the audio database that correspond to the playlist data for the audiobook or text associated with the audiobook. Various types of playlist music-selection filters may be applied. In one form, the playlist filters may specific one or more particular playlists, e.g. the author's playlist only, or the end-users playlist only, or a combination of any one or more playlists, or all playlists associated with the audiobook and/or text associated with the audiobook.

In some configurations, the matching engine is provided with configurable rating or machine learning music-selection filters. In such configurations, the creation system is configured to receive or retrieve rating data from listeners of the synchronised soundtracks. By way of example, the listeners may be provided with a ratings input interface in their soundtrack playback system that enables them to provide rating feedback on the suitability or their rating of an audio track that is playing in the soundtrack for the audiobook they are playing. By way of example only, the rating interface may be a 'thumbs up' or 'thumbs down' GUI interface or any other suitable ratings interface enabling a user to provide ratings feedback as to whether they like or dislike the audio track playing in the soundtrack. The user may for example believe an audio track really enhanced their listening experience for a particular passage in the audiobook they are playing and give it a 'thumbs up' rating, or alternatively if give it a 'thumbs down' rating if they thought it was distracting or otherwise not suitable to enhancing their listening experience. The matching engine is configured to receive or retrieve this ratings data from a crowd of listeners and may then be configured to generate dynamic ratings profile data for audio tracks in the database which is either generic or specific to a particular text, or both. The matching-engine is operable to apply one or more ratings music-selection filters based on the ratings data received. By way of example, the ratings filters may dictate that no audio track is to be selected if it has negative ratings data over a predetermined threshold of all ratings received for the audio track, or alternatively the engine may only select audio tracks that have an associated positive rating corresponding to a predetermined threshold. The ratings filters may also be configured to operate on sub-sets of ratings data. For example, the filters may be set to be global (i.e. all ratings for the audio track during its use in a synchronised soundtrack regardless of which audiobook it was created for) or they may be set to be audiobook-specific (i.e. only ratings for the audio track when played for the same audiobook being processed are considered). It will also be appreciated that the ratings filters may operate on a subset of the ratings data that are filtered based on user profile or demographic information, such that the filters are only applied based on ratings from a particular group of users. For example, the ratings filters may be set to operate on only ratings data from users in one country, or a particular age group, or only ratings data received from one particular user, such as the end user for which the soundtrack is being created for example. As the ratings data will constantly change as more ratings are received, the ratings filters are dynamic and provide a machine learning function to the matching engine.

The above various music-selection filters may be applied on a global basis to the entire audiobook, or may be applied on a more granular or higher resolution basis, such as on a chapter basis of the audiobook. For example, each chapter may have its own global chapter profile filters for the music selection, which overlay the individual audio region emotional profile matching of the individual audio regions within the chapter.

User Tuneable Selection System for Emotional Weighting

In an embodiment, the automatic creation system comprises user setting or control interface that enables a user to tune the created soundtrack to the type of emotions they would like to amplify or dampen. Suppose a user wasn't interested in hearing "sad" music. A user could define a multiplier (through the control interface, e.g. a displayed graphical user interface) for each of the eight dimensions (e.g. sadness=0.2, happiness=1.0, etc). These control parameters for emotion would dampen down any "sadness" events to 20% of their original strength and leave happiness at 100%, for example. Effectively the system would generates a deformed unit circle of the emotion model 50 according to the user's preferences or control setting, where certain spokes of the octants were retracted more than others, thus deforming the shape of circular reference frame. This shape is a user's unique preference defined by an eight dimensional vector with values between 0.0 and 1.0 inclusive, for example.

Pitch and/or Pace Analysis

In some embodiments, the automatic creation system may be configured to perform audio signal processing on the speech audio to generate pitch and/or pace information relating to the spoken words. In such embodiments, this pitch and/or pace information may be associated or tagged to the corresponding text segments or text regions in the corresponding text data, and may be used to supplement or augment the emotional profile information generated for the text segments and/or text regions based on the pure text analysis. The augmented emotional profile for the text segments and/or text regions can then be used in the music-selection process to enhance the selection process.

2.7 Optional Thematic Profiling of Text for Audio Region Definition and/or Music Selection In the embodiments above, the automatic creation system and algorithms are primarily configured to semantically process the text (representing the speech audio) for the audio region definition (regionalisation of the text, i.e. dividing the text into text regions or speech regions) and the subsequent audio or music selection based on emotional profiling of the text and audio files. In particular, the audio region definition algorithm defines or identifies text regions within the text based on identifying emotional transitions in the text or emotional associations between adjacent text segments (e.g. sentences). The system then calculates or determines an overall emotional profile for each text region as a function of the emotional profiles of the text segments (e.g. sentences) with the text region, and the overall text region emotional profile is used in the music selection algorithm that selects an audio file for playback alongside the playback of that text or speech region at least partly based on matching of the text region emotional profile to a corresponding audio or music file having a similar emotional profile.

In some embodiments, the automatic creation system may optionally further process the text (representing the speech audio) for thematic profiling in addition to emotional profiling. The thematic profiling may be implemented for the audio region definition stage, music selection or matching stage, or both. Examples of the thematic profiling will be explained below.

In a first alternative configuration, the semantic analysis engine 32 may be configured to process each text segment (e.g. sentence) for emotional profiling and thematic profiling. As previously explained, the emotional profiling is based on a continuous emotion model and based on parsing the text relative to a set of emotional lexicons 60, and generating a segment emotional data profile in the form of a multi-dimensional data array representing the emotional profile of the segment (e.g. sentence) relative to each emotional category identifier (each of which has a respective 'emotional' lexicon). In this first alternative configuration, the semantic analysis engine 32 is further configured to process or profile the text segments (e.g. sentences) relative to a set of one or more thematic values or judgements or characteristics defined by respective 'thematic' lexicons. The thematic characteristics (in the context of speech audio in the form of an audiobook for example) may represent any desired thematic judgements including by way of example only, but not limited to:

Story genres: drama, romance, thriller, adventure, sci-fi etc
Scenes: nature, urban, etc
Writing styles: Victorian, contemporary, whimsical, speech, etc
Other: curious, fight, hope, romantic, sad, scary, sophisticated, weird Each one or more thematic judgements or thematic category identifiers defining the thematic profiling has an associated thematic lexicon of words or word concepts that are associated with the thematic category identifiers, similar to the emotional lexicons 60 associated with the emotional category identifiers previously described. Like the emotional lexicons, each thematic lexicon may simply comprise a list of words or word concepts, or a list of words or word concepts in which each word has one or more additional lexicon attribute values, such as a weighting value and syntactic characteristic identifier (in a similar format to the emotional lexicons). By way of example only, a portion of the Romance thematic lexicon list may contain words or words concepts like the following:

. . .
handsome,j,1.0
heart's desire,idiom,1.0
heavenly,j,0.8
helpful,j,0.4
hot,v,1.0
hot stuff,idiom,1.0
huggable,idiom,0.7
hunk,n,1.0
hunky,j,1.0
. . .

And the by way of example, a portion of Nature thematic lexicon list may contain words or word concepts like the following:

. . .
peak,n,1.0
pinnacle,n,1.0
planet,n,1.0
plant,n,1.0
plant,v,1.0
polar bear,n,1.0
. . .

In the above examples, each word or word concept comprises a weighting value (in this example a value between 0 and 1) which reflects how strongly it reflects the thematic category of the lexicon, and a syntactic identifier representing the part of speech or whether it is an idiom for example. In this example, n=noun, v=verb, j=adjective, idiom=idiom etc.

In this configuration, the semantic engine is configured to process or parse the text based on both the emotional lexicons for emotional profiling and the thematic lexicons for thematic profiling of the text segments. The thematic profiling based on the thematic lexicons may be undertaken in the same manner as previously described with respect to the emotional lexicons. The output of the semantic engine is that each text segment (e.g. sentence) is provided with an emotional and thematic data profile, which may be in the form of a multi-dimensional data set or array of values or scores, each value or score in the data set representing or corresponding to a respective emotional category identifier or thematic category identifier. By way of example, if there are 8 emotional category identifiers (and therefore 8 emotional lexicons), and 10 thematic category identifiers (and therefore 10 thematic lexicons), then each text segment will have an 18-value emotional and thematic data profile.

In this first alternative configuration, the audio region definition engine is configured to receive the text analysis data from the semantic engine for processing to identify and define the text regions (speech regions) for the audio regions of the soundtrack. In this configuration, the text analysis data comprises the emotional and thematic data profiles of each of the text segments (e.g. sentences) in the text. The audio region definition engine is then configured to process those text segments and associated emotional and thematic data profiles to identify text regions of multiple adjacent text segments (e.g. sentences) that have an emotional and/or thematic association or otherwise segment the text into text regions based on identifying emotional and/or thematic transitions. It will be appreciated that the audio region definition engine may operate in a similar manner to that previously described with respect to emotional profile data when processing the additional thematic profile data for thematic association or transitions. In one configuration, the emotional profile data may be processed separately to the thematic profile data, and then text regions may be defined based on a function of the emotional association or transition data and thematic association or transition data. In some embodiments, the emotional data may be configured to have a higher weighting or take precedence over the thematic data when defining the text region boundaries, or vice versa, or each may have equal weighting. In other configurations, the emotional and thematic profile data of each text segment may be processed in aggregate form without distinction between emotion and theme, i.e. each text segment may be compared to adjacent text segment based on the overall emotional and thematic association or for overall emotional and thematic transitions. It will be appreciated by a skilled person that the thematic profile data may be processed in a similar manner as the emotional data profiles using similar algorithms.

In this first alternative configuration, the output of the audio region definition engine is a set of defined text regions for which audio regions will be created, and each text region not only having text region emotional profile but a text region emotional and thematic data profile. In this configuration, the emotional and thematic data profile of each text region is defined as a function of the emotional and thematic data profiles of the individual text segments (e.g. sentences) within each text region, using similar techniques as described previously with respect to the emotional profiling.

In this first alternative configuration, the music matching or selection engine is modified to take into account the additional thematic profiling of the audio regions when selecting a music track or audio file for each audio region. The same selection/matching processes may be utilised as described previously. For example, the emotional and thematic profile of each audio region may be translated/transformed into a format comparable to the emotional and/or thematic profiling of audio files in the audio database, or the audio profile data of the audio files in the database may be converted into a format comparable to the audio region emotional and thematic profiles, so that a comparison can be made to provide music or audio file candidates for selection for each region based on closest matching profiles, as previously described. In yet other configurations the audio or music in the audio database may be profiled in a format corresponding to the audio region emotional and thematic profiles and therefore no translation/transformation into different formats may be required in such configurations. It will be appreciated that the rules defining which audio files have a profile that matches most closely to the audio region profiles may dictate that matching may be weighted in favour of emotion over thematic, or vice versa, or no distinction such that the overall closest match is sufficient.

In summary, the first alternative configuration implements additional semantic profiling of the text for thematic judgements based on thematic category identifiers and associated thematic lexicons for the audio region definition engine, and also utilised the additional thematic profiling for music selection for the defined audio regions.

In a second alternative configuration, the thematic profiling of the text may simply be applied after the audio region definition algorithms have completed, such that the thematic profiling is utilised in the music or audio matching or selection phase of the automatic creation only. In this second alternative configuration, the semantic engine and audio region definition engines execute as previously described based on the emotional profiling only. However, the output of the audio region definition engine is the defined text and audio regions and their associated emotional profile data. At this point, each of the text regions may be subjected to thematic profiling based on the thematic lexicons previously described in the first alternative configuration, and therefore each text region emotional profile is augmented with additional thematic profile data before entering the music selection or matching phase of the system. For example, each text region is parsed with respect to one or more thematic judgment categories and associated thematic lexicons and additional thematic scores or profile values are added to the text region and audio region profile to generate an emotional and thematic data profile for each text region. For example, if the text in the text region is parsed relative to 10 additional thematic categories, then the multi-dimensional emotional data profile of 8 emotional data values or scores, is expanded with 10 additional thematic values or scores. The resulting audio regions and their associated emotional and thematic data profiles are then input to the music selection and matching engine for processing and selection of a suitable music of audio track for each audio region in a manner described with respect to the first alternative configuration of the system.

In summary, the thematic profiling described above in the first and second alternative configurations may be optionally applied at both the semantic analysis and audio region definition stages/processing and the music selection or matching stage/processing as in the first alternative configuration, or just at the music selection or matching stage as in the second alternative configuration.

2.8 Soundtrack Generation Engine

Reverting to FIG. 14, the soundtrack generation engine 38 of the system is configured to receive the audio region data from the audio region definition engine and music selection data from the matching engine. This received data collectively defines the audio regions (including their respective start text position and stop text positions) and the audio file information indicative of the audio or music file or files selected for playback in that audio region of the soundtrack. The soundtrack generation engine may also be configured to generate additional audio playback effect data for one or more of the audio regions based on preconfigured rules or dynamically. The playback effect data may for example define any one or more of the following audio playback effects or settings:

transitional playback effects between audio regions based on configurable predefined rules such as, but not limited to cross-fade, fade-in, and/or fade-out effects for the playback of the audio data file in each audio region, musical key or harmonical compatibility, and/or looping settings to define how the audio data file should loop should its duration be shorter than the playback duration of its associated audio region during playback, and/or offset start and/or stop settings that are configured to start and/or stop playback of an audio file (e.g. music file)

for an audio region at offset playback time positions within the audio file relative to the start and/or end times that define the conventional playback duration of a music file. For example, the settings may be configured to initiate playback of the music file from 30 seconds into the audio track playback, and/or cease 30 seconds before the natural end point in the playback of the audio track. In some embodiments, the offset start and/or stop time settings may be configured to be selectively ignored or enforced, depending on the playback device, the particular music track, the particular source of the audio or music (e.g. streaming music service), profile or subscription status of end user, and/or or territory in which the soundtrack is played.

The soundtrack generation engine 38 is configured to process the received data into a soundtrack data file or files suitable for playback by a soundtrack playback system or engine. The soundtrack data file may define the audio regions and audio file for playback in each audio region, along with any additional playback effect data that may have been configured.

In some embodiments, the soundtrack generation engine 38 is configured to generate soundtrack data file or files directly using the respective start and stop text positions of the audio region data from the audio region definition engine. Theses start and stop text positions for the audio regions are defined by data or values directly representing actual positions relative to the text (e.g. word count or index values corresponding to the text representing the audiobook). In other words, the start and stop positions of the audio regions are defined in the soundtrack in the 'text domain' As will be described, such 'text domain' soundtracks are synchronised for playback with the associated audiobook playback based on a speech-to-text mapping engine within or mapping data received by the soundtrack playback system. The speech-to-text mapping data provides a mapping between the text position in the text (e.g. word count value) to the corresponding playback time position in the corresponding speech audio playback (e.g. word 700 is narrated at time 4 minutes 20 seconds in the audiobook playback). The generated or received speech-to-text mapping data (timing information) enables the soundtrack playback engine to convert or transform the text-based start and stop positions defining the audio regions of the soundtrack from the 'text domain' to the 'time domain' of the audiobook playback timeline. In particular, the text-based start and stop positions are converted to time-based start and stop times relative to the audiobook playback timeline, and this enables the playback of the audio regions to be triggered in a synchronised manner to the audiobook playback.

In other embodiments, the soundtrack generation engine 38 is configured to generate the soundtrack data file or files in which the audio regions are defined by start and stop positions in the 'time domain' In such embodiments, the soundtrack generation engine is configured to receive or generate speech-to-text mapping data 39 relating to the audiobook being processed. This mapping data 39 may be sourced externally from a database or mapping engine, or alternatively may be generated locally be a mapping engine in the creation system. In one configuration the mapping data 39 may be generated by the speech-to-text engine 15 of or associated with the text module 29 for example. In this embodiment, the soundtrack generation engine converts or transforms the audio region definition data for the audio regions from the 'text domain' to the 'time domain' based on the mapping data 39. This results in the soundtrack data file or files comprising data defining the audio regions in the 'time domain' with respective start and stop positions that are time values relating to the audiobook playback timeline. For such 'time domain' soundtracks, the soundtrack playback engine or systems are configured to synchronise the triggered playback of the audio regions of the soundtrack based on the playback time of the audiobook. As some audiobooks may have a variable narration speed or playback speed setting, the audio regions of the soundtrack are generated with respect to a default or nominal narration or playback speed setting for the audiobook. The soundtracks are configured such that the start and stop positions of the audio regions are dynamically adjustable by the soundtrack playback engine based on the narration speed or playback speed to maintain synchronisation. In other words, the playback duration of the soundtrack is dynamically matchable to the playback duration of the audiobook, based on the narration speed or playback setting at playback. In some embodiments, the timing information from the speech-to-text mapping data is utilised by the playback engine to schedule or co-ordinate the timed playback for the audio regions.

The soundtrack data file or files may comprise the actual audio files or links to audio file sources containing the audio files for retrieval and playback (whether by download or streaming) In one configuration, the soundtrack may be configured to comprise only audio regions of music files, although the soundtrack may also comprise other layers such as an ambience layer or sound effect layer that comprise ambience or sound effect audio regions that are either automatically configured or manually configured.

In some embodiments, the soundtrack data file or files are generated as separate files for playback by a soundtrack playback engine alongside the audiobook player. In other embodiments, the soundtrack data file or files may be integrated into the audiobook data file as an integrated soundtrack-enhanced audiobook for playback by a playback engine.

Pre-Rendered and On-Demand/Real-Time Generated Soundtracks

In one configuration, the automatic creation system is operable to process the text representing the audiobook and generate a 'pre-rendered' soundtrack data file for storage. This pre-rendered soundtrack can later be delivered to end-users for playback on a suitable soundtrack playback system while they are listening to the audiobook, as will be described later.

In another configuration, the automatic creation system is operable to generate and deliver soundtracks 'on-demand' or in real-time for an end user for a particular audiobook upon request.

In one 'on demand' embodiment, the automatic creation system may be configured to retrieve the text emotional profile map or audio region definition data for the audiobook associated with the soundtrack request from a database, and then operates the remaining modules of the creation system to generate the required soundtrack for delivery to the end user. In this embodiment, the system takes advantage of pre-processing of the text that may have already been carried out by the text analysis and/or audio region definition engines for the audiobook. For example, the text of a catalogue of audiobooks may be analysed by text analysis and/or audio region definition engines and associated text emotional profile and/or audio region definition data may be pre-generated and stored, ready for subsequent retrieval and input into on-demand/real-time operating music-selection and matching engines for the delivery of an on-demand soundtrack. A benefit of this approach is that the on-demand soundtrack created can utilise the latest up-to-date database audio tracks and/or particular user preferences (e.g. user-based music-selection filters), but doesn't need to carry out the text analysis relating to the audiobook.

In another 'on demand' embodiment, the automatic creation system is configured to process the text or at least a portion of the text representing the audiobook in real-time and progressively generates the corresponding soundtrack for delivery (e.g. streaming) to the end user. Further examples of the 'on demand' configurations for such streaming or live speech audio applications are provided below.

2.9 any Voice, Anywhere—'on Demand' Soundtrack for Streaming or Live Speech Audio In other embodiments, the automatic soundtrack creation system can also create a soundtrack for playback for any type of live or streaming speech audio. The embodiments above are mainly described in the context of generating a soundtrack for an entire work of pre-recorded or pre-generated speech audio content such as audiobooks, podcasts or similar, but the creation system can also be applied to live or streaming speech audio on the fly. In such applications, the system is configured to receive an incoming data stream representing the speech audio, and is configured to progressively process the stream of speech audio to generate an accompanying streaming soundtrack for playback or delivery in real-time for playback. Such embodiments may be applied to speech audio such as streaming audiobooks or podcasts or live broadcasts, or speech audio representing a real-time phone call, performance, speech, formal or informal meeting or conversation between people, or any other captured or generated or recorded speech audio that is live or streamed for processing and for which a real-time soundtrack is required to be generated on the fly. In such embodiments, the soundtrack creation system is configured to receive or record the speech audio to generate an incoming speech audio data stream or digital signal for processing. The creation system then continually converts the incoming signal into a corresponding stream of electronic text, for example using the speech-to-text engine, and then applies the text analysis as described before to generate an emotional profile and determine emotional transitions of the incoming text based on continuous analysis of the past text and the inbound new text. The text analysis is then used to select the music for the soundtrack playback and delivery as described above, and the generated soundtrack is delivered for playback to the listener of the live or streaming audio to enhance their listening experience. It will be appreciated that the more incoming data processed by the soundtrack creation engine for an item of live or streaming speech audio, the more accurate the soundtrack engine will be at generating an emotionally suitable soundtrack for the live or streaming audio as the listening duration for that item of live or streaming speech audio continues. Example embodiments of this configuration are provided below.

'On Demand' Streaming Soundtrack for Streaming Speech Audio

In this first example, the end user is listening to or requested playback of an item of streaming speech audio (e.g. an audiobook, podcast, or other speech audio stream). In this embodiment, the soundtrack creation engine is configured to buffer the incoming speech audio stream from its source (e.g. cloud, server, audio player or similar) into memory for text analysis processing. The soundtrack creation system is configured to convert or otherwise generate or obtain a stream of electronic text corresponding to the incoming buffered speech audio stream (e.g. using the speech-to-text engine or otherwise). Once a predetermined number of text segments (or a text region of a predetermined length) of the stream of electronic text are obtained in memory, the creation system is configured to perform the text analysis previously described to determine the emotional profile (relative to the continuous emotion model) for the current text region of one or more text segments. This text region emotional profile may be calculated as a function of the segment emotional profiles of the individual text segments as previously described. The soundtrack creation engine is then configured to select the music or audio for that text region based on its region emotional profile as previously described. The soundtrack creation engine can then initiate or synchronise or coordinate the simultaneous delivery or playback to the user of the generated soundtrack stream and buffered speech audio stream together.

The creation system is then configured to repeat this process on the incoming speech audio stream for the next text region in the audio stream to generate the next text region emotional profile. The soundtrack creation system is configured to compare the current text region emotional profile to one or more of the previous text region emotional profiles to identify emotional transitions in the speech audio, in accordance with the techniques previously described (for example, but not limited to, comparing the resultant vectors or co-ordinates of the emotional profiles in the continuous emotion model and looking for angular and/or displacement changes over predetermined thresholds). Upon identifying an emotional transition in the currently processed text region, the soundtrack creation system may initiate a change or transition in the streaming soundtrack to a new music or audio file corresponding to or based on the emotional profile of the current processed text region such that the streaming soundtrack transitions to new music or audio as the corresponding portion of speech audio is played. This process continues as the streaming speech audio is continually buffered through the system to thereby provide an 'on demand' streaming soundtrack that matches the streaming speech audio. The buffering of the incoming speech audio enables time for the system to process the associated text and generate the accompanying soundtrack ready for simultaneous delivery with the speech audio stream.

In the above configuration, it will be appreciated that the system may be configured to work on any suitable buffer size of speech audio for text analysis before the soundtrack is delivered or generated for playback. In some configurations, the buffer size may correspond to text regions of a predefined number of text segments (e.g. sentences or other types of segments, e.g. paragraphs, chapters), text regions of a predefined number of words, text regions defined by text reference boundaries (e.g. paragraph or chapter boundaries) in the context of streaming speech audio corresponding to audiobooks or similar, or any other suitable text region buffer size.

'On Demand' Streaming Soundtrack for Live Speech Audio

In this second example, a soundtrack is desired for playback in relation to live speech audio, such as a live conversation in a meeting room or other formal or informal setting or a phone conversation, or any other 'live' streaming speech audio that is being played independently of the soundtrack playback system (e.g. possibly an audiobook or podcast playing live on another system). In this example, the soundtrack creation system is configured to record or otherwise obtain a digital audio signal of the live speech audio stream representing the live speech audio for processing. The incoming live speech audio stream is then buffered into memory and processed in text region portions as in the above first example for streaming speech audio. As such, a constant stream of text regions and their associated text region emotional profiles are generated from which a soundtrack of music can be generated. In this example, the system is operating to provide a soundtrack to accompany the current live speech audio being played or heard based on processing of past portions of the live speech audio as it is buffered in for processing. In this second example, emotional transitions in the live speech audio may be identified as discussed with respect to the first example. However, it will be appreciated that the music selection criteria or settings may be varied in different modes depending on the nature of the soundtrack required. In some configurations or modes, the music may be selected to match or enhance the emotion or mood of the live speech audio as previously described. However, in other configurations or modes, the music may be selected by the system to counteract the emotion or mood associated with the live speech audio (e.g. if an angry or aggressive mood or emotion is identified in the live speech audio, the system may be configured to select calming music to counteract that mood). In further configurations, the music may be selected based on a moving average of the emotional profiles of all or at least a portion of the past processed text regions.

Application Plug-in or Webpage Widget

In other further embodiments, the automatic soundtrack creation system may be in the form of a browser plug-in or webpage widget that is configured to generate a soundtrack for the speech audio presented on a webpage In another embodiment, the automatic soundtrack creation system may be implemented as a plug-in or Application Programing Interface (API) for $3^{rd}$ party software such as word processing or presentation (e.g. slide-show) software programs, and the API may be configured to enable speech audio features or tracks in multimedia presentation documents to be processed and a suitable soundtrack generated.

2.10 Playback Systems for of Automatically Created Soundtrack

The soundtracks may be delivered to an end user using any suitable method. The soundtracks and their associated audio track files may be entirely downloaded in advance of playback, or streamed from a server or the cloud progressively, and this applies to both pre-rendered soundtrack and those generated on-demand/real-time.

In some embodiments, the automatically created soundtrack may be played via any suitable system that is configured to synchronise the playback of the configured audio regions with a user's listening of the speech audio, such that the audio regions are played back when the user is listening to their corresponding speech regions in the speech audio. Typically, the playback systems can detect the user's playback position in the speech audio and/or playback speed of the speech audio, and synchronise playback of the audio regions to the speech audio playback accordingly.

The playback systems are also configured to process any additional audio playback effect data associated with the audio regions of the soundtrack and control playback based on that data, such as transitional playback effects, looping settings, and offset start and/or stop settings as described above. As previously described, in some embodiments the offset start and/or stop settings may be configured to be selectively ignored or enforced by the playback device. In some embodiments, the selection to ignore or enforce the offset start and/or stop settings may be automatically determined based on one or more factors such as, but not limited to, the type of playback device, particular music track being played, the particular source of the audio or music (e.g. streaming music service), profile or subscription status of end user, and/or or territory in which the soundtrack is played. In other embodiments, the soundtrack playback device may be configured with pre-configured or predetermined offset start and/or stop settings that it applies to the soundtrack audio files as they are downloaded or streamed to the device for playback. For example, the playback device may be configured to apply an offset start and/or stop playback settings to one or more of the audio or music files of the audio regions such that the music or audio track commences playback and/or ceases playback at an offset start and/or stop times relative to its natural start and stop times that define is actual natural playback duration. The settings may be applied to all audio regions or a selected number of regions based on one or more factors, such as those described above.

By way of further explanation only, some examples of particular playback systems are provided below.

Example One—Soundtrack Playback System for Audiobook

By way of example only, a playback system will be described below in the context of a soundtrack configured for playback with speech audio in the form of an audiobook, although it will be appreciated that this system can be configured to operate with other forms or types of speech audio and associated soundtracks in a similar manner.

Various soundtrack playback systems may be used for playback of the audiobook and controlling synchronised playback of the associated soundtrack, or for simply controlling playback of the soundtrack with the audiobook playback being controlled via another application program or device. The soundtrack playback system may be implemented on various user hardware devices, including portable consumer electronic devices such as smartphones, tablets, AI Assistants/devices and dedicated e-reader devices or personal computers, whether desktop or laptop. In some configurations, the soundtrack data file or files, including all the audio tracks, may be entirely downloaded in advance and stored locally on the user device before playback can commence. In some embodiments, the soundtrack and audio track files are combined with the audiobook file as a single soundtrack-enhanced audiobook data file for download and playback. In other configurations, the soundtrack data file may be downloaded on the user device and the audio track files may be streamed individually or in batches from a remote database (e.g. the 'Cloud') during playback.

Figure 18:
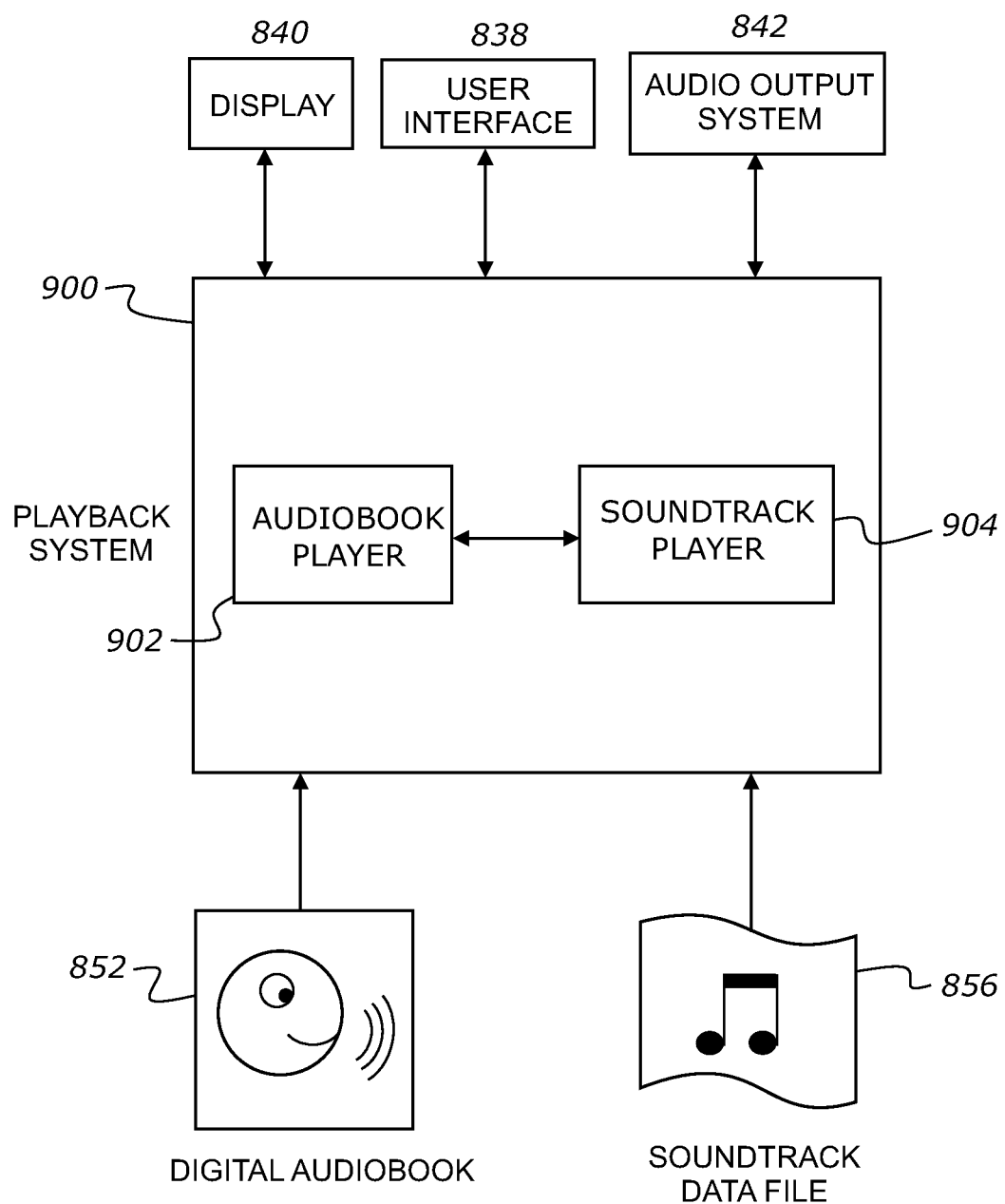
FIG. 18 is a schematic diagram of a playback system for playback of a synchronised soundtrack with an audiobook in accordance with an embodiment.

Referring to FIG. 18, an embodiment of a soundtrack playback system 900 for playback of the automatically generated soundtrack will be described by way of example. In this embodiment, the playback system comprises an audiobook player module 902 and a soundtrack player 904 module, although in alternative embodiments it will be appreciated that the functionality of these modules may be provided in a single audio player module or component, or that the modules may be operating on separate devices that are in data communication.

The audiobook player 902 is configured to retrieve or receive the audiobook file or files 852 and playback the audiobook over the audio output system 842 in response to user audio playback controls. In addition to the usual audiobook playback controls, the user is able to vary the narration speed of the audiobook playback, as will be appreciated to a skilled person or user of audiobooks. Some audiobooks are provided with digital signal processing techniques that reduce or minimize pitch-shifting in the narration that can occur when changing the narration speed setting.

Typically, the narration speed is selected from a pre-defined number of narration speed (NS) settings which are multipliers or speed factors relative to a nominal or default or standard narration speed, or the narration speed may be selected from a continuous scale defined between a slow narration speed end such as ×0.5 (e.g. 50 wpm) to a fast narration speed such as ×5 (e.g. 500 wpm). The narration speed selected for the audiobook playback may be represented by a narration speed variable that is stored in memory. The narration speed variable may be in the form of an absolute narration speed value such as words per minute (wpm) value or alternatively a relative narration speed value, for example a multiplier value relative to the nominal narration speed, or any other data such as a selected playback time duration relative to the nominal playback duration at the soundtrack creation.

In this embodiment, the audiobook player 902 and soundtrack player 904 are in data communication. For example, the soundtrack player 904 receives or retrieves audiobook playback data from the audiobook player 902 relating to the audiobook playback via a direct interface of API or similar. The audiobook playback data may comprise data indicative of the current or real-time audiobook playback position or time counter as the audiobook is being played and data indicative of the narration speed variable.

The soundtrack player 904 is configured to receive and process the audiobook playback data from the audiobook player 902 and trigger synchronised playback of the audio regions of the soundtrack with their respective narration regions as they are being narrated in the audiobook playback. In particular, the playback system processes the soundtrack data file or files and co-ordinates playback of the locally stored and downloaded audio track files (which may be pre-downloaded prior to playback or part of the soundtrack data file or files) or the incoming streamed audio track files in accordance with a playback position data and/or narration speed setting data relating to the audiobook playback. As previously noted, the soundtrack 856 is a variable duration soundtrack in which the duration of the soundtrack dynamically adjusts based on the narration speed of the audiobook playback to ensure synchronisation holds at any selected narration speed. In particular, the narration speed variable associated with the audiobook playback defines the total playback duration of the audiobook, and the soundtrack player is configured to dynamically alter the duration of the soundtrack to match the audiobook duration based on the narration speed variable. For 'time domain' soundtracks in which the start and stop positions of the audio regions are defined in time values relative to the audiobook playback timeline, the triggering can be deduced directly from the soundtrack data. For 'text domain' soundtracks in which the start and stop positions of the audio regions are defined based on text position values within the associated text, the soundtrack player may be configured to generate or retrieve speech-to-text mapping data to convert those values into the time domain to enable synchronized triggering, as previously discussed.

Example Two—Soundtrack Playback System for 'Detached' Soundtrack, e.g. Particularly for Analogue Audiobooks By way of another example, soundtrack playback systems for analogue speech audio, such as analogue audiobooks or voice recordings will be described. As described above, the automatic soundtrack creation system can create soundtracks for any speech audio from any source, including analogue sources. In another embodiment, a soundtrack playback system may be provided in the form of an application program or website interface accessible by an end user on a suitable electronic device. The soundtrack playback system comprises an interactive GUI for browsing a database or catalogue of analogue audiobooks and/or soundtrack titles for which the analogue speech audio has been pre-processed by the automatic soundtrack creation system to generate a pre-rendered soundtrack or alternatively the text emotional profile map and/or audio region definition map data from which a soundtrack may be created on demand or in real-time.

The user may be listening to a particular audiobook (e.g. audiobook on magnetic tape or CD), and want to listen to the associated automatically created soundtrack, so accesses the soundtrack application program, browses or searches for the audiobook title in the catalogue via the GUI, and then selects the soundtrack associated with the audiobook for playback. For some audiobook titles, the database will comprise a pre-rendered soundtrack or alternatively text emotional profile map and/or audio region definition data from which a soundtrack can be created on demand by the soundtrack creation system, and which can be customised to user preferences based on user-based music-selection filters or other filters. For other audiobook titles, no soundtrack data may be present in the database, and in such situations the system may be configured to retrieve the associated electronic text for the audiobook title from one or more text sources over a data network or data communication link (e.g. electronic book or text libraries or databases or subscription services) and automatically create a soundtrack using the method previously described for the book, and deliver the generated soundtrack to the user for playback.

The application program GUI is provided with audio playback controls (play, pause, volume etc) the soundtrack playback may be synchronised with the user's listening position in their audiobook by the user selecting the current playback time or position in the audiobook or otherwise providing their audiobook playback positional information to the soundtrack playback application via a user interface in the GUI.

The above system may also be applied to other speech audio content (including audio-visual content), such as the user watching a play (e.g. a Shakespeare play) on television or other display screen. The user can access the associated automatically created soundtrack for the content for playback in a similar manner to the above, regardless of the source of the speech audio content (e.g. DVD, Blu-ray, streaming video or television, or on-demand content services or sources).

The soundtrack playback application program for 'detached' soundtracks is also applicable to digital speech audio such as digital audiobooks or podcasts or other voice recordings. By way of example, again the user may be listening to their audiobook on an electronic user device or audiobook player and want to play an associated soundtrack, so accesses the separate soundtrack playback application program (either on the same or a separate electronic device), and selects the soundtrack associated with the digital audiobook for playback as described above for the analogue audiobooks scenario, or alternatively inputs identification data for the audiobook such that the system can retrieve the associated electronic text representing or corresponding to the audiobook and automatically generate a soundtrack as described above. In this configuration, the audiobook playback position and narration speed setting (if applicable) of the user may be extracted from the audiobook player program by the soundtrack application program via an API or similar to enable the playback position of the soundtrack to be synchronised to the listener's audiobook playback position. Alternatively, the soundtrack application program may listen to the audiobook playback and signal process the audio to deduce the playback position directly.

In alternative embodiments, it will be appreciated that the soundtrack application program need not necessarily have an interactive GUI for the user to interface with. In alternative embodiments, the soundtrack application program may be executed or implemented by an Artificial Intelligence (AI) assistant or device based on voice commands for example. In such configurations, the AI assistant may receive or detect input in the form of voice commands from a user instructing the AI assistant to retrieve and playback a soundtrack for the audiobook they are listening to (whether analogue or digital), or some other speech audio. The AI assistant processes these instructions, and searches the soundtrack catalogue as before and requests the soundtrack for playback for the audiobook the user is listening to. The AI assistant may playback the soundtrack over its own audio output speakers or channel the soundtrack for playback over another device having audio playback capability. The AI assistant may also receive voice commands from the user indicative of their listening playback position in the book or may automatically retrieve or determine their listening position (e.g. by accessing data from their audiobook player or signal processing the audiobook output to determine the playback position) to synchronise playback and/or may also receive voice commands for audio playback controls (e.g. play, pause, volume etc).

In any of the above embodiments, the soundtrack application program may be configured to receive any suitable form of input data indicative or identifying the speech audio, e.g. the audiobook, the user is listening to, to enable subsequent retrieval and/or generation and delivery of the associated soundtrack. For example, as alternatives to an operable audiobook title selection GUI or voice commands, the user may operate their electronic device to scan a machine-readable code (e.g. barcode or QR code or the like) associated with the audiobook and which contains identification or bibliographical information relating to the audiobook (e.g. data indicative of the title and author or source reference number or code for example), or alternatively may capture a digital photo or image captured of the cover of the book associated with the audiobook which is then processed to identify the audiobook. In further alternatives, the input data may be extracted or decoded from an information signal or code modulated or encoded into the audiobook signal which is processed to identify the audiobook. This input data is processed to identify the audiobook, which then enables the associated soundtrack to be retrieved or generated as above, and delivered to the user for playback.

3. General

Embodiments of the invention may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

In the foregoing, a storage medium may represent one or more devices for storing data, including read-only memory (ROM), random access memory (RAM), magnetic disk storage mediums, optical storage mediums, flash memory devices and/or other machine readable mediums for storing information. The terms "machine readable medium" and "computer readable medium" include, but are not limited to portable or fixed storage devices, optical storage devices, and/or various other mediums capable of storing, containing or carrying instruction(s) and/or data.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, circuit, and/or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

One or more of the components and functions illustrated the figures may be rearranged and/or combined into a single component or embodied in several components without departing from the invention. Additional elements or components may also be added without departing from the invention. Additionally, the features described herein may be implemented in software, hardware, or combination thereof.

In its various aspects, the invention can be embodied in a computer-implemented process, a machine (such as an electronic device, or a general purpose computer or other device that provides a platform on which computer programs can be executed), processes performed by these machines, or an article of manufacture. Such articles can include a computer program product or digital information product in which a computer readable storage medium containing computer program instructions or computer readable data stored thereon, and processes and machines that create and use these articles of manufacture.

The foregoing description of the invention includes preferred forms thereof. Modifications may be made thereto without departing from the scope of the invention as defined by the accompanying claims.

The invention claimed is:

1. A method of automatically generating a digital soundtrack intended for synchronised playback with associated speech audio, the soundtrack comprising one or more audio regions configured for synchronised playback with corresponding speech regions of the speech audio, the method executed by a processing device or devices having associated memory, the method comprising:
   (a) receiving or retrieving raw text data representing or corresponding to the speech audio into memory;
   (b) applying natural language processing (NLP) to the raw text data to generate processed text data comprising token data that identifies individual tokens in the raw text, the tokens at least identifying distinct words or word concepts;
   (c) applying semantic analysis to a series of text segments of the processed text data based on a continuous emotion model defined by a predefined number of emotional category identifiers each representing an emotional category in the model, the semantic analysis being configured to parse the processed text data to generate, for each text segment, a segment emotional data profile based on the continuous emotion model;
   (d) identifying a series of text or speech regions comprising a text segment or a plurality of adjacent text segments having an emotional association by processing the segment emotional data profiles of the text segments with respect to predefined rules, and generating audio region data defining the audio regions corresponding to the identified text regions, each audio region being defined by a start position indicative of the position in the text at which the audio region is to commence playback, a stop position indicative of the position in the text at which the audio region is to cease playback, and a generated region emotional profile based on the segment emotional profiles of the text segments within its associated text region;
   (e) processing an accessible audio database or databases comprising audio data files and associated audio profile information to select an audio data file for playback in each audio region, the selection at least partly based on the audio profile information of the audio data file corresponding to the region emotional profile of the audio region, and defining audio data for each audio region representing the selected audio data file for playback; and
   (f) generating soundtrack data representing the created soundtrack for synchronised playback with the speech audio, the soundtrack data comprising data representing the audio regions and audio data associated with those audio regions.

2. The method according to claim 1 wherein the speech audio is pre-recorded or pre-generated.

3. The method according to claim 1 wherein the speech audio is an audiobook and the speech regions correspond to narration regions in the audiobook, and wherein the soundtrack comprises a soundtrack timeline along which the one or more audio regions are configured for synchronised playback with corresponding narration regions in the audiobook playback timeline, each audio region having a position along the soundtrack timeline that is dynamically adjustable to maintain synchronization of the audio regions of the soundtrack with their respective narration regions in the audiobook based on a narration speed variable indicative of the playback narration speed of the audiobook.

4. The method according to claim 1 wherein step (a) of receiving or retrieving raw text data representing the speech audio into memory comprises:
   receiving or retrieving a digital audio file or files representing the speech audio; and
   processing the digital audio file or files with one or more speech-to-text engines to generate raw text data representing the speech audio.

5. The method according to claim 1 wherein the step (a) of receiving or retrieving raw text data representing the speech audio into memory comprises:
   receiving identification data indicative of the speech audio;
   receiving or retrieving raw text data representing the speech audio from one or more electronic text or content sources based on the identification data.

6. The method according to claim 1 wherein the continuous emotion model is further defined by lexicon data representing a set of lexicons for the emotional category identifiers, each lexicon comprising data indicative of a list of words and/or word concepts that are categorised or determined as being associated with the emotional category identifier associated with the lexicon.

7. The method according to claim 6 wherein each word or word concept in each lexicon has one or more associated lexicon attribute values or identifiers.

8. The method according to claim 7 wherein each word or word concept has a weighting value representing how strongly the word or word concept represents the emotional category identifier of the lexicon, and a syntactic value or identifier representing the part of speech or type of word or word concept.

9. The method according to claim 6 wherein applying semantic analysis to the processed text data comprises generating segment emotional data profiles that represent for each emotional category identifier the absolute count or frequency of tokens in the text segment corresponding to the associated lexicon.

10. The method according to claim 6 wherein each segment emotional data profile is generated in the form of a multi-dimensional data set comprising a plurality of count or frequency values, one for each emotional category identifier, and wherein the count or frequency values are based on the number of tokens in the text segment corresponding to or matching to their lexicon associated with an emotional category identifier.

11. The method according to claim 10 wherein the multi-dimensional data sets of the segment emotional data profiles are multi-dimensional representations of the emotional profile of the text segments, each emotional category identifier representing a distinct dimension within the continuous emotion model.

12. The method according to claim 10 wherein the generated segment emotional data profiles comprise a multi-dimensional data set comprising absolute count values or frequency values for each emotional category identifier.

13. The method according to claim 12 wherein the absolute count values or frequency values of the multi-dimensional data set represent or are indicative of the absolute intensity of the text segment for each emotional category identifier.

14. The method according to claim 12 wherein the method further comprises generating baseline statistical values for each emotional category identifier across the entire text, and normalising or scaling the segment emotional data profiles based on or as a function of the generated baseline statistical values to generate relative segment emotional data profiles.

15. The method according to claim 1 wherein the continuous emotion model comprises a 2-dimensional circular reference frame defined by a circular perimeter or boundary extending about a central origin, with each emotional category identifier represented by a segment or spoke of the circular reference frame to create a continuum of emotions.

16. The method according to claim 15 wherein the segment emotional data profiles are multi-dimensional data sets comprising absolute or relative intensity values for each emotional category identifier, and the method comprises mapping each data set as multiple two-dimensional vectors into the circular reference frame, a vector representing the intensity value of each emotional category identifier of a text segment.

17. The method according to claim 15 wherein the segment emotional data profiles are multi-dimensional data sets comprising absolute or relative intensity values for each emotional category identifier, and the method comprises mapping each data set as a single representative or resultant two-dimensional vector into the circular reference frame, the vector representing the overall emotional profile and intensity of the text segment.

18. The method according to claim 1 wherein identifying text regions comprises identifying reference text segments that represent emotional transitions in text based on pre-defined emotional-change threshold or thresholds, and defining the text regions relative to those reference text segments.

19. The method according to claim 1 wherein identifying text regions comprises defining all text segments as an initial set of text regions, and iteratively grouping adjacent text segments into a set of larger final text regions based on analysis of the segment emotional data profiles and/or other predefined rules.

20. The method according to claim 1 wherein identifying text regions comprises:
   (i) defining a first set of text regions of one or multiple adjacent text segments by grouping text segments with neutral segment emotional data profiles with adjacent non-neutral segment emotional data profiles;
   (ii) reducing the first set of text regions into a smaller second set of text regions based on grouping at least some adjacent text regions from the first set into larger text regions until all the text regions in the second set reach a predetermined size threshold;
   (iii) generating or determining an interim text region emotional data profile for each of the larger text regions in the second set based on the individual segment emotional data profiles of the segments within the region;
   (iv) analysing the interim text region emotional data profiles of the second set of text regions and further grouping adjacent text regions having an emotional association based on an emotional-transition threshold or thresholds to generate a final set of text regions; and
   (v) generating or determining a text region emotional data profile for each of the text regions in the final set based on the individual segment emotional data profiles of the text segments within the region and/or the interim text region emotional data profiles.

21. The method according to claim 20 wherein analysing the interim text region emotional data profiles of the second set of text regions and further grouping adjacent text regions having an emotional association based on an emotional-transition threshold to generate a final set of text regions comprises:
   (i) mapping each interim text region emotional data profile or masked interim text region emotional data profile as a two-dimensional vector into the 2-dimensional circular reference frame of the continuous emotion model;
   (ii) identifying emotional transitions between adjacent interim text regions based on analysing or comparing the distance from the origin and/or angular movement between two-dimensional vectors of adjacent interim text regions relative to emotional-transition thresholds; and
   (iii) grouping of adjacent interim text regions based on the identified emotional transitions to generate a final set of text regions.

22. The method according to claim 20 wherein generating or determining a text region emotional data profile for each of the text regions in the final set comprises any one or more of the following:
   aggregating or summing the individual segment emotional data profiles of the text segments of the text region or combining or summing the individual interim text region emotional data profiles of the text region, selecting a prevailing or dominant segment emotional data profile or interim text region emotional data profile to represent the final text region, and/or generating a representative text region emotional data profile based on statistical processing of the segment emotional data profiles or interim text region emotional data profiles.

23. The method according to claim 1 wherein the step of processing an accessible audio database or databases comprising audio data files and associated audio profile information to select an audio data file for playback in each audio region comprises translating the region emotional profiles of the text regions into a format or data set that is comparable to the audio profile information of the audio data files in the audio database or databases.

24. The method according to claim 1 wherein the step of processing an accessible audio database or databases comprising audio data files and associated audio profile information to select an audio data file for playback in each audio region comprises translating the audio profile information of the audio data files is into a format or data set that is comparable to the region emotional profiles.

25. The method according to claim 1 wherein the step of processing an accessible audio database or databases comprising audio data files and associated audio profile information to select an audio data file for playback in each audio region comprises translating both the region emotional profiles and audio profile information into a common format or data set so they can be compared for a match.

26. The method according to claim 1 wherein the step of processing an accessible audio database or databases comprising audio data files and associated audio profile information to select an audio data file for playback in each audio region comprises processing an accessible audio database comprising audio data files having associated audio profile information that is in the same format or is at least partly directly comparable to the format of the region emotional profiles.

27. The method according to claim 1 wherein the method further comprises applying semantic analysis to the processed text based on one or more thematic category identifiers having associated thematic lexicons to generate segment thematic profiles for the text segments.

28. The method according to claim 27 wherein the method comprises:
- identifying a series of text regions each comprising a text segment or plurality of text segments having an emotional association and/or thematic association based on processing the segment emotional and thematic data profiles with respect to predefined rules; and
- generating, for each identified text region and its associated audio region, a region emotional and thematic data profile based on the emotional and thematic profiles of the text segments within the text region.

29. The method according to claim 28 wherein the method comprises processing the accessible audio database or databases to select an audio data file for playback in each audio region based at least partly on the audio profile information of an audio data file corresponding or matching closely to the region emotional and thematic profile of the audio region.

30. The method according to claim 1 wherein the method further comprises processing the identified text regions to generate a thematic data profile for each region based on one or more thematic category identifiers having associated thematic lexicons, and generating a region emotional and thematic data profile for each text region and its associated audio region.

31. The method according to claim 30 wherein the method comprises processing the accessible audio database or databases to select an audio data file for playback in each audio region based at least partly on the audio profile information of an audio data file corresponding or matching closely to the region emotional and thematic profile of the audio region.

32. The method according to claim 1 wherein the soundtrack comprises a soundtrack timeline along which the one or more audio regions are configured for synchronised playback with corresponding text regions in the text as it is being read, each audio region having a position along the soundtrack timeline that is dynamically adjustable to maintain synchronization of the audio regions of the soundtrack with their respective text regions in the text as they are being read based on a reading speed variable indicative of the reader's reading speed and/or a reading position variable indicative of the reader's reading position in the text.

33. A system comprising a processor or processors configured to implement a method of automatically generating a digital soundtrack intended for synchronised playback with associated speech audio, the soundtrack comprising one or more audio regions configured for synchronised playback with corresponding speech regions of the speech audio, the method comprising:
- (a) receiving or retrieving raw text data representing or corresponding to the speech audio into memory;
- (b) applying natural language processing (NLP) to the raw text data to generate processed text data comprising token data that identifies individual tokens in the raw text, the tokens at least identifying distinct words or word concepts;
- (c) applying semantic analysis to a series of text segments of the processed text data based on a continuous emotion model defined by a predefined number of emotional category identifiers each representing an emotional category in the model, the semantic analysis being configured to parse the processed text data to generate, for each text segment, a segment emotional data profile based on the continuous emotion model;
- (d) identifying a series of text or speech regions comprising a text segment or a plurality of adjacent text segments having an emotional association by processing the segment emotional data profiles of the text segments with respect to predefined rules, and generating audio region data defining the audio regions corresponding to the identified text regions, each audio region being defined by a start position indicative of the position in the text at which the audio region is to commence playback, a stop position indicative of the position in the text at which the audio region is to cease playback, and a generated region emotional profile based on the segment emotional profiles of the text segments within its associated text region;
- (e) processing an accessible audio database or databases comprising audio data files and associated audio profile information to select an audio data file for playback in each audio region, the selection at least partly based on the audio profile information of the audio data file corresponding to the region emotional profile of the audio region, and defining audio data for each audio region representing the selected audio data file for playback; and
- (f) generating soundtrack data representing the created soundtrack for synchronised playback with the speech audio, the soundtrack data comprising data representing the audio regions and audio data associated with those audio regions.

34. A non-transitory computer-readable medium having stored thereon computer readable instructions that, when executed on a processing device or devices, cause the processing device to perform a method of automatically generating a digital soundtrack intended for synchronised playback with associated speech audio, the soundtrack comprising one or more audio regions configured for synchronised playback with corresponding speech regions of the speech audio, the method comprising:
- (a) receiving or retrieving raw text data representing or corresponding to the speech audio into memory;
- (b) applying natural language processing (NLP) to the raw text data to generate processed text data comprising token data that identifies individual tokens in the raw text, the tokens at least identifying distinct words or word concepts;
- (c) applying semantic analysis to a series of text segments of the processed text data based on a continuous emotion model defined by a predefined number of emotional category identifiers each representing an emotional category in the model, the semantic analysis being configured to parse the processed text data to generate, for each text segment, a segment emotional data profile based on the continuous emotion model;
- (d) identifying a series of text or speech regions comprising a text segment or a plurality of adjacent text segments having an emotional association by processing the segment emotional data profiles of the text segments with respect to predefined rules, and generating audio region data defining the audio regions corresponding to the identified text regions, each audio region being defined by a start position indicative of the position in the text at which the audio region is to commence playback, a stop position indicative of the position in the text at which the audio region is to cease playback, and a generated region emotional profile based on the segment emotional profiles of the text segments within its associated text region;
- (e) processing an accessible audio database or databases comprising audio data files and associated audio profile information to select an audio data file for playback in each audio region, the selection at least partly based on the audio profile information of the audio data file corresponding to the region emotional profile of the audio region, and defining audio data for each audio region representing the selected audio data file for playback; and (f) generating soundtrack data representing the created soundtrack for synchronised playback with the speech audio, the soundtrack data comprising data representing the audio regions and audio data associated with those audio regions.

* * * * *